US012664491B2

(12) United States Patent
Kaliyaperumal et al.

(10) Patent No.: US 12,664,491 B2
(45) **Date of Patent: \*Jun. 23, 2026**

(54) INTELLIGENT AND PERSONALIZED SKILL DISCOVERY

(71) Applicant: Microsoft Technology Licensing, LLC, Redmond, WA (US)

(72) Inventors: PalaniRaj Kaliyaperumal, Redmond, WA (US); Kuralmani Elango, Bothell, WA (US); Aman Singhal, Issaquah, WA (US); Syed Adnan Ahmed, Sammamish, WA (US); Albert Michael Belton, Redmond, WA (US); Lily Xinchen Liu, Shoreline, WA (US); Julie Strauss, Olalla, WA (US)

(73) Assignee: Micorsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/419,185

(22) Filed: Jan. 22, 2024

(65) Prior Publication Data

US 2025/0156778 A1 May 15, 2025

Related U.S. Application Data

(60) Provisional application No. 63/548,439, filed on Nov. 14, 2023.

(51) Int. Cl.
*G06Q 10/0631* (2023.01)
(52) U.S. Cl.
CPC ............................ *G06Q 10/063112* (2013.01)

(58) Field of Classification Search
None
See application file for complete search history.

(56) References Cited

U.S. PATENT DOCUMENTS

| | | | |
|---|---|---|---|
| 2016/0086085 A1* | 3/2016 | Sweeney | G06N 5/02 |
| | | | 706/11 |
| 2018/0122371 A1 | 5/2018 | Vangala | |
| 2019/0087841 A1* | 3/2019 | Shariff | G06Q 30/0201 |
| 2022/0198136 A1 | 6/2022 | Peleg | |

(Continued)

FOREIGN PATENT DOCUMENTS

| | | |
|---|---|---|
| CA | 2625795 A1 | 10/2009 |
| WO | 2017189933 A1 | 11/2017 |

OTHER PUBLICATIONS

U.S. Appl. No. 63/548,444, filed Nov. 14, 2023.

(Continued)

*Primary Examiner* — George Chen
(74) *Attorney, Agent, or Firm* — Workman Nydegger

(57) ABSTRACT

Systems and methods are provided for facilitating the discovery and presentations of skills and data processed by the skills within blocks of a canvas displayed to a user within a user interface. The systems also identify schemas and data output formats of the relevant skills, and a desired presentation schema based on the user contexts and the application contexts. The systems further identify modules for normalizing the schemas of the relevant skills to the desired presentation schema, and uses the identified modules to normalize data obtained from the relevant skills into the desired presentation schema for presentation within the blocks of the canvas.

20 Claims, 32 Drawing Sheets

(56)           References Cited

U.S. PATENT DOCUMENTS

| 2022/0318522 | A1 | 10/2022 | Wolf |
| 2025/0110975 | A1 | 4/2025 | Shea |
| 2025/0117863 | A1 | 4/2025 | Zangrilli |
| 2025/0156198 | A1 | 5/2025 | Kaliyaperumal |
| 2025/0156464 | A1 | 5/2025 | Kaliyaperumal |
| 2025/0245030 | A1 | 7/2025 | Cyjon |

OTHER PUBLICATIONS

U.S. Appl. No. 63/548,439, filed Nov. 14, 2023.
U.S. Appl. No. 63/548,453, filed Nov. 14, 2023.
U.S. Appl. No. 18/420,326, filed Jan. 23, 2024.
U.S. Appl. No. 18/420,335, filed Jan. 23, 2024.
Non-Final Office Action mailed on Apr. 4, 2025, in U.S. Appl. No. 18/420,326, 16 pages.
Final Office Action mailed on Sep. 25, 2025, in U.S. Appl. No. 18/420,326, 14 pages.
Non-Final Office Action mailed on Sep. 9, 2025, in U.S. Appl. No. 18/420,335, 20 Pages.
Notice of Allowance mailed on Jan. 23, 2026, in U.S. Appl. No. 18/420,335, 09 Pages.

* cited by examiner

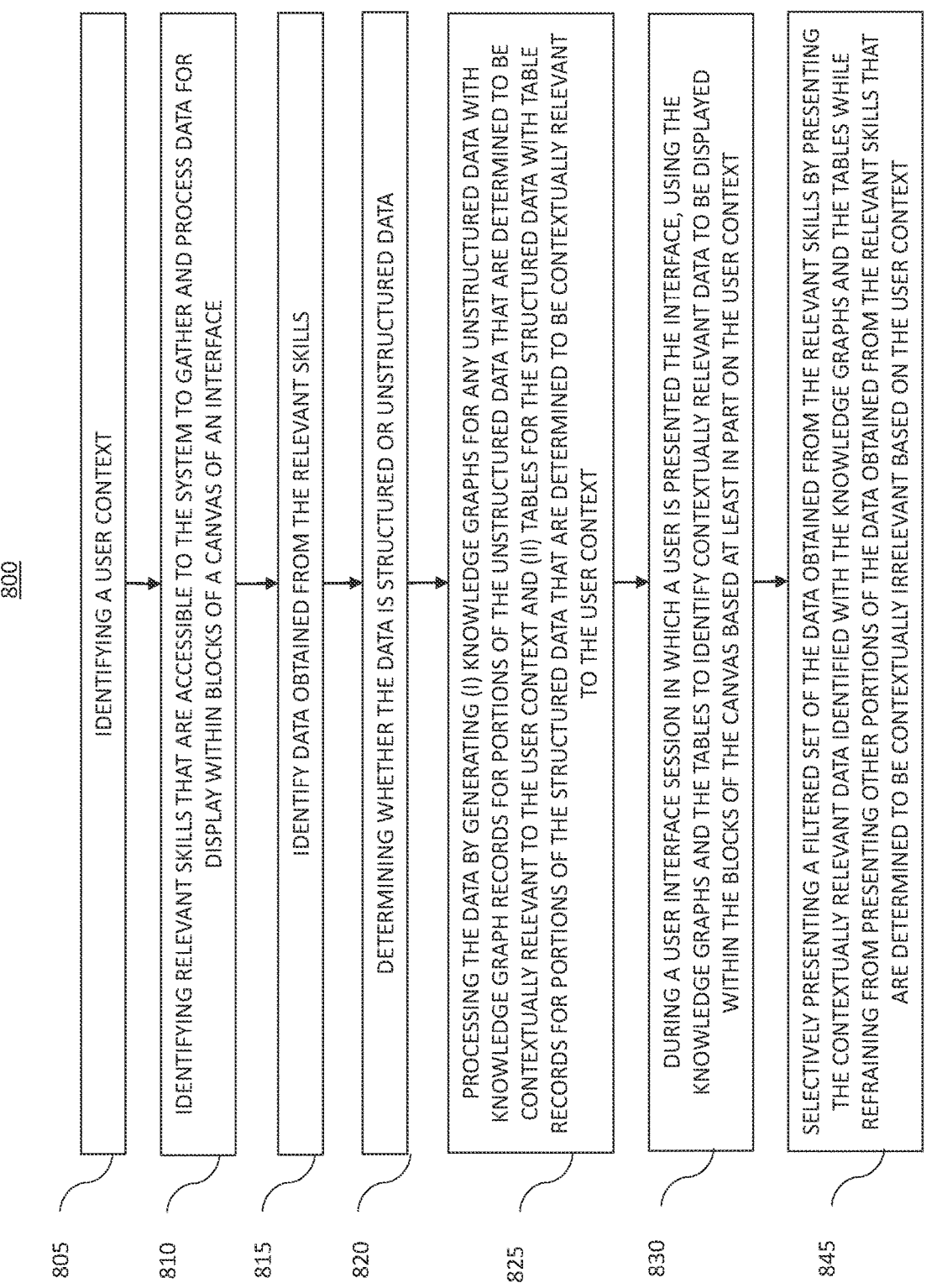

800

805 IDENTIFYING A USER CONTEXT

810 IDENTIFYING RELEVANT SKILLS THAT ARE ACCESSIBLE TO THE SYSTEM TO GATHER AND PROCESS DATA FOR DISPLAY WITHIN BLOCKS OF A CANVAS OF AN INTERFACE

815 IDENTIFY DATA OBTAINED FROM THE RELEVANT SKILLS

820 DETERMINING WHETHER THE DATA IS STRUCTURED OR UNSTRUCTURED DATA

825 PROCESSING THE DATA BY GENERATING (I) KNOWLEDGE GRAPHS FOR ANY UNSTRUCTURED DATA WITH KNOWLEDGE GRAPH RECORDS FOR PORTIONS OF THE UNSTRUCTURED DATA THAT ARE DETERMINED TO BE CONTEXTUALLY RELEVANT TO THE USER CONTEXT AND (II) TABLES FOR THE STRUCTURED DATA WITH TABLE RECORDS FOR PORTIONS OF THE STRUCTURED DATA THAT ARE DETERMINED TO BE CONTEXTUALLY RELEVANT TO THE USER CONTEXT

830 DURING A USER INTERFACE SESSION IN WHICH A USER IS PRESENTED THE INTERFACE, USING THE KNOWLEDGE GRAPHS AND THE TABLES TO IDENTIFY CONTEXTUALLY RELEVANT DATA TO BE DISPLAYED WITHIN THE BLOCKS OF THE CANVAS BASED AT LEAST IN PART ON THE USER CONTEXT

845 SELECTIVELY PRESENTING A FILTERED SET OF THE DATA OBTAINED FROM THE RELEVANT SKILLS BY PRESENTING THE CONTEXTUALLY RELEVANT DATA IDENTIFIED WITH THE KNOWLEDGE GRAPHS AND THE TABLES WHILE REFRAINING FROM PRESENTING OTHER PORTIONS OF THE DATA OBTAINED FROM THE RELEVANT SKILLS THAT ARE DETERMINED TO BE CONTEXTUALLY IRRELEVANT BASED ON THE USER CONTEXT

*Figure 8*

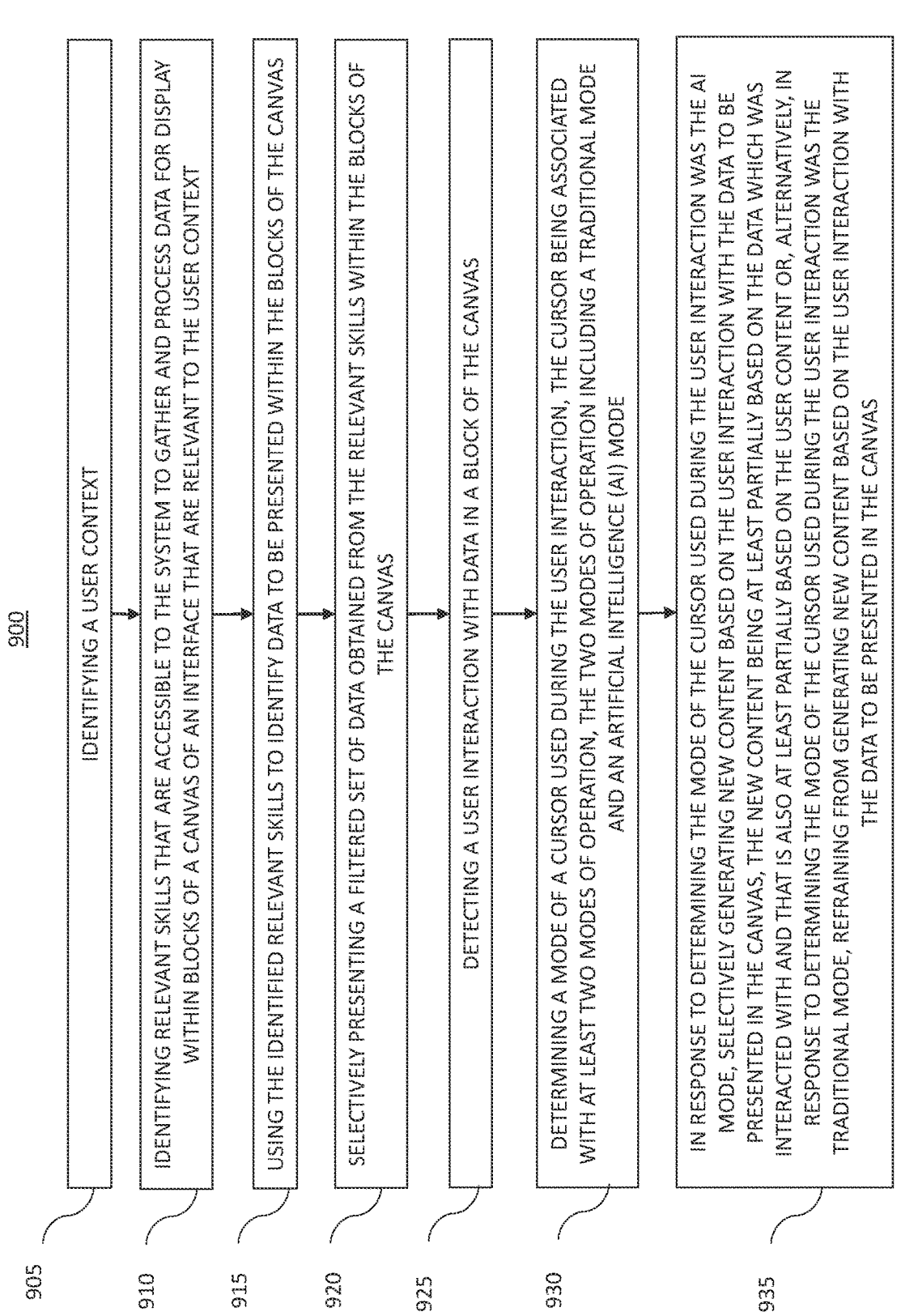

900

905 — IDENTIFYING A USER CONTEXT

910 — IDENTIFYING RELEVANT SKILLS THAT ARE ACCESSIBLE TO THE SYSTEM TO GATHER AND PROCESS DATA FOR DISPLAY WITHIN BLOCKS OF A CANVAS OF AN INTERFACE THAT ARE RELEVANT TO THE USER CONTEXT

915 — USING THE IDENTIFIED RELEVANT SKILLS TO IDENTIFY DATA TO BE PRESENTED WITHIN THE BLOCKS OF THE CANVAS

920 — SELECTIVELY PRESENTING A FILTERED SET OF DATA OBTAINED FROM THE RELEVANT SKILLS WITHIN THE BLOCKS OF THE CANVAS

925 — DETECTING A USER INTERACTION WITH DATA IN A BLOCK OF THE CANVAS

930 — DETERMINING A MODE OF A CURSOR USED DURING THE USER INTERACTION, THE CURSOR BEING ASSOCIATED WITH AT LEAST TWO MODES OF OPERATION, THE TWO MODES OF OPERATION INCLUDING A TRADITIONAL MODE AND AN ARTIFICIAL INTELLIGENCE (AI) MODE

935 — IN RESPONSE TO DETERMINING THE MODE OF THE CURSOR USED DURING THE USER INTERACTION WAS THE AI MODE, SELECTIVELY GENERATING NEW CONTENT BASED ON THE USER INTERACTION WITH THE DATA TO BE PRESENTED IN THE CANVAS, THE NEW CONTENT BEING AT LEAST PARTIALLY BASED ON THE DATA WHICH WAS INTERACTED WITH AND THAT IS ALSO AT LEAST PARTIALLY BASED ON THE USER CONTENT OR, ALTERNATIVELY, IN RESPONSE TO DETERMINING THE MODE OF THE CURSOR USED DURING THE USER INTERACTION WAS THE TRADITIONAL MODE, REFRAINING FROM GENERATING NEW CONTENT BASED ON THE USER INTERACTION WITH THE DATA TO BE PRESENTED IN THE CANVAS

*Figure 9*

INTELLIGENT AND PERSONALIZED SKILL DISCOVERY

CROSS-REFERENCE TO RELATED APPLICATIONS

This application claims the benefit of U.S. Provisional Patent Application Ser. No. 63/548,439, filed on Nov. 14, 2023, entitled "INTELLIGENT AND PERSONALIZED SKILL DISCOVERY," and which application is expressly incorporated herein by reference in its entirety.

BACKGROUND

Contemporary dashboards and canvas interfaces, while widely used, suffer from critical limitations that impede their ability to provide a dynamic and responsive user experience. One particularly prevailing issue is the inability of existing canvas interfaces to adapt and update content in real-time based on user interactions with displayed information. Unlike an intelligent planner that anticipates user needs and desires, existing systems operate in a relatively static manner, presenting information in a somewhat rigid and pre-determined layout.

The deficiency in responsiveness becomes particularly pronounced when considering the failure of conventional interfaces to dynamically adjust based on user interactions and user context. As a result, and rather than acting as proactive and anticipatory tools, conventional dashboards act as passive repositories of static information or mere links to remote content. This lack of dynamism forces users to navigate through an essentially static trees of information, hindering their ability to swiftly and efficiently access contextually relevant data.

Conventional canvas interfaces also fail to leverage user interactions as cues for dynamically updating the displayed content. For example, they neglect to consider a user's personal and professional status information as signaling contexts to adjust the manner in which the content of the canvas is processed and presented. This oversight not only limits the user's ability to seamlessly integrate relevant resources into their workflow but also hampers the overall efficiency and user satisfaction when using the canvas to identify and interact with desired data.

Conventional dashboards and canvas interfaces also exhibit limitations in providing robust means for user interaction. The prevalent mode of interaction, often confined to mouse prompts, offers a singular and rudimentary method for content selection, essentially operating in a single mode that limits the user's ability to intelligently engage with the presented information.

This restricted mode of interaction extends to a lack of mechanisms for dynamically updating the content being interacted with. Conventional systems, reliant on conventional mouse prompts, fall short in empowering users to intelligently manipulate or modify displayed information based on their evolving requirements. The absence of dynamic interaction capabilities impedes the user's ability to tailor the content to their needs or to initiate intelligent updates to the canvas in response to contextual changes.

When users need to perform complex tasks that require processing and analysis of various data sets involving multiple steps or considerations, the foregoing limitations of traditional canvas interfaces and cursor prompts become even more apparent.

In light of these problems associated with the limited capabilities of traditional cursor prompts, there exists an ongoing need and desire for improved systems and methods that can be used to enhance the capabilities and functionalities provided for cursor prompts, as well as the corresponding cursor prompt interfaces, particularly for enabling richer forms of interacting with content selected by the cursor prompts.

SUMMARY

The embodiments described herein relate to computer-implemented methods and corresponding systems for facilitating the discovery and presentations of skills and data processed by the skills within blocks of a canvas displayed to a user within a user interface.

Disclosed embodiments also include the identification of schemas and data output formats of the relevant skills and a desired presentation schema based on the user contexts and the application contexts. These are used for normalizing the schemas of the relevant skills to the desired presentation schema. For instance, in some embodiments, the systems use the identified modules to normalize data obtained from the relevant skills into the desired presentation schema for presentation within the blocks of the canvas.

In some aspects, a computer-implemented method is provided managing a discovery of relevant skills and data for a user that are contextually relevant to the user and for facilitating processing of the skills and data for presentation within blocks of a canvas displayed to the user within a user interface, the method including: the system identifying a user context, the user context including at least a user profile and location; the system identifying an application context, the application context including at least a type of application used to instantiate a user interface containing the canvas and one or more applications that are instantiated and used to generate data that is presented within the blocks of the canvas within the user interface; the system identifying a set of total available skills accessible to the system which are configured to generate and/or process data; the system selecting relevant skills from the set of total available skills accessible to the user to gather and process data for display within the blocks of the canvas, the system selecting the relevant skills by filtering the set of total available skills based on at least the user context; the system identifying schemas for data output formats of the relevant skills; the system identifying a desired presentation schema for a desired data presentation format for display within the blocks of the canvas, the desired presentation schema being based on at least the user context and the application context; the system identifying modules for normalizing schemas of the relevant skills to the desired presentation schema; and the system using the identified modules to normalize data obtained from the relevant skills into the desired presentation schema for presentation within the blocks of the canvas.

In some aspects, the techniques described herein relate to a method, wherein the method further includes the system displaying data obtained from the relevant skills within the desired presentation schema within the blocks of the canvas and inferring an inferred desired user action based on detecting a user input interacting with data presented within a particular block of the canvas as well as based at least in part on the user context and the application context.

In some aspects, the techniques further include determining to generate a new data block in the canvas with new data related to data contained within the particular block with new data that is normalized by the identified modules for normalizing schemas of the relevant skills to the desired presentation schema and that is displayed simultaneously with the particular block of the canvas or, alternatively, that replaces the particular block of the canvas with the data being interacted with.

In some aspects, the user context further includes calendar information, a title and/or position associated with the user. The user context information can also include authorization information and/or subscription information associated with user accounts.

In some aspects, the techniques described herein relate to a method, wherein the application context further includes an application state corresponding to one or more functionalities being invoked by the application and/or an application state corresponding to whether the application is being used in a group meeting implementation or, alternatively, an individual user implementation.

In some aspects, the techniques described herein relate to a method, wherein the relevant skills include one or more applications and/or models configured to process data. The relevant skills may include skills accessed from a source remote from the system and/or that are stored locally within the system.

In some aspects, the techniques described herein relate to a system, including a processor system and a computer storage medium that stores computer-executable instructions that are executable by the processor system to implement the methods described herein.

This Summary introduces a selection of concepts in a simplified form that are further described below in the Detailed Description. This Summary is not intended to identify key features or essential features of the claimed subject matter, nor is it intended to be used to determine the scope of the claimed subject matter.

BRIEF DESCRIPTION OF THE DRAWINGS

To describe how the advantages of the systems and methods described herein can be obtained, a more particular description of the embodiments briefly described is rendered by reference to specific embodiments thereof, which are illustrated in the appended drawings. These drawings depict only typical embodiments of the systems and methods described herein and are not, therefore, to be considered to be limiting in their scope. Systems and methods are described and explained with additional specificity and detail through the use of the accompanying drawings, in which:

FIGS. 8 and 9 illustrate example flow charts of acts associated with disclosed methods associated with providing a personalized interface experience to a user with content that is contextually relevant to the user.

FIGS. 26-31 illustrate additional examples of user interfaces with components of a multi-modal cursor, such as described in FIGS. 10-16.

DETAILED DESCRIPTION

Figure 1:
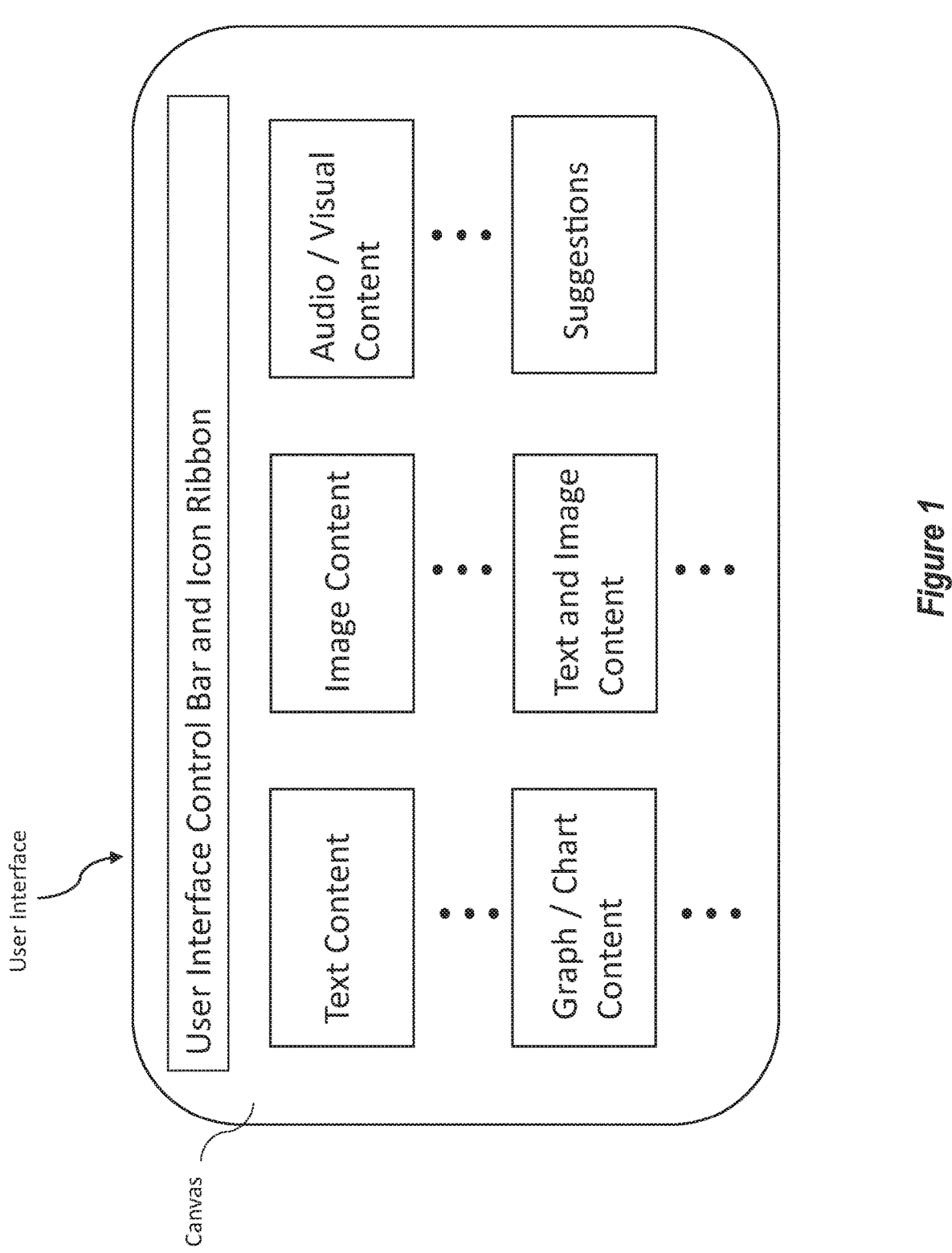
FIGS. 1-5 illustrate examples of interfaces and systems for presenting a user contextually relevant information within blocks of a canvas displayed in an interface.

Systems and methods are provided for utilizing cursor prompt interfaces to facilitate the discovery and presentations of skills and data processed by the skills within blocks of a canvas displayed to a user within a user interface. The systems also identify schemas and data output formats of the relevant skills, and a desired presentation schema based on the user contexts and the application contexts. The systems further identify modules for normalizing the schemas of the relevant skills to the desired presentation schema, and uses the identified modules to normalize data obtained from the relevant skills into the desired presentation schema for presentation within the blocks of the canvas.

Skill Discovery and Normalization

In some aspects, the disclosed embodiments include discovering skills and presenting the skills and/or data processed by the skills within blocks of a canvas that are rendered in an interface presented by a computing system, such as on a display screen of the computing system. The skills and processed data are contextually relevant to the user, based on a current context of the user and, in some instances, the context of the application(s) being used to render the interface canvas and/or that are processing data presented within the canvas.

As described in more detail below, the canvas is a visual representation of a dynamic data analysis process, providing an interactive space for the user to engage with the data and the identified skills. The canvas is divided into multiple blocks, each block representing a specific skill or a set of data.

Each block on the canvas is dynamically generated based on the user's context and the application context. The blocks present the identified skills and data in a manner that is easy to understand and interact with. The skills and data presented in the blocks are the result of a complex process of identification, filtering, and ranking, which is carried out by the system.

The system is designed to handle a wide range of skills, from applications and data sources to models for processing data. These skills are identified from a set of available skills, which can be prepackaged skills, remote skills, or third-party skills. The system selects the relevant skills based on the user's context and the application context, ensuring that the skills presented in the blocks are tailored to the user's specific requirements and preferences.

The system also identifies the schemas and data output formats of the relevant skills. These schemas and output formats are used to structure the data for presentation within the blocks of the canvas. The system further identifies a desired presentation schema, which is based on the user contexts and the application contexts. This desired presentation schema dictates how the data is presented within the blocks of the canvas.

To ensure that the data from the relevant skills is presented in the desired presentation schema, the system identifies modules for normalizing the schemas of the relevant skills. These modules are used to normalize the data obtained from the relevant skills, converting it into the desired presentation schema for presentation within the blocks of the canvas.

The system begins the process of skill discovery by identifying user contexts. User contexts are specific pieces of information about the user that can influence the selection and presentation of skills and data. These contexts can include a user profile, location, preference, calendar information, titles, authorizations, and subscriptions.

The user profile is a comprehensive representation of the user's identity within the system. It can include information such as the user's name, job title, department, and other relevant details. The user profile provides a baseline context for the system to understand who the user is and what their role might be within their organization.

The user's location can also be a relevant context. This could be the physical location of the user, such as their office or home, or it could be a virtual location within an application or platform. The location context can influence the selection of skills and data, as some skills or data sources may be more relevant or accessible based on the user's location.

User preference refers to the user's personal choices or settings within the system. These preferences can include things like preferred data sources, preferred types of data visualization, or preferred applications. By identifying these preferences, the system can tailor the selection and presentation of skills and data to align with the user's personal tastes and habits.

Calendar information can provide context about the user's schedule and commitments. This could include upcoming meetings, deadlines, or other events. This context can help the system identify timely or relevant skills and data. For example, if the user has a sales meeting scheduled, the system might prioritize skills and data related to sales performance.

Titles refer to the user's roles or responsibilities within their organization. This could include job titles, project roles, or other designations. Titles can provide context about the user's authority, expertise, or areas of responsibility, which can influence the selection of skills and data.

Authorizations refer to the user's permissions or access rights within the system. This could include access to specific data sources, applications, or other resources. By identifying the user's authorizations, the system can ensure that it selects skills and data that the user is permitted to access. The authorizations can also include login credentials and tokens or certificates that attest to the user's authorizations.

Subscriptions refer to the user's ongoing relationships or engagements with specific data sources, applications, or other resources. This could include subscription-based data sources, premium application features, or other subscribed resources. Subscriptions can provide context about the user's ongoing interests or areas of focus, which can influence the selection of skills and data. The subscription information can also include login credentials for accessing services provided by the subscription applications.

By identifying these user contexts, the system can create a personalized and dynamic skill discovery experience. The system uses these contexts to filter, rank, and select the relevant skills and data, ensuring that the blocks presented on the canvas are tailored to the user's specific requirements and preferences.

In addition to identifying user contexts, the system also identifies application contexts. These contexts provide information about the application or platform that the user is interacting with. Application contexts can include a variety of factors such as the type of application, the version of the application, tool selections within the application, and the usage scenario of the application.

The type of application refers to the specific software or platform that the user is using. This could be a data analysis tool, a project management application, a customer relationship management system, or any other type of application. The type of application can provide context about the user's tasks, workflows, and data requirements, which can influence the selection of skills and data.

The version of the application can also be a relevant context. Different versions of an application may have different features, capabilities, or data structures, which can affect the relevance and applicability of different skills. By identifying the version of the application, the system can ensure that it selects skills and data that are compatible with the user's current application environment.

Tool selections within the application refer to the specific tools, features, or options that the user has selected or activated within the application. These selections can provide context about the user's preferences, tasks, or workflows within the application. For example, if the user has selected a data visualization tool within the application, the system might prioritize skills and data related to data visualization.

The usage scenario of the application can also provide context. This could include whether the application is being used in a group meeting or other group setting, or whether it is being used for individual user use. The usage scenario can provide context about the user's collaboration requirements, communication patterns, or data sharing practices, which can influence the selection of skills and data.

By identifying these application contexts, the system can further personalize and optimize the skill discovery experience. The system uses these contexts in conjunction with the user contexts to filter, rank, and select the relevant skills and data, ensuring that the blocks presented on the canvas are tailored not just to the user's specific requirements and preferences, but also to their specific application environment and usage scenario.

The system is designed to identify relevant skills from a set of available skills. These skills can range from applications and data sources to models for processing data. The set of available skills can be vast and varied, encompassing prepackaged skills, remote skills, or third-party skills. The system is equipped to sift through this extensive set of skills and select the ones that are relevant to the user.

The selection of relevant skills is based on the user context(s). The user context(s) provide valuable information about the user's profile, location, preferences, calendar information, titles, authorizations, and subscriptions. By taking into account these user context(s), the system can filter the set of available skills and select a subset of skills that are relevant to the user's specific requirements and preferences.

A 'relevant skill' in this context is a skill that is capable of gathering and processing data for display within the blocks of the canvas in a manner that aligns with the user's context(s). For example, if the user context indicates that the user is a financial analyst working on a quarterly earnings report, a relevant skill could be a data analysis application that can process financial data. Alternatively, if the user context indicates that the user is a project manager planning a team meeting, a relevant skill could be a calendar tool that can help schedule the meeting.

The relevant skills are used to gather and process data for display within the blocks of the canvas. Each block on the canvas represents a specific skill or a set of data. The blocks are dynamically generated based on the user's context and the application context, and they present the identified skills and data in a manner that is easy to understand and interact with. By identifying and selecting the relevant skills, the system ensures that the blocks presented on the canvas are tailored to the user's specific requirements and preference.

In the process of skill discovery, the system identifies the schemas and data output formats of the relevant skills. A 'schema' in this context refers to the structure or organization of the data associated with a particular skill. It defines how the data is arranged, what type of data it is, and how the data elements relate to each other. For example, a schema for a financial data analysis skill might define that the data includes elements such as revenue, expenses, and profit, and that these elements are related in specific ways to calculate financial metrics.

On the other hand, 'data output format' refers to the format in which the data is presented or delivered by the skill. This could include formats such as tables, charts, graphs, or text summaries. The data output format is determined based on the nature of the data and the requirements of the user context and application context. For example, if the user context indicates that the user prefers visual data representations, the data output format might be a chart or graph.

The system identifies the schemas and data output formats of the relevant skills by analyzing the data associated with each skill. This involves parsing the data, identifying the data elements and their relationships, and determining the format in which the data is presented. This information is then used to normalize the data obtained from the relevant skills into the desired presentation schema for presentation within the blocks of the canvas.

The system also identifies the desired presentation schema based on the user contexts and the application contexts. The 'desired presentation schema' is a specific format or structure for presenting the data within the blocks of the canvas. This schema is determined based on the user's specific requirements, preferences, and the context of the application they are using.

The desired presentation schema can vary greatly depending on the user and application contexts. For example, if the user context indicates that the user is a financial analyst who prefers visual data representations, the desired presentation schema might be a chart or graph that visually represents financial data. On the other hand, if the user context indicates that the user is a project manager who prefers text summaries, the desired presentation schema might be a text summary of project data.

The application context can also influence the desired presentation schema. For example, if the application context indicates that the user is using a data analysis tool, the desired presentation schema might be a table or matrix that presents the data in a structured and organized manner. If the application context indicates that the user is using a project management application, the desired presentation schema might be a timeline or Gantt chart that presents the project data in a chronological format.

The system uses the identified user contexts and application contexts to determine the desired presentation schema. This involves analyzing the user's preferences, requirements, and the nature of the application they are using. The system then uses this information to select or generate a presentation schema that is tailored to the user's specific requirements and preferences, and that is compatible with the application they are using.

The desired presentation schema is used in the system to structure and present the data obtained from the relevant skills within the blocks of the canvas. By identifying and applying the desired presentation schema, the system ensures that the data is presented in a manner that is easy to understand, interact with, and that aligns with the user's specific requirements and preferences.

The system identifies modules for normalizing schemas of the relevant skills to the desired presentation schema. These 'modules' are specific components or functions within the system that are designed to transform or convert the data obtained from the relevant skills into a format or structure that aligns with the desired presentation schema.

Each module is designed to handle a specific type of data transformation or conversion. For example, a module might be designed to convert numerical data into a graphical format, such as a bar chart or line graph. Another module might be designed to convert text data into a structured format, such as a table or list. Yet another module might be designed to normalize the data by adjusting for variations in scale, units, or other factors.

The modules function by taking the data obtained from the relevant skills, analyzing the data based on the identified schemas and data output formats, and then applying the appropriate transformations or conversions to normalize the data into the desired presentation schema. This process involves a series of steps, including data extraction, data analysis, data transformation or conversion, and data integration.

Data extraction involves retrieving the data from the relevant skills. This could involve accessing a database, reading a file, querying a web service, or other methods of data retrieval. Once the data is retrieved, it is analyzed to determine its structure, format, and other characteristics.

Data analysis involves examining the data to understand its structure, format, and other characteristics. This could involve statistical analysis, data mining, text analysis, or other methods of data analysis. The results of the data analysis are used to determine the appropriate transformations or conversions to apply to the data.

Data transformation or conversion involves applying the appropriate transformations or conversions to the data to normalize it into the desired presentation schema. This could involve converting numerical data into a graphical format, converting text data into a structured format, normalizing the data to adjust for variations in scale, units, or other factors, or other methods of data transformation or conversion.

Data integration involves integrating the transformed or converted data into the blocks of the canvas for presentation to the user. This could involve inserting the data into a table, graph, or other visual element, arranging the data in a specific layout or order, or other methods of data integration.

By identifying and using these modules for normalizing schemas of the relevant skills to the desired presentation schema, the system ensures that the data obtained from the relevant skills is presented in a manner that is easy to understand, interact with, and that aligns with the user's specific requirements and preferences.

The system uses the identified modules to normalize the data obtained from the relevant skills into the desired presentation schema for presentation within the blocks of the canvas. This process involves several steps, each carried out by a specific module designed for that purpose.

First, the system retrieves the data from the relevant skills. This could involve accessing a database, reading a file, querying a web service, or other methods of data retrieval. The data is then analyzed to determine its structure, format, and other characteristics. This analysis is based on the identified schemas and data output formats of the relevant skills.

Once the data has been analyzed, the system applies the appropriate transformations or conversions to normalize the data. This involves using the identified modules, each of which is designed to handle a specific type of data transformation or conversion. For example, a module might be designed to convert numerical data into a graphical format, such as a bar chart or line graph. Another module might be designed to convert text data into a structured format, such as a table or list. Yet another module might be designed to normalize the data by adjusting for variations in scale, units, or other factors.

Normalization may also include performing a translation of the content from a first language to a second language using a model trained to perform such language translations. Normalization may also include modifying a font to be of a same type or size that conforms to the desired presentation format, to promote consistency in the data that is displayed within the canvas blocks.

After the data has been transformed or converted, it is integrated into the blocks of the canvas for presentation to the user. This could involve inserting the data into a table, graph, or other visual element, arranging the data in a specific layout or order, or other methods of data integration. The result is a personalized and dynamic canvas that presents the data obtained from the relevant skills in a manner that is easy to understand, interact with, and that aligns with the user's specific requirements and preferences.

By using the identified modules to normalize the data, the system ensures that the data is presented in the desired presentation schema, regardless of the original format or structure of the data. This allows the system to handle a wide range of data types and formats, and to present the data in a consistent and user-friendly manner.

The system displays data obtained from the relevant skills within the desired presentation schema on the canvas. The canvas serves as a visual platform where the user can interact with the data and the identified skills. The canvas is divided into multiple blocks, each block representing a specific skill or a set of data. The blocks are dynamically generated based on the user's context and the application context, and they present the identified skills and data in a manner that is easy to understand and interact with.

By displaying data obtained from the relevant skills within the desired presentation schema on the canvas, the system provides a personalized and dynamic skill discovery experience. The user can interact with the data and the identified skills in a meaningful and productive way, gaining insights and making informed decisions based on the data.

The system is further designed to infer a desired user action based on detecting a user input interacting with data presented within a particular block of the canvas. This inference is also based on the user context(s) and the application context(s). An 'inferred desired user action' in this context refers to an action that the system predicts the user wants to perform, based on their interaction with the data and the identified contexts.

The process of inferring a desired user action begins with the detection of a user input. This input could be a mouse click, a keyboard command, a touch gesture, or any other form of interaction with the data presented within a particular block of the canvas. The system captures this input and analyzes it to understand the user's interaction with the data.

The system then considers the user context(s) and the application context(s) in its analysis. The user context(s) provide information about the user's profile, location, preferences, calendar information, titles, authorizations, and subscriptions. The application context(s) provide information about the type of application, the version of the application, tool selections within the application, and the usage scenario of the application. By taking into account these contexts, the system can gain a deeper understanding of the user's specific requirements and preferences, and the specific application environment and usage scenario.

Based on the user input and the identified contexts, the system infers a desired user action. This inference involves predicting what action the user wants to perform, based on their interaction with the data and the identified contexts. The inferred desired user action could be a command to generate a new data block, a request to modify an existing block, a query to retrieve additional data, or any other action that the user might want to perform.

The system uses this inferred desired user action to guide its subsequent operations. For example, if the inferred desired user action is a command to generate a new data block, the system will initiate the process of identifying relevant skills, schemas, and data output formats to generate the new block. If the inferred desired user action is a request to modify an existing block, the system will initiate the process of identifying the relevant modules for normalizing the schemas of the relevant skills to the desired presentation schema.

By inferring desired user actions based on user input and identified contexts, the system can provide a personalized and dynamic skill discovery experience. The user can interact with the data and the identified skills in a meaningful and productive way, and the system can respond to the user's specific requirements and preferences in a timely and efficient manner.

In some instances, based on the inferred desired user action, the system determines whether to generate a new data block in the canvas with new data related to data contained within the particular block. This determination is made by analyzing the user input and the identified contexts. If the user input and the identified contexts suggest that the user wants to explore new data or gain additional insights, the system will decide to generate a new data block.

The process of generating a new data block involves several steps. First, the system identifies the relevant skills and data that will be used to populate the new block. This could involve querying a database, accessing a web service, or other methods of data retrieval. The system selects the relevant skills and data based on the user's context and the application context, ensuring that the new block will be relevant and useful to the user.

Next, the system identifies the schemas and data output formats of the relevant skills. These schemas and output formats are used to structure the new data for presentation within the new block. The system also identifies a desired presentation schema for the new block, which is based on the user contexts and the application contexts.

Once the relevant skills, data, schemas, and output formats have been identified, the system uses the identified modules to normalize the new data into the desired presentation schema. This involves transforming or converting the new data into a format or structure that aligns with the desired presentation schema. The normalized data is then integrated into the new block for presentation within the canvas.

The new data block is displayed on the canvas alongside the existing blocks. The system ensures that the new block is visually distinct and easy to interact with, allowing the user to easily distinguish the new data from the existing data. The new block is also dynamically positioned on the canvas based on the user's interaction patterns and preferences, ensuring that the new data is presented in a manner that is intuitive and user-friendly. In other instances, the new block replaces an existing block, as will be described in more detail below.

By generating new data blocks based on the inferred desired user action, the system provides a dynamic and personalized skill discovery experience. The user can explore new data and gain additional insights, and the system can adapt and respond to the user's evolving requirements and preferences.

In some instances, the system is designed to select a particular menu from a plurality of different menus based on the inferred desired user action. This selection process is dynamic and context-sensitive, ensuring that the menu selected aligns with the user's specific requirements and preferences.

Each menu within the system corresponds to a different inferred desired user action. For example, one menu might correspond to the action of generating a new data block, while another menu might correspond to the action of modifying an existing block. The system is designed to recognize the user's input and infer the desired user action, and then select the corresponding menu.

Each menu includes one or more interactive user interface elements. These elements could be buttons, sliders, checkboxes, text fields, or any other type of interactive element. When selected, these elements cause the system to perform the inferred desired user action. For example, if the user selects a button in a menu that corresponds to the action of generating a new data block based on an analysis of an existing block, the system will initiate the process of generating a new data block after causing the analysis on the existing block of data.

The system's ability to select a particular menu based on the inferred desired user action provides a dynamic and personalized user experience. The user can interact with the system in a meaningful and productive way, and the system can adapt and respond to the user's specific requirements and preferences in a timely and efficient manner.

FIGS. 1-6 illustrate examples of user interfaces and system configurations that may be used by and/or incorporated with embodiments of the invention.

FIG. 1 illustrates a user interface comprising a canvas with a plurality of display blocks presented. The display blocks shown include one or more blocks of text content (e.g., text from an article), one or more blocks of image content (e.g., an image from a camera or photo application), one or more blocks of audio/visual content (e.g., a link to a channel or video online), one or more blocks of graph/chart content (e.g., a chart from a table or spreadsheet application), one or more blocks of mixed text and image content (e.g., an article from the Internet), and a block of suggestions that are provided by the system regarding possible new sources of content or skills to use when processing data and/or other suggestions.

Each of the blocks of content are preferably populated with content that is determined to be relevant to a user and that was automatically selected, in response to instantiating the interface/canvas, at least in part based on the system considering the context of the user and, optionally the context of the application presenting the interface and/or that provide the data being presented. The system may query the applications for the application context and the data to be presented. The system may also query user-related files to identify user context (e.g., calendar files to identify current and upcoming events and meetings, location service files reflecting a user location, enterprise organization files to identify a user portion or title, etc.). The system may use the user context and application context to identify potentially relevant skills (e.g., applications, services and sources of information). The system will then instantiate and/or query these skills for information to be obtained from the skills and processed by the system for display within the blocks of the canvas.

In some instances, the links to the skills themselves are presented within the blocks (e.g., a link to a user subscribed news service or multimedia source). In other instances, the blocks only contain data that has been obtained from the skills/sources, so that a user does not have to perform any additional work to see the processed data.

The canvas is preferably dynamic, such that when a user interacts with any piece of the data presented, the entire canvas may be updated with new data that may be more relevant to the context of the user and the data/application being interacted with. This may include replacing and/or augmenting the existing blocks with new blocks of data.

Figure 2:
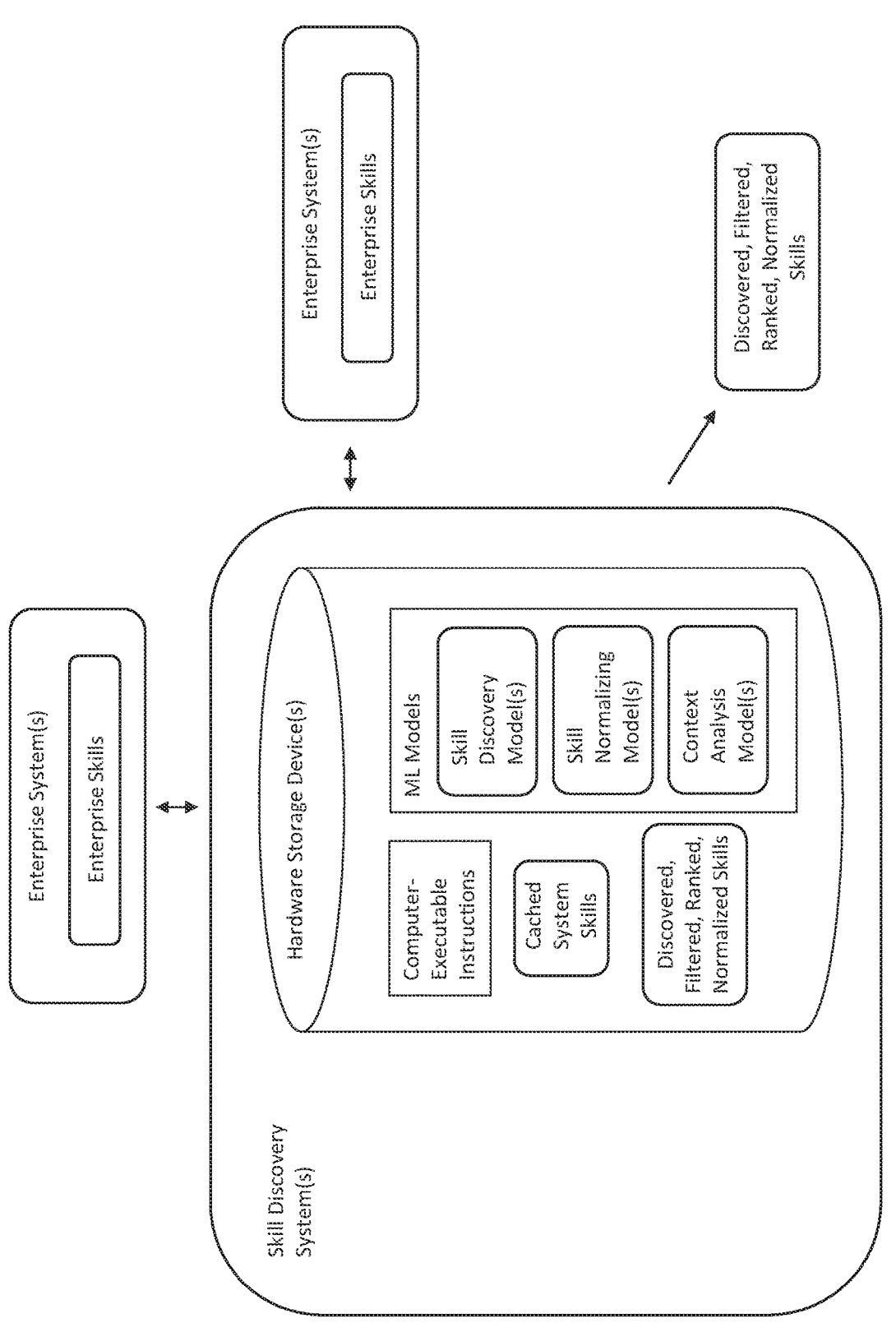

FIG. 2 illustrates a skill discovery system with hardware storing computer-executable instructions for implementing the disclosed functionality and methods described herein. The system may also store models, such as machine-learning models that are trained on training data for implementing the described and referenced functionalities.

For instance, a first model may comprise a machine-learning model trained on training data comprising pairings of user information, paired with context classifications or identifiers, which train the model to determine a context of a user when it is applied to new user information. This model or a related model can also be trained on application status information to identify a status of an application and potential relevance to a user and user context information.

The system applies these models to the user information and application information that is available to the system when performing the skill discovery process. This information may be stored in files, tables and registries that the models are trained to search, which are associated with the user and/or application(s).

The system may also store or use a skill discovery machine-learning model that is trained on training data comprising pairings of user contexts and, additionally or alternatively application contexts, and skills to evaluate relevance of the pairings. Such a model can be applied to the identified/discovered user contexts and/or application contexts to identify, rank and filter relevant skills from a set of total available skills. The ranking and filtering may be performed, for example, to limit the skills to only a predetermined quantity of skills or a flexible amount of skills that are determined to satisfy a predetermined threshold of relevance.

Once the skills are discovered and ranked/filtered into a subset of relevant skills to be used for the canvas presentation, the system will identify the relevant normalizing modules that are essential for normalizing the formats of the data output from the relevant skills into a desired presentation format for the canvas. The skill normalizing models can be trained to perform transformations of data from a first format (an output format used by the skills) into a desired presentation formation.

The presentation format can be a default format and/or a user defined format. In some instances, the presentation format is a format the system automatically determines and/or selects from a plurality of possible formats based on the determined context of the user. (e.g., a presentation in a particular language associated with the user, a presentation format that includes a font size or color scheme associated with an application state used by an application the user recently interacted with, etc.). The presentation format may also comprise a format corresponding to an application state used to render the interface and/or that corresponds to a user preference (e.g., an image resolution format that may require upscaling or downsampling of images provided by a particular skill).

The system will then use the normalizing modules that are identified to transform the output from the relevant skills into the formats presented within the canvas. A non-limiting example will now be provided to illustrate this point.

Figure 3:
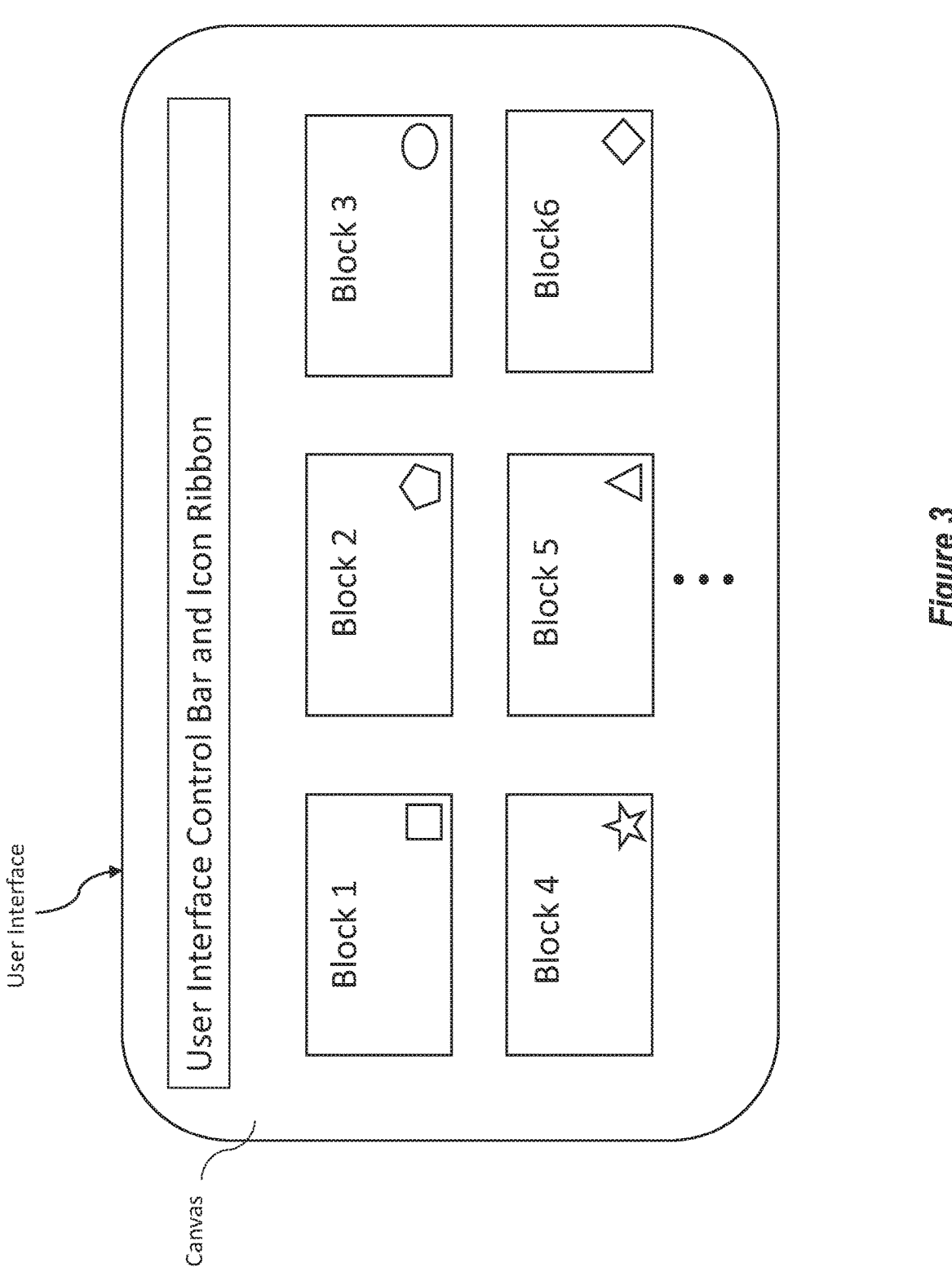

As shown in FIG. 3, the canvas of the user interface includes six blocks of content that each contain content from a different skill and that may each comprise a different format or type of content. In this illustration, for example, Block 1 includes content having a format/type represented by the square shape, Block 2 includes content having a format/type represented by the pentagon shape, Block 3 includes content having a format/type represented by the circular shape, Block 4 includes content having a format/type represented by the star shape, Block 5 includes content having a format/type represented by the triangle shape, and Block 6 includes content having a format/type represented by the diamond shape.

FIG. 3 illustrates how this content may have come from all different third-party sources. In other embodiments, at least some of the content is obtained from the server system or the client system, rather than a third-party system. The skills used to process the data may also reside on any combination of the client, server and/or third-party systems.

According to disclosed embodiments, the system will not only identify and utilize the relevant skills to obtain the contextually-relevant data to be rendered on the canvas, but the system will also identify and apply the normalizing modules to normalize the skills/skill content for display in the canvas according to the preferred format(s).

Figure 4:
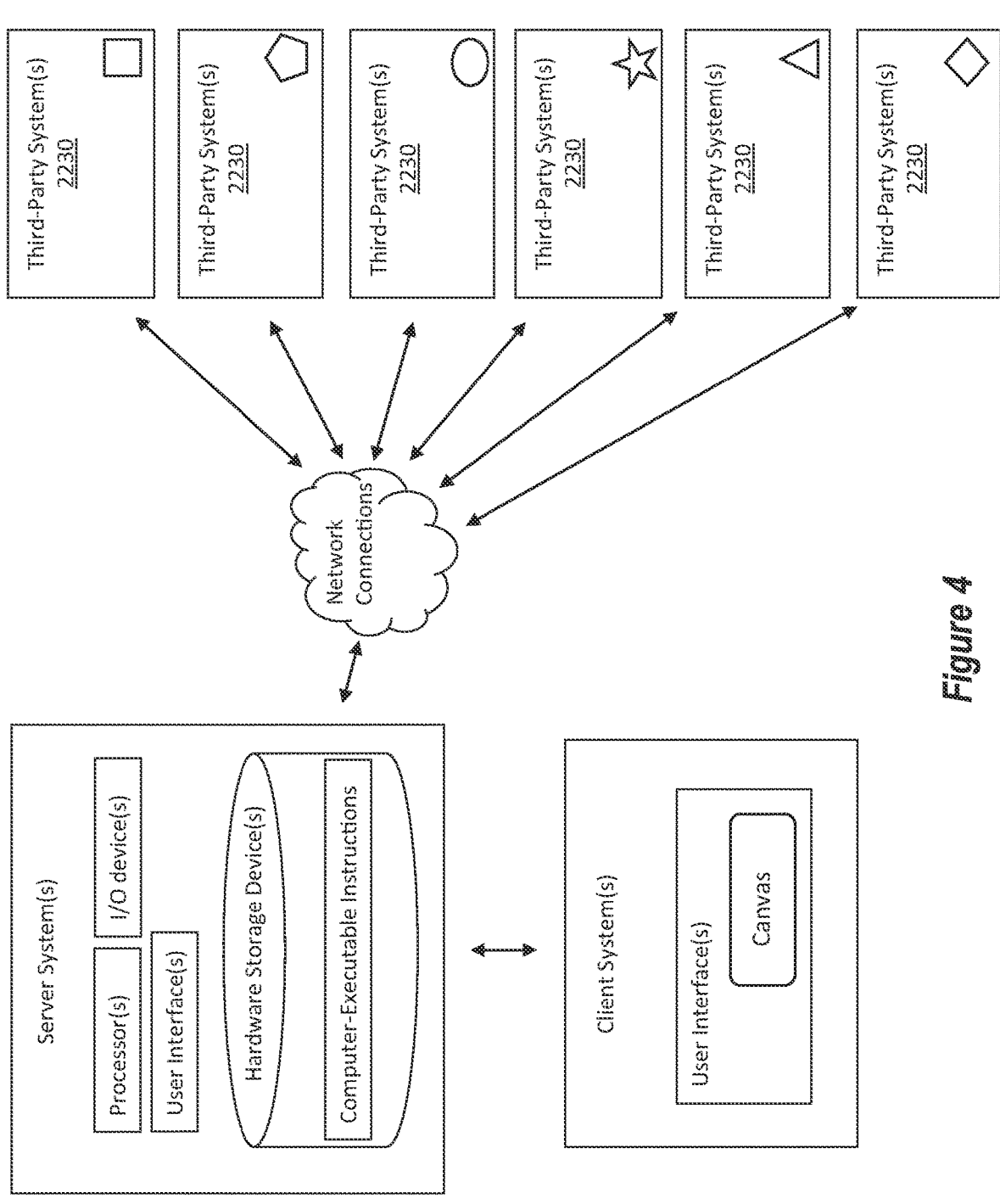
Figure 5:
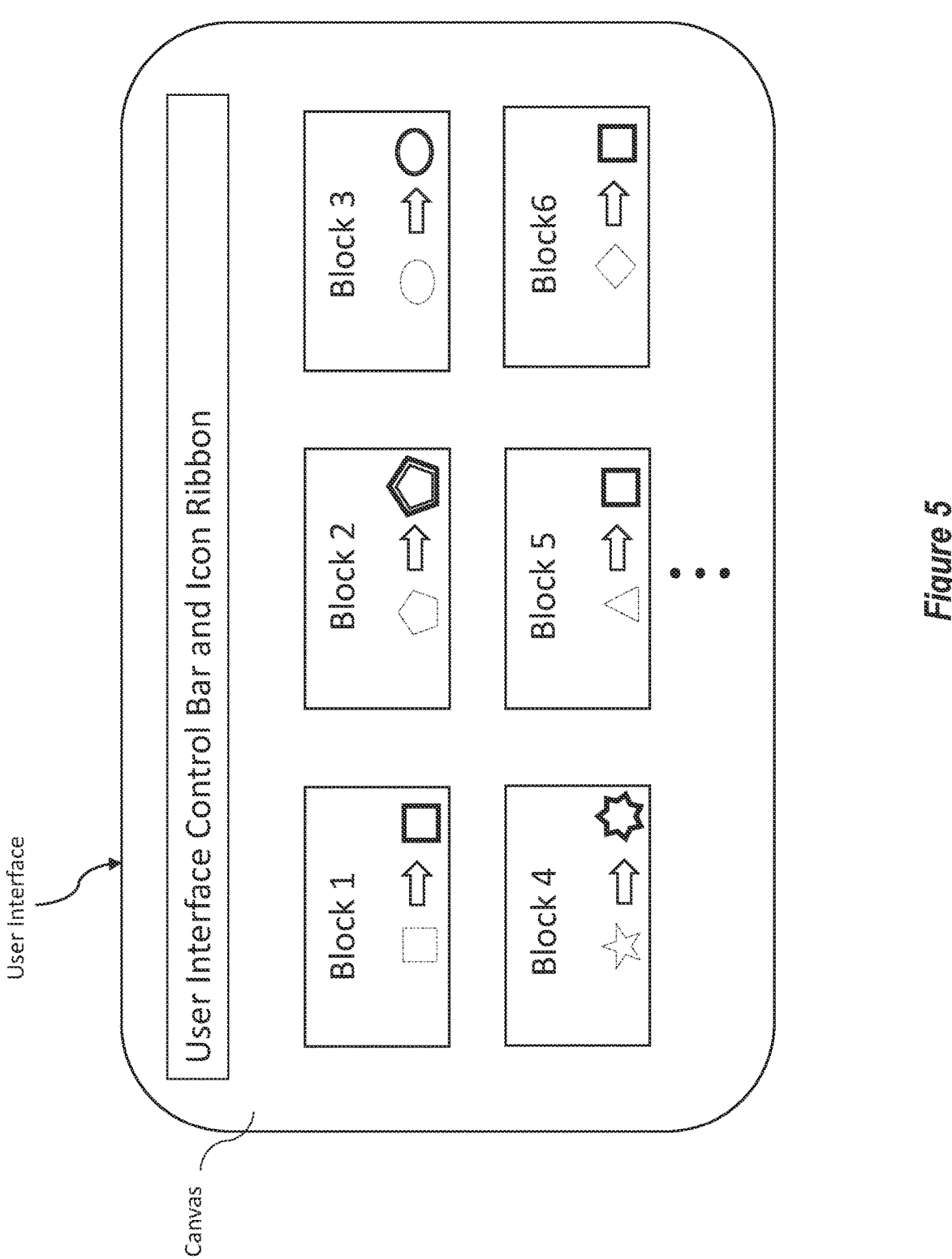

This is shown in FIG. 4, for example, by converting the formats/types of the content from a first format, into the transformed and preferred formats. In this example, the text of content of Block 1, Block 5 and Block 6, is changed from their default output formats/types into the preferred format (represented by a bold square). Likewise, the image content of Block 2 and Block 3 is changed from their default skill output lower resolution formats (represented by dashed lines) into a higher-resolution formats (represented by the enhanced bolded and double lines). Additionally, the graphs/charts in Block 4 are converted from a first graph or chart type (e.g., a table or line graph, and as represented by the five-pointed star), into a second type of graph or chart (e.g., a pie chart or histogram, and as represented by the seven-pointed star).

Figure 6:
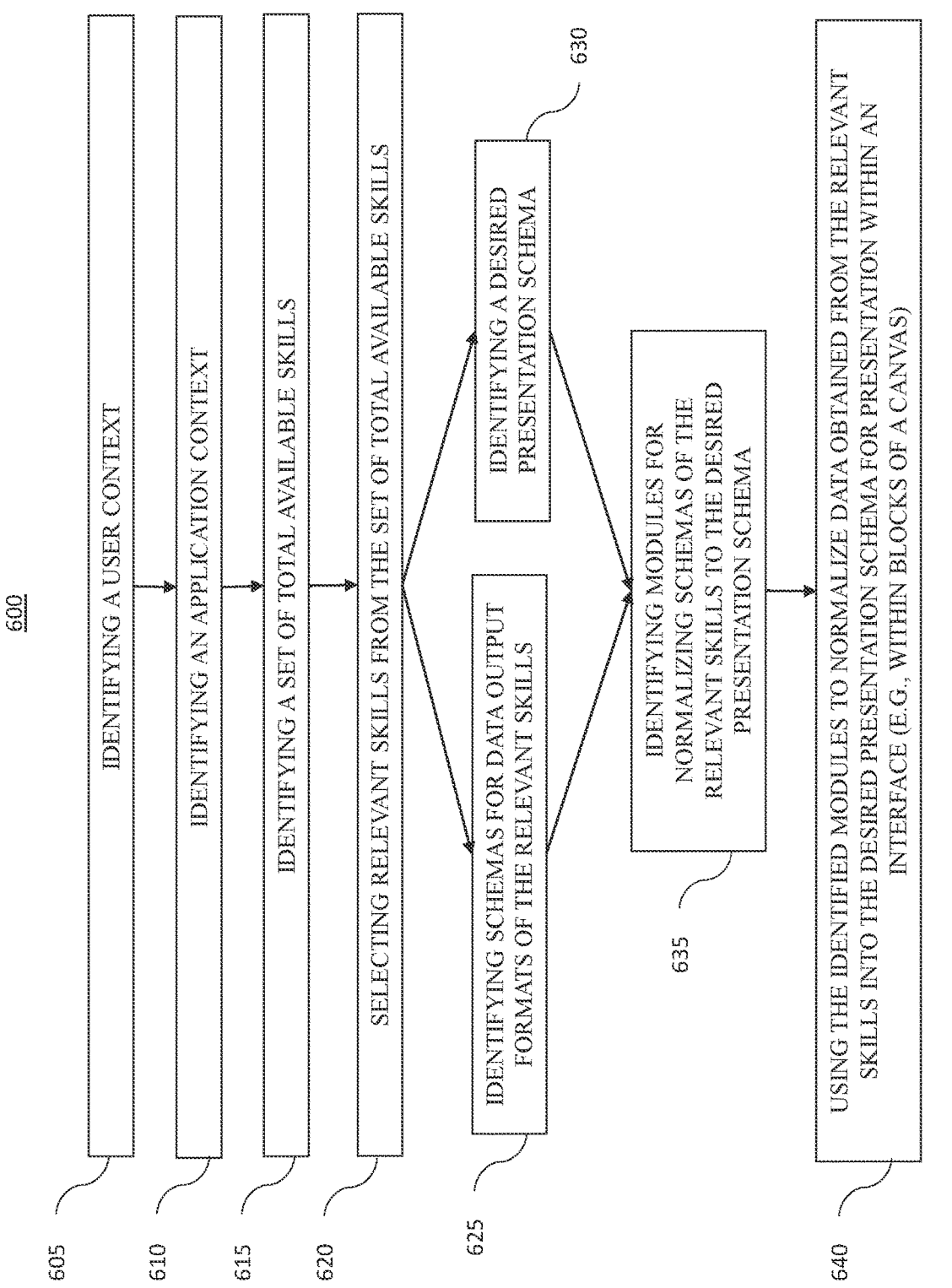
FIG. 6 illustrates an example flow charts of acts associated with methods for discovering and using skills that are contextually relevant to a user to facilitate the processing and presentation of content that is relevant to a user.

FIG. 6 illustrates a flow chart 600 of acts associated with methods for performing the skill discovery processes just described, for managing a discovery of relevant skills and data for a user that are contextually relevant to the user and for facilitating processing of the skills and data for presentation within blocks of a canvas displayed to the user within a user interface.

As shown, the methods include an act of a system identifying a user context, the user context including at least a user profile and location (act 605), and an act of the system identifying an application context, the application context including at least a type of application used to instantiate a user interface containing the canvas and one or more applications that are instantiated and used to generate data that is presented within the blocks of the canvas within the user interface (act 610).

The methods also include the system identifying a set of total available skills accessible to the user through the system which are configured to generate and/or process data (act 615) and selecting relevant skills from the set of total available skills accessible to the user to gather and process data for display within the blocks of the canvas, the system selecting the relevant skills by filtering the set of total available skills based on at least the user context (act 620).

The methods also include the system identifying schemas for data output formats of the relevant skills (act 625), identifying a desired presentation schema for a desired data presentation format for display within the blocks of the canvas, the desired presentation schema being based on at least the user context and the application context (act 630), identifying modules for normalizing schemas of the relevant skills to the desired presentation schema (act 635), and using the identified modules to normalize data obtained from the relevant skills into the desired presentation schema for presentation within the blocks of the canvas (act 640).

The methods may also include displaying data obtained from the relevant skills within the desired presentation schema within the blocks of the canvas. The canvas preferably includes at least two different blocks, each of the at least two different blocks including different data obtained from at least two different relevant skills, respectively.

As described herein, the methods also include the system inferring an inferred desired user action based on detecting a user input interacting with data presented within a particular block of the canvas as well as based at least in part on the user context and the application context.

Then, based on the inferred desired user action, the system determines whether to generate a new data block in the canvas with new data related to data contained within the particular block.

In some instances, the inferred desired user action and corresponding system result comprises generating the new data block in the canvas with new data that is normalized by the identified modules for normalizing schemas of the relevant skills to the desired presentation schema. These blocks may be displayed simultaneously.

In other instances, the system generates the new data block in the canvas and displays the new data block by replacing the particular block of the canvas with the new data block in the canvas.

In some instances, the methods include the system selecting a particular menu from a plurality of different menus based on the inferred desired user action, wherein different inferred desired user actions correspond to different menus, the particular menu including one or more interactive user interface elements that, when selected, cause the system to perform the inferred desired user action. By way of example, a first menu may include options for changing a chart type, while other menus selected from may be to compare the data to other displayed data, or to provide a prompt field for applying a machine-learning model to the data based on a prompt, etc.

In some instances, the modules identified for normalizing the schemas of the relevant skills to the desired presentation schema comprise modules for translating data obtained from the relevant skills into a language of the desired presentation schema for presenting the data obtained from the relevant skills in the canvas. This may include human spoken languages (e.g., Spanish to English). In other instances, this may include code languages (e.g., transforming or translating C# code to Python code).

The modules for normalizing the schemas of the relevant skills to the desired presentation schema may also comprise modules for modifying a font for data obtained from the relevant skills into a language of the desired presentation schema for presenting the data obtained from the relevant skills in the canvas.

The modules for normalizing the schemas of the relevant skills to the desired presentation schema may also comprise modules for converting data obtained from the relevant skills into a graph or chart format to be used by the desired presentation schema for presenting the data obtained from the relevant skills in the canvas.

As described, the identified and relevant skills may comprise one or more applications and/or models configured to process data. In some instances, the skills may also comprise the data presented within the canvas blocks, such as when presented as hyperlinks to the skill sources or applications.

It is noted that the relevant skills may comprise skills accessed from a source remote from the system and/or from locally stored repositories (e.g., temporary cache and persistent storage).

Figure 7:
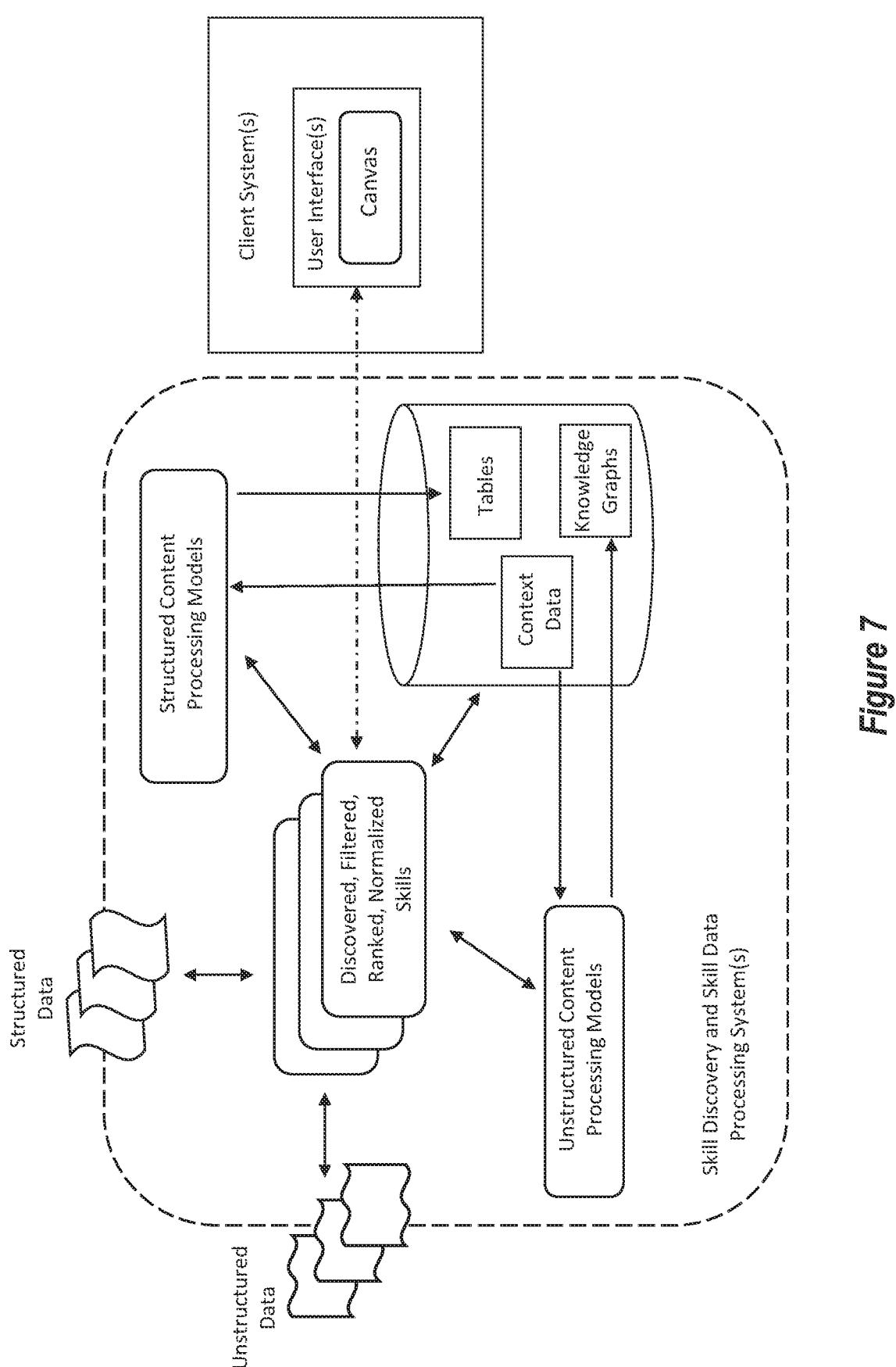
FIG. 7 illustrates an example of a skill discovery and skill data processing system processing data for a user interface.

Attention will now be directed to FIG. 7, which illustrates a general flow for processing data by the skills that are identified.

In FIG. 7, the system that performs the skill discovery is consolidated with or centralized with the same system that processes the data obtained by the skills. In other embodiments, the systems are distinct or distributed among a plurality of different nodes and locations.

In FIG. 7, the system uses the discovered and relevant skills to obtain data for presentation in the interface(s), such as the canvas described herein.

The data that is obtained can include both structured data (e.g., data that has a defined schema and/or index associated with the data, such as tables, forms, spreadsheets, and other data that is generally maintained in a format that is independently searchable) as well as unstructured data (e.g., data that is stored in a native format, such as audio, video, notes, social media posts, images, and other data that is generally not stored in an independently searchable format).

The system may use the skills to obtain the different types of data, which may be relevant, or which a portion of the data may be relevant to a user, since the skills used to obtain the data and which were selected in part on the user context. Once the data is obtained, the system will process the data differently, depending on whether the data is structured or unstructured.

For structured data, the system will index the data in tables that are easily searchable and which can be used by the system to further identify the portions of the stored structured data that is relevant to a user based on the context of the user and the application context at any given moment (e.g., an application context can be a user interactions with portions of the displayed data in the canvas, for example, as well as a mode of a cursor interacting with the data, as will be described in more details below).

In some instances, the system will use trained models that are trained on generating tables from structured data. The tables may be built as structured query language (SQL) type tables to facilitate the cross-referencing of data that may be contextually relevant to a user and to facilitate comparisons and analysis of the data to other stored data.

The system may store and index all of the structured data obtained by the selected and relevant skills for a user, based on a current interface session the user is interacting with. The data may be stored in cache, for instance, to avoid over burdening the system will storing the data when the user is no longer using the interface to interact with the data.

In other instances, the data is stored more persistently and may be proactively obtained and stored even before the user interacts with the data. The system may, for instance, access user context data from an enterprise file system when the user is offline or not interacting with the interface, to proactively obtain information for the user to reduce latency during the interactive session.

In some instances, the data that is stored in the tables is only a filtered subset of the structured data obtained from the skills. In particular, the system may use structured content processing modules to determine which content meets certain relevance thresholds to a user, based on user context and/or application context during an interactive interface session. These modules may be trained on training data pairs of structured data and context information to determine context relevance. Then, the system may refrain from storing data that does not meet predetermined thresholds of relevance. This may include storing portions of a structured file, but not all of the structured file, in a table that is associated with the user and/or user context for subsequent display and interaction by the user interfaces described herein.

The system may also process and store unstructured data in a similar manner. However, rather than generating tables with the structured data that is determined to be relevant, the system will analyze and generate knowledge graphs of the unstructured data. This may include identifying and applying unstructured content machine-learning models to the unstructured data. These models are trained to classify unstructured data in various formats. For instance, an image processing model can be trained to identify and classify objects and people within an image. Likewise, speech processing models can be trained to identify speakers, themes, and transcriptions of the content spoken within an audio file. These are just two non-limiting examples.

The system will identify a type of unstructured data and will apply one or more of the unstructured content processing models to the unstructured data to classify the data and to generate corresponding knowledge graphs of the classified data. Then, the system will store all of the classified data and knowledge graphs for that data, or only a subset of the classified data and/or knowledge graphs that are determined to be relevant to a particular user and user session, for example, as described earlier with regard to the structured data. By way of example, the system may store only a sub-portion of an audio file (e.g., storing only a few minutes of a file lasting many minutes). By way of another example, the system may store only a few images of a video that are determined to be relevant to a user. Likewise the system may only classify and store a knowledge graph of content that may be contextually relevant to the user and while refraining from classifying and storing or building knowledge graph records for content that is determined to be irrelevant to the user or application context.

In some instances, after processing the unstructured data, the unstructured data becomes structured and can be processed according to the structured data. For example, an audio file that is unstructured can be processed into a transcript that is structured.

After the data is processed and stored, the system identifies the contextually relevant data to be presented within a user interface, such as within a canvas, wherein different blocks within the canvas present different contextually relevant information. In some instances, the system, upon invoking the interface, identify the contextually relevant skills that are relevant for the context of a particular user and use those skills to obtain the relevant data processed by those skills, respectively. This may be done dynamically, on the fly from remote and/or local sources, generating the tables and knowledge graphs at the same time. Additionally, or alternatively, the system may use the tables and knowledge graphs mentioned above (which may have already been generated and stored during previous processing) to identify the relevant data to be obtained in response to new queries or requests to local and/or remote storage locations. Then, once the corresponding data is obtained, it may be displayed within the interface canvas.

FIG. 8 illustrates a flow chart 800 of acts associated with methods for processing structured and unstructured data based on user context for facilitating presentation of contextually relevant data to a user.

As shown, the acts include identifying a user context and/or an application context (act 805) and relevant skills that are accessible to the system to gather and process data for display within blocks of a canvas of an interface (act 810). The system also identifies data obtained from the relevant skills (act 815) and determines whether the data is structured or unstructured data (act 820).

Thereafter, the system processes the data by generating (i) knowledge graphs for any unstructured data with knowledge graph records for portions of the unstructured data that are determined to be contextually relevant to the user context and (ii) tables for the structured data with table records for portions of the structured data that are determined to be contextually relevant to the user context (act 825).

Then, during a user interface session in which a user is presented the interface, the system will use the knowledge graphs and the tables to identify contextually relevant data to be displayed within the blocks of the canvas based at least in part on the user context (act 830).

Finally, the system selectively presents a filtered set of the data obtained from the relevant skills by presenting the contextually relevant data identified with the knowledge graphs and the tables while refraining from presenting other portions of the data obtained from the relevant skills that are determined to be contextually irrelevant, or at least less relevant than the contextually relevant data, based on the user context (act 845). This relevance can be determined by a trained model that has been trained to evaluate and rank content based on relevance associated with queries, keywords, user profiles and/or application contexts, etc.

Various examples of these acts are shown in the following figures.

Notably, as described earlier and to save processing resources, the system may refrain from classifying portions of the unstructured data that are determined to be contextually irrelevant to the user context and refraining from storing a knowledge graph record for the portions of the unstructured data that are determined to be contextually irrelevant to the user context. Likewise, the system may refrain from generating table records for portions of the structured data that are determined to be contextually irrelevant to the user context.

In this manner, the system may obtain and present information that is most relevant to a user at any given time. The data that is processed and presented may be the original content provided by the source, or a filtered subset of the data. For instance, the system may only classify and present certain objects of an image, rather than the entire image.

Likewise, the system may generate a transcript of an audio file during processing of the unstructured audio file and present only a portion of the transcript to the user that is determined to be relevant to the user based on a user context (e.g., presenting a user with a summary portion of the transcript in preparation for an upcoming meeting with a speaker that is identified in the transcript).

When a user submits a query for the system to perform an analysis of a document or content within one of the blocks of the canvas, the system may reference the index to identify portions of the document and content that are contextually relevant to the query and submit those portions of the contextually relevant content to a LLM or third-party analysis model to perform specialized analysis on the selective portions of content within a query and without transmitting the entirety of the referenced content or document. This can help reduce computational expense in transmitting content in queries and can help reduce the tokens utilized when submitting queries to a LLM, for example. This is particularly helpful when the query references a link to a document that has been indexed by the system and that is very large.

In some instances, and in an effort to promote efficient management and storage of the indexes and knowledge graphs that are generated, the system will apply an expiration attribute to the indexes and knowledge graphs that will cause the indexes and knowledge graphs to be deleted from the system after a predetermined period of time (e.g., one day, one week, one month, or another time period). The expiration time period applied to any of the indexes and knowledge graphs may also be reset, automatically, upon the indexes and/or knowledge graphs being referenced in response to a user query. This way, the system can avoid storing information that is not as contextually and temporally relevant, while still preserving the indexes and knowledge graphs that are determined to be useful and relevant for current or anticipated tasks based on evaluated file usage. By way of example, the expiration attribute can be implemented as a last accessed file attribute in combination with a file management rule that actively evaluates the accessed file attributes of the different indexes and knowledge graphs and that automatically deletes any files (e.g., indexes or knowledge graphs) that have a last accessed time or date that is more than a predetermined duration of time from a current time or date.

Accordingly, in reference to the flowchart of FIG. 8, it will be appreciated that the disclosed methods may also include automatically deleting an index or knowledge graph upon determining the index or knowledge graph was last accessed a predetermined period of time prior to a current period of time.

FIG. 9 illustrates a flow diagram 900 of a related method for providing a personalized data processing experience during an interactive user interface session.

As shown, the method includes identifying a user context (act 905), and identifying relevant skills that are accessible to the system to gather and process data for display within blocks of a canvas of an interface that are relevant to the user context (act 910).

Next, the system uses the identified relevant skills to identify data to be presented within the blocks of the canvas (act 915) and selectively presents a filtered set of data obtained from the relevant skills within the blocks of the canvas (act 920).

Then, the system detects a user interaction with data in a block of the canvas (act 925) and determines a mode of a cursor used during the user interaction, the cursor being associated with at least two modes of operation, the two modes of operation including a traditional mode and an artificial intelligence (AI) mode (act 930).

Then, in response to determining the mode of the cursor used during the user interaction was the AI mode, the system selectively generates new content based on the user interaction with the data to be presented in the canvas, the new content being at least partially based on the data which was interacted with and that is also at least partially based on the user content or, alternatively, in response to determining the mode of the cursor used during the user interaction was the traditional mode, the system refrains from generating new content based on the user interaction with the data to be presented in the canvas (act 935).

Various examples of these acts are shown in the following figures.

The disclosed methods also include additional related embodiments, such as the referenced normalizing of the format of the new content to match a format of the data interacted with. These embodiments may also include replacing the data in the block of the canvas with the new content or, alternatively, displaying the new content in a new block of the canvas simultaneously with the data interacted with in the block of the canvas.

Other embodiments include presenting a user a prompt field during the user interaction, detecting a prompt input from a user, and causing the prompt to be processed by a machine-learning model during the generation of the new content.

Advanced Cursor Interactions

As described herein, many of the disclosed methods begin with the display of content on a user interface, such as within blocks of a canvas, wherein each block may display content from different sources and that is determined to be contextually relevant to a user and/or that has been explicitly selected for display by the user. The content can be any form of information that can be presented to a user on a display device, including but not limited to text, images, charts, and graphs. The content can be static or dynamic, and it can be generated locally or retrieved from a remote source.

When the user uses the cursor prompt to make a selection of content (referred to herein as selected content or selectable content), the system detects this selection. The detection of the selection can be based on various factors, such as the position of the cursor, the type of content selected, or the user's interaction with the cursor prompt.

Upon detecting a selection of content, the system determines whether the cursor is in an artificial intelligence (AI) cursor mode during the selection. The AI cursor mode is a state of the cursor that enables additional, intelligent functionality based on the context of the user's current task or the content they are interacting with, as well as the user's own personal context information. The determination of whether the cursor is in the AI cursor mode can be based on various factors, such as the user's settings, the type of content selected, or the user's interaction with the cursor prompt and/or prompt icons.

The AI cursor mode is a specific state of the cursor that enables additional, intelligent functionality based on the context of the user's current task or the content they are interacting with. The determination of whether the cursor is in the AI cursor mode can be based on various factors. For instance, the user's settings, the type of content selected, or the user's interaction with the cursor prompt can all influence the determination of the AI cursor mode. In some cases, the AI cursor mode may be manually selected by the user, while in other cases, the system may automatically switch to the AI cursor mode based on the detected context.

When the cursor is determined to be in the AI cursor mode during the selection of content, the system identifies a plurality of different functions that can be applied to the selected content. These functions are not just identified, but also displayed in a new cursor prompt interface on the user interface. The functions that are identified and displayed can vary based on the context of the user's current task or the content they are interacting with. For example, if the user is interacting with a text document, the functions might include options for formatting the text, checking the spelling, or translating the text into another language. If the user is interacting with an image, the functions might include options for editing the image, adding annotations, or searching for similar images.

The functions that are identified and displayed can be a filtered subset of the total functions identified, such that only a predetermined quantity of functions are displayed and/or functions that are determined to meet a predetermined threshold of relevance, wherein the relevance determination is made for the functions based on a ranking model trained to evaluate relevance based on predetermined parameters related to user contexts, types of content, interface states and/or functionalities that may be relevant to the user.

The identification and display of these functions in the AI cursor mode provide the user with a range of options for interacting with the selected content, thereby facilitating multiple functionalities through the cursor prompt interface. This can enhance the user's experience by providing them with contextually relevant functions that can be applied to the selected content, thereby reducing the amount of time and effort the user has to spend on navigating through menus or performing manual tasks.

In contrast to the AI cursor mode, there is a scenario where the cursor is not in the AI cursor mode during the selection of content. This could be due to various factors such as user preference, system settings, or the nature of the task at hand. For instance, the user might prefer to use the traditional cursor mode for simple tasks that do not require advanced functionalities, or the system might automatically switch to the non-AI cursor mode when the user is interacting with content that does not support AI functionalities.

When the cursor is determined to be not in the AI cursor mode during the selection of content, the system behaves differently compared to when the cursor is in the AI cursor mode. Specifically, the system refrains from displaying the at least one function in the new cursor prompt interface on the user interface. This means that the user is not presented with the additional functions that can be applied to the selected content, as they would be in the AI cursor mode. Instead, the cursor prompt operates as a traditional cursor prompt.

The benefits of providing the cursor prompt interface to the user with the different functionalities should be apparent and are very diverse. By way of example, if the user is interacting with a text document, the system might identify functions related to text editing, such as formatting, spell-checking, or translation. If the user is interacting with an image, the system might identify functions related to image editing, such as cropping, resizing, or color adjustment. If the user is interacting with a chart or graph, the system might identify functions related to data analysis, such as trend analysis, data filtering, or data visualization. In each case, the functions that are identified are contextually relevant to the user's context, thereby enhancing the user's experience and facilitating multiple functionalities through the cursor prompt interface.

The user can also make multiple selections of different types of content and the system can consider possible functions that might be relevant to the different content selections, such as compare and analyze similarities and/or differences. The system can generate graphs or charts that visually represent the analyzed data.

The functions and functionalities identified can be provided by models that are trained to perform the referenced functions and that are stored locally and/or remotely.

Furthermore, the system is capable of dynamically updating the identified functions based on changes in the user's context. For instance, if the user switches from interacting with a text document to interacting with an image, the system can update the identified functions to reflect this change in context. This dynamic updating of the identified functions ensures that the functions that are displayed to the user are consistently relevant and useful, regardless of changes in the user's context.

In some scenarios, the user input at the new cursor prompt interface causes the system to replace the selected content. This involves receiving user input at the new cursor prompt interface, such as a command to replace the selected content, and replacing the selected content with the new content after performing the at least one function. The replacement of the selected content can be achieved through various means, such as overwriting the selected content with the new content, deleting the selected content and inserting the new content in its place, or moving the selected content to a different location and inserting the new content in the original location of the selected content.

In other scenarios, the system generates and displays the new content concurrently with the selected content in the user interface after performing the at least one function. This involves generating the new content, such as a transformed version of the selected content or additional content related to the selected content, and displaying the new content on the user interface alongside the selected content. The concurrent display of the new content and the selected content can provide the user with a side-by-side comparison of the original and transformed content, or a comprehensive view of the selected content and related content.

In each of these scenarios, the system facilitates multiple functionalities through the cursor prompt interface by enabling the user to interact with the selected content in various ways, such as transforming the content, accessing related content, or replacing the content. This enhances the user's experience by providing them with a range of options for interacting with the selected content, thereby reducing the amount of time and effort the user has to spend on navigating through menus or performing manual tasks.

Some aspects of the invention also include managing the utilization and switching of modes for a multi-modal cursor or cursor prompt that is used to trigger the generation and display of the referenced cursor prompt interfaces when the cursor prompt is in an AI cursor mode, for example.

In some embodiments, user interfaces are presented with selectable content, along with a cursor prompt for a multi-modal cursor. A traditional cursor mode icon and an artificial intelligence (AI) cursor mode icon are also displayed within the user interfaces. The systems determine which mode of the multi-modal cursor to activate and utilize based on user input selecting either the traditional cursor mode icon or the AI cursor mode icon. User selection of the traditional cursor mode icon activates the first cursor mode and user selection of the AI cursor mode icon activates the second cursor mode.

In some aspects, a user interface is presented with one or more display blocks (also referred to as frames), each containing selectable content. The selectable content may include, but is not limited to, text, images, charts, or graphs. The user interface also presents a cursor prompt for a multi-modal cursor. This multi-modal cursor is associated with two distinct modes: a first cursor mode and a second cursor mode.

The first cursor mode is a non-contextual functionality mode. In this mode, the cursor operates in a traditional manner, allowing the user to select and/or manipulate the selectable content (e.g., select, copy, paste and sometimes edit the selected content) within the display blocks. The second cursor mode is a contextual functionality-enabling mode. This mode leverages artificial intelligence (AI) technologies to provide enhanced functionality based on the context of the user and the context of the application or user interface instance.

The context of the user can include a user position or title, historical or preference data that indicates how a user has interacted with or prefers to interact with different types of data (e.g., image data, text data, multimedia data, and other data types). The context of the user can also include a previous action, such as a previous selection of data, a navigation with the interface, opening an application, or a query submitted by a user. The context of the user can also include authorizations, subscriptions, and services associated with the user. The context of the user can also include calendar information and other personal information associated with temporal scheduling and events associated with the user. User context data may also include geographic and language preferences. User context data may also include education level, job description and financial information about the user.

The system may use the context of the user and/or the context of the application and/or interface instance when selecting a functionality from a plurality of different functionalities to apply to selected content that is selected by the cursor prompt when the cursor prompt is in the AI cursor mode, as described in more detail below. The functionality may be a functionality, for example, to compare or analyze the selected content with other previously selected content or to apply a machine-learning model to the selected content, such as a model trained to perform a particular task.

By way of example, the selection of the content with the cursor prompt when that prompt is in the AI cursor mode may cause the system to determine to perform a translation of selected text based on a language of the user or a previously performed task (e.g., to translate a passage of selected text from one language to another language associated with the user). Another task that may be selected, by way of example, is a task to convert the selected text to audible speech with a text-to-speech model, based on context of the user, for example, or a context of the application or interface instance (e.g., a user has recently opened an application related to text-to-speech functionality). Another example includes selecting a functionality to perform a transformation on image data (e.g., modifying an image with a particular transform, to enhance a resolution or apply a filter). Another example includes determining that data should be presented in a table or chart format, or alternatively, to change the table or chart/graph format from a first format (e.g., a line chart) to a second format (e.g., a pie chart).

The system preferably identifies different functionalities that are available to the user, based on the context information referenced above. The system also identifies and selects a function from the plurality of different functions that could be applied, based on the context information and which may also include a type of content being selected, and then generates a call or command for a corresponding model or executable to be applied to the selected text to perform the selected functionality.

When multiple functionalities are determined to be available and relevant to a selection of content by the cursor prompt (when in the AI cursor mode), the selection of the content will generate a corresponding cursor interface (also referred to herein as a cursor prompt interface) that presents one or more of the identified functionalities determined to be available and relevant to the selection of content. At least one of the identified functionalities includes an interaction with a remote machine learning model. In some instances, the identified functionalities presented within the cursor interface include an option to generate and replace selected content or a generate and display new corresponding content with the selected content.

To enable the foregoing processes, the system determines a type of content that is selected in response to detecting content has been selected. The system may determine a type of content based on metadata and identifiers contained with or associated with the data. The system may additionally, or alternatively, periodically apply a model trained to identify content types to the different content that is presented within the user interface.

The different context information and the different tables mapping the content types and functionalities and models that may be applied to the different content types are stored within storage of the system or within an accessible storage of a remote third-party system.

Within the user interface, both a traditional cursor mode icon and an AI cursor mode icon are presented. These icons serve as visual representations of the two modes of the multi-modal cursor. The user can switch between the two modes by selecting the respective icons. Specifically, user selection of the traditional cursor mode icon activates the first cursor mode, while user selection of the AI cursor mode icon activates the second cursor mode. This allows the user to easily and quickly switch between the two modes of the multi-modal cursor, depending on their current task or preference.

The user interface provides a visual platform for the user to interact with the multi-modal cursor and the selectable content. The user interface is designed with one or more display blocks or frames that each contains different selectable content and, sometimes, content of different types (e.g., a first block/frame may include content from a first source and be of a first type, such as text, and the second block/frame may include content from a second source and be of a second type, e.g., an image type or a chart/graph type data. It will be appreciated, in this regard, the selectable content can take various forms, including but not limited to, text, images, charts, or graphs. The specific type of selectable content presented within the display blocks can vary based on the specific application or task at hand.

Within the user interface, a cursor prompt for the multi-modal cursor is presented. The cursor prompt serves as a visual representation of the multi-modal cursor, allowing the user to see where the cursor is currently positioned within the user interface. The cursor prompt can take various forms, depending on the mode of the multi-modal cursor that is currently activated. For example, in the first cursor mode, the cursor prompt may be presented in a first format, such as a traditional arrow or hand and pointed finger shape. In the second cursor mode, the cursor prompt may be presented in a second format, which could be a different shape or color to distinguish it from the first format. In one example, the shape of the second cursor mode is a shape other than an arrow or hand/finger. Such a shape may be, for example, a lightning bolt or a circle that indicates connectivity with a point extending from the circle. Other shapes may also be used.

Alternatively, the second cursor mode and the first cursor mode have a same shape, only different colors and/or sizes. For instance, the traditional first cursor mode may be associated with a solid black arrow or black-outlined arrow and the second cursor mode may be associated with a red, yellow, orange, green or other colored arrow.

In the disclosed embodiments, the user interface may also be presented with two distinct icons that are displayed within the interface: a traditional cursor mode icon and an AI cursor mode icon. These icons may be displayed along a bottom boundary of the interface, within the control/menu ribbon of the interface, or at other location. These icons serve as visual indicators of the two modes of the multi-modal cursor. The traditional cursor mode icon represents the first cursor mode, the non-contextual functionality mode. The AI cursor mode icon, on the other hand, represents the second cursor mode, the contextual functionality-enabling mode. Both icons are presented simultaneously within the user interface, allowing the user to easily switch between the two modes of the multi-modal cursor by selecting the respective icon.

The determination of which mode of the multi-modal cursor to activate and utilize is based on user input. Specifically, the user can select either the traditional cursor mode icon or the AI cursor mode icon within the user interface to activate the respective mode of the multi-modal cursor. This selection process provides the user with control over the functionality of the cursor, allowing them to switch between modes as desired or as the task at hand requires.

When the user selects the traditional cursor mode icon, the first cursor mode, or the non-contextual functionality mode, is activated. In this mode, the cursor operates traditionally, allowing the user to select and manipulate the selectable content within the display blocks. The cursor prompt is presented in a first format associated with this first/traditional mode, providing a visual indication of the active traditional mode to the user.

On the other hand, when the user selects the AI cursor mode icon, the second cursor mode, or the contextual functionality-enabling mode, is activated. This mode leverages AI technologies to provide enhanced functionality based on the context of the user's actions and the instance of the user interface.

In some instances the cursor prompt changes to a second format associated with the activated AI cursor/second cursor mode, which may be a different shape or color to distinguish it from the first format and which may correspond to the shape and/or coloring of the displayed cursor mode icons.

This change in the presentation of the cursor prompt provides a visual cue to the user that the second/AI cursor mode has been activated.

Likewise, in some instances, the icon associated with a currently activated cursor mode is highlighted or visually distinguished with a change in size, animation, coloring, or other feature to reflect the currently active mode of the cursor prompt. Alternatively, the cursor associated with the inactive mode of the cursor prompt may be de-emphasized by reducing a size of the icon, or increasing a transparency of the icon.

As just generally described, the system enables a user to selectively switch which cursor mode is used to interact with selected content in the user interface.

In the first cursor mode, or the non-contextual functionality mode, a user input selection of content with the cursor prompt triggers traditional cursor actions. For example, the user input may cause the cursor to select and highlight the selectable content. This highlighted content can then be used for a subsequent copy function, allowing the user to easily copy the content and paste it elsewhere within the user interface or in another application. Alternatively, the user input may trigger a display of a menu associated with functions that can be performed by an application associated with the user interface with the selected content. This menu may include options such as cut, copy, paste, delete, or other functions, providing the user with a range of actions that they can perform on the selected content.

In contrast, in the second cursor mode, or the contextual functionality-enabling mode, the system determines a context associated with an instance of the user interface and a context of the user for the content being selected by the cursor prompt. This context determination process is a central aspect of the enhanced functionality provided by the second cursor mode. The context associated with an instance of the user interface may include various factors, such as the type of selectable content presented within the display blocks, the location of the multi-modal cursor within the user interface, the applications that are accessible to the user through the interface, and the functions that can be applied from these applications to the selectable content. The context of the user, on the other hand, may include factors such as the user's previous actions, preferences, or other user-specific information.

Based on the determined context, the system determines one or more contextual functions to enable when the cursor prompt is in the second cursor mode. These contextual functions are functions that are relevant to the current context, providing enhanced functionality that is tailored to the user's current task or preference. The determination of the one or more contextual functions to enable is based on the context associated with the instance of the user interface and/or the context of the user. This context-aware functionality allows the cursor to adapt its behavior and provide functions that are relevant to the current context, thereby enhancing the user's interaction with the user interface and the selectable content within it.

For example, if the context determination process determines that the user is currently working on a text document and the cursor is positioned over a piece of text, the system may enable a contextual function that allows the user to perform text-related actions, such as formatting the text or checking the spelling. On the other hand, if the context determination process determines that the user is currently viewing an image and the cursor is positioned over the image, the system may enable a contextual function that allows the user to perform image-related actions, such as zooming in on the image or applying a filter. In this way, the system provides a dynamic and context-aware user experience, allowing the user to interact with the user interface and the selectable content in a more intuitive and efficient manner.

When the user makes a selection of content with the cursor prompt, different actions are triggered depending on whether the cursor prompt is in the first cursor mode or the second cursor mode. For instance, when in the first mode, the traditional cursor prompt functionalities (e.g., copy, select, move, open, etc.) are applied and/or a traditional cursor menu with the traditional cursor prompt functionalities will be displayed. Notably, these traditional functionalities are not based on a context of a user and do not invoke a remote machine-learning model to perform functions related to the selected content. In contrast, when a user selects content with a cursor prompt that is in an activated second/AI cursor mode, the systems will generate and present a different cursor prompt interface or menu to the user, which includes non-traditional functionalities such as functionality to generate new content that replaces or that is displayed with the selected content and functionality to interact with one or more remote machine-learning models. This dynamic response to user input enhances the flexibility and adaptability of the multi-modal cursor, allowing it to provide a user experience that is tailored to the user's current task or preference.

This ability to switch between the two modes of the multi-modal cursor based on user input provides the user with flexibility and control over their interaction with the user interface and the selectable content. It allows the user to choose the mode that is more suitable for their current task or preference, enhancing the user's experience and efficiency in interacting with the user interface.

FIGS. 10-16 illustrate examples of user interfaces with components of a multi-modal cursor, including cursor icons that can be selected by user input to select and/or switch the cursor mode used by a cursor in the user interfaces to interact with the displayed and selectable content presented within blocks/frames of the user interfaces.

Figure 10:
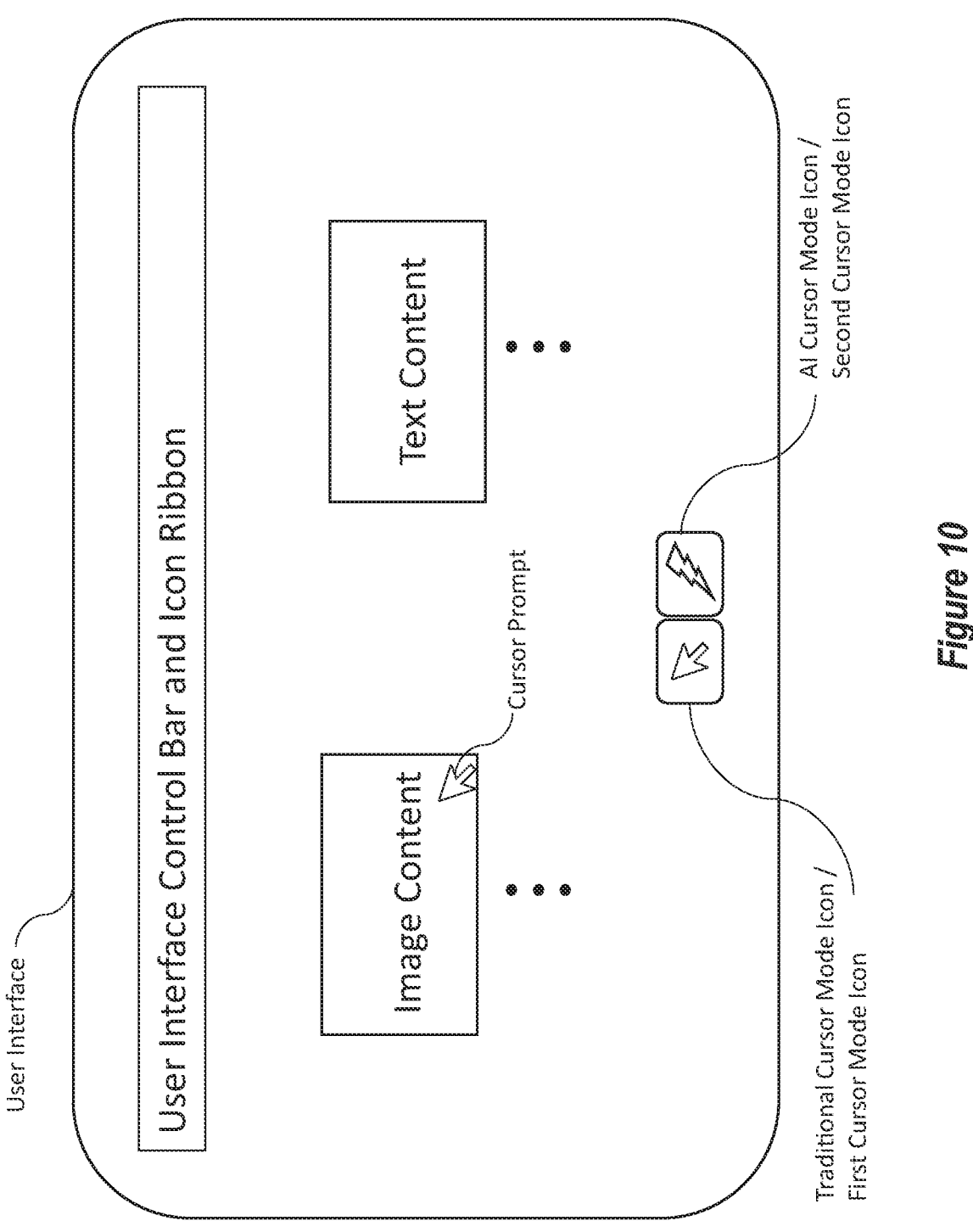
FIGS. 10-16 illustrate examples of user interfaces with components of a multi-modal cursor, including cursor icons that can be selected by user input to select and/or switch the cursor mode used by a cursor in the user interfaces to interact with the displayed and selectable content presented within blocks/frames of the user interfaces.

For instance, FIG. 10 illustrates a user interface (or more simply "interface") with an interface control bar/icon ribbon that typically includes icons that can be selected to open corresponding menus or tools and/or to invoke certain functionality. The interface also displays different blocks or frames with different types of selectable content. In this image, a block of selectable image content is provided, as is a block of selectable text content.

The interface also includes a cursor prompt that may be controlled by a mouse or other I/O device to select and interact with the selectable content presented in the different blocks of the interface.

The cursor prompt may be displayed in different formats according to different corresponding cursor modes, as described. The different cursor modes can be selected and switched between in response to user selection of cursor mode icons displayed with the interface. In this embodiment, the cursor mode icons include a traditional or first cursor mode icon, as well as an AI or second cursor mode icon. In this image, the first cursor mode icon has a shape of an arrow and the second cursor mode icon has the shape of a lightning bolt.

Figure 11:
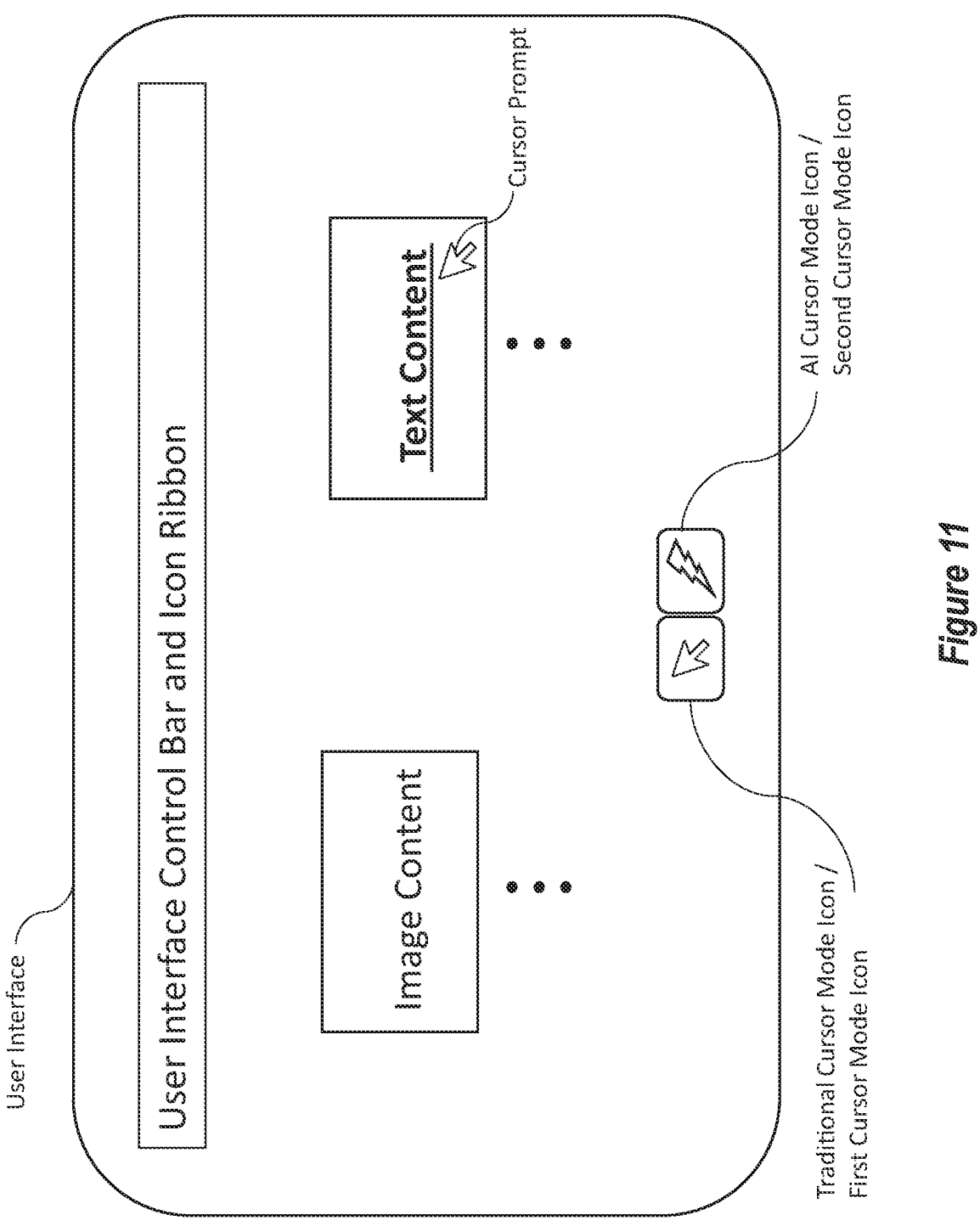

In FIG. 11, when the user selects text content with the cursor prompt, while the corresponding cursor prompt or even more particularly, the cursor/cursor state that corresponds with the cursor prompt is in the tradition cursor mode, the system will cause the cursor to invoke traditional non-contextual functionality associated with the cursor (e.g., select, copy, grab, paste, move, etc.). The image content is bolded in this illustration to show it has been selected.

Figure 12:
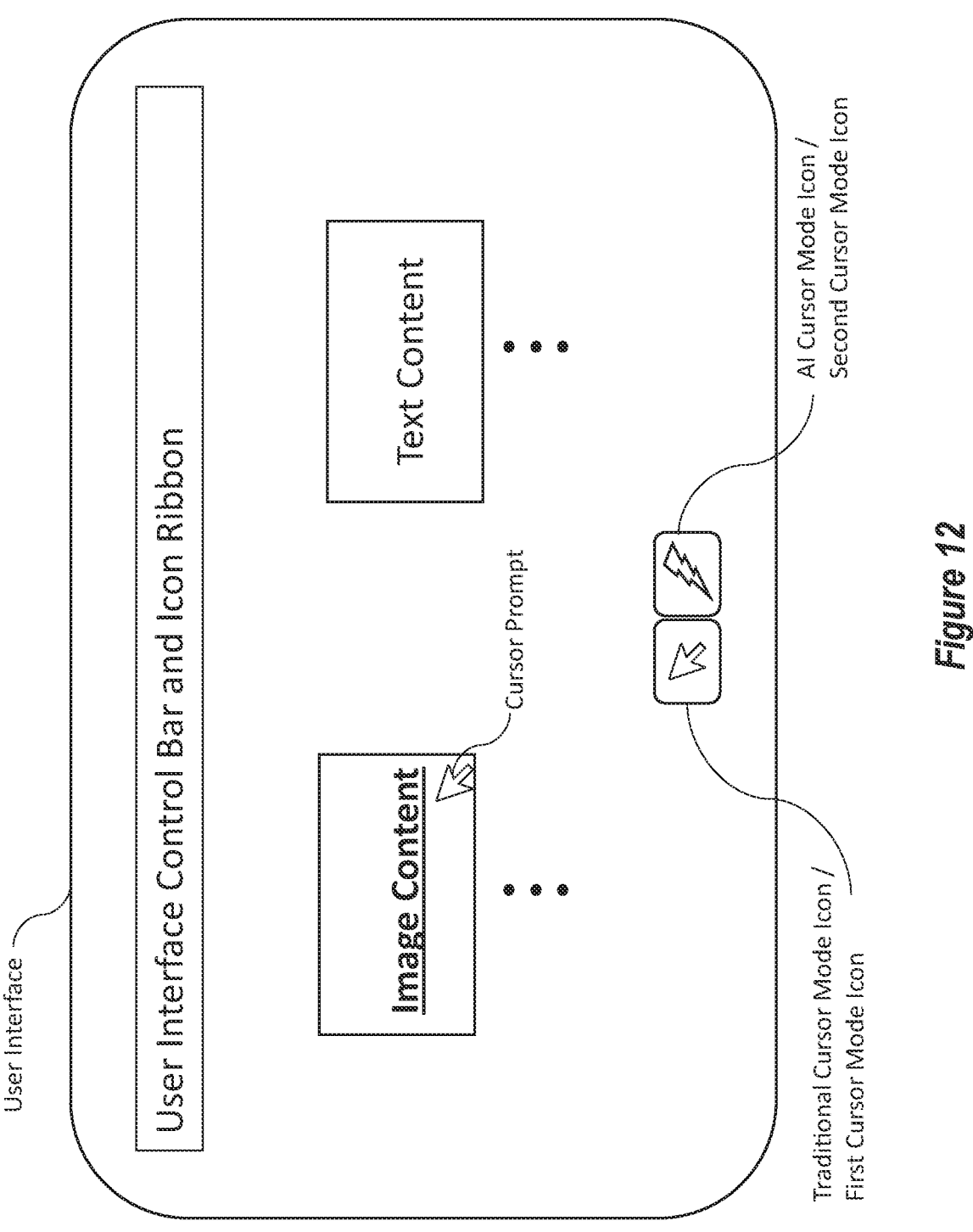

In FIG. 12, when the user selects image content with the cursor prompt, while the corresponding cursor prompt or even more particularly, the cursor/cursor state that corresponds with the cursor prompt is in the tradition cursor mode, the system will cause the cursor to invoke traditional non-contextual functionality associated with the cursor (e.g., select, copy, grab, paste, move, etc.). The image content is bolded in this illustration to show it has been selected.

Figure 13:
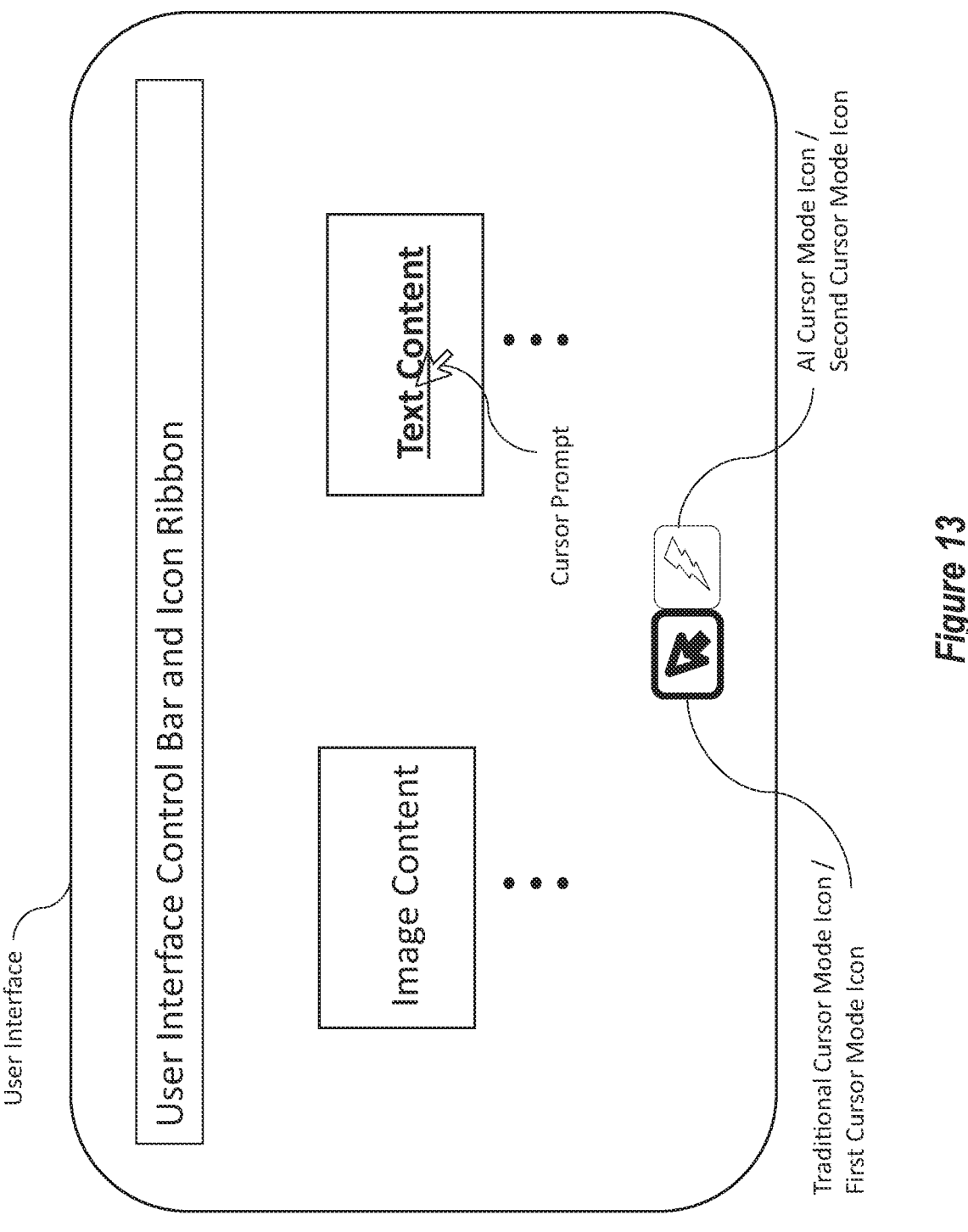

Similarly, in FIG. 13, when the user selects text content with the cursor prompt, while the corresponding cursor prompt or even more particularly, the cursor/cursor state that corresponds with the cursor prompt is in the tradition cursor mode, the system will cause the cursor to invoke traditional non-contextual functionality associated with the cursor (e.g., select, copy, grab, paste, move, etc.). The text content is bolded and underlined in this illustration to show it has been selected.

In FIG. 13, the active mode of the cursor causes the corresponding cursor icon to be visually emphasized and the cursor icon of the inactive cursor mode to be relatively and visually de-emphasized.

Figure 14:
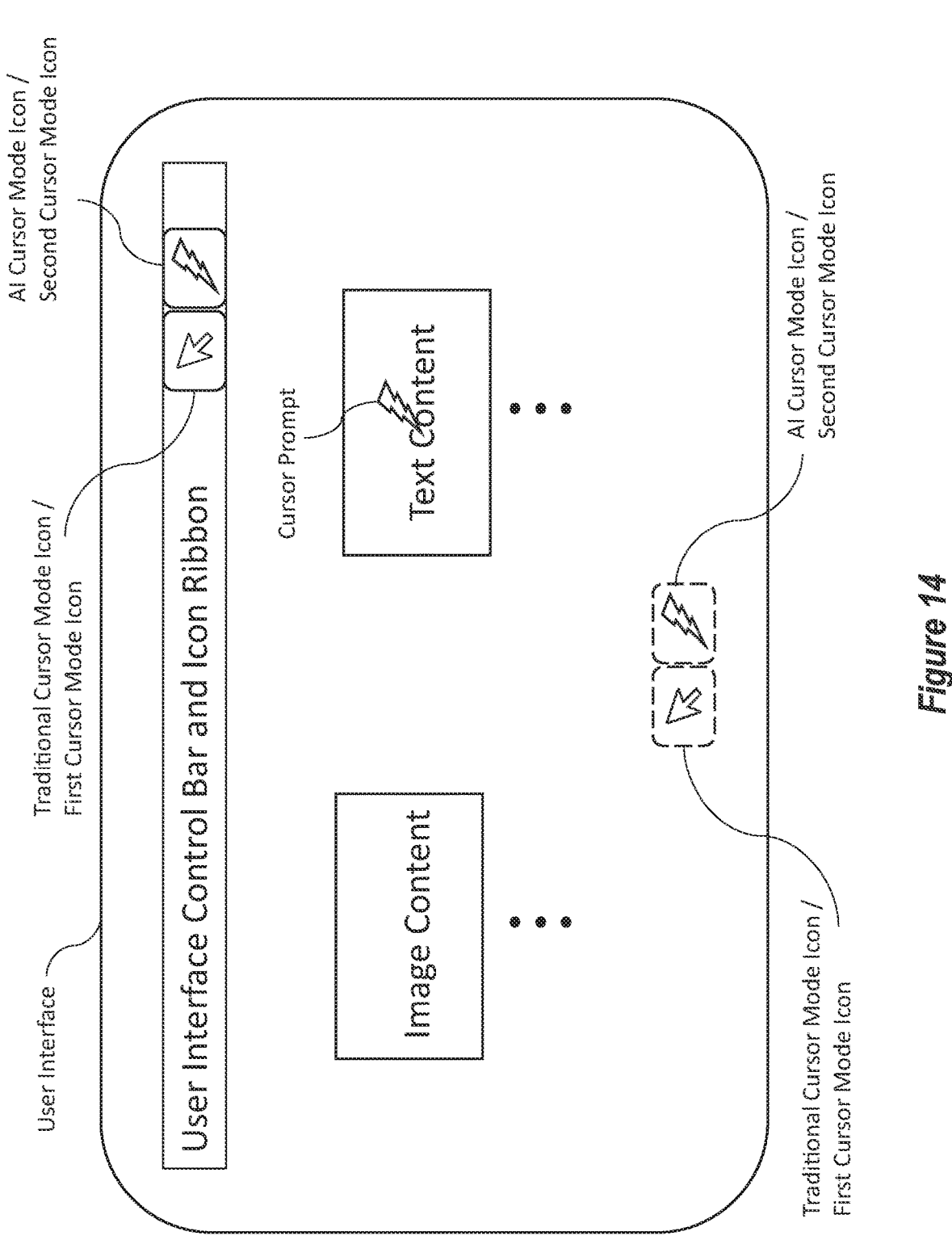

FIG. 14 illustrates how the cursor icons can be displayed at the bottom of the interface or up in the user interface control bar and icon ribbon. They can also be displayed at other locations in the interface. In some instances, not shown, only the cursor icon of the cursor mode that is currently active is displayed, while the other cursor icon of the inactive cursor mode is omitted or hidden from the interface.

In this embodiment, the active cursor mode is the AI or second cursor mode, such that the corresponding cursor prompt is displayed with a matching symbol/object.

Figure 15:
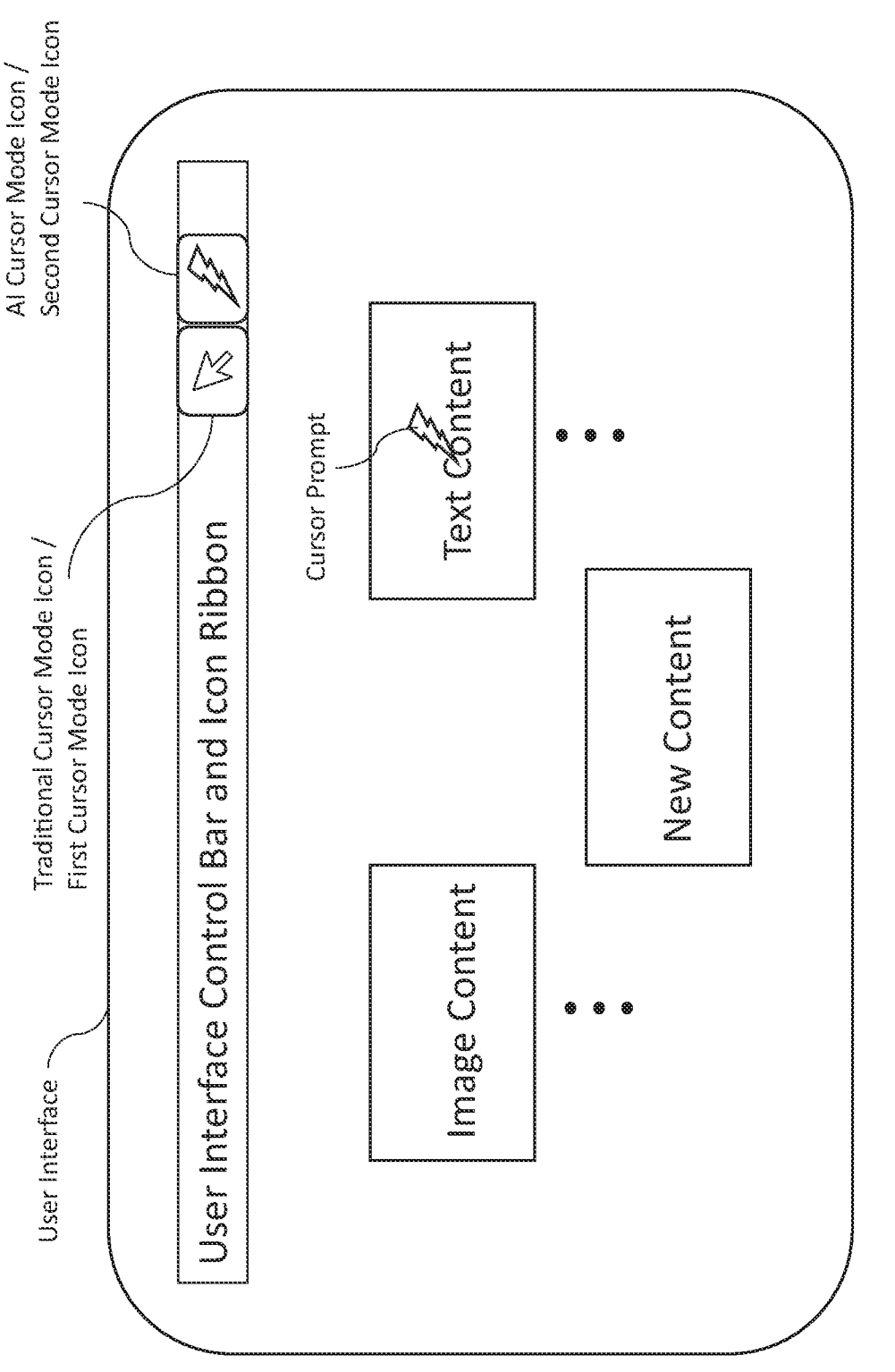

FIG. 15 illustrates how selection of the text content from FIG. 14 with the cursor prompt while in the AI or second cursor mode, or more particularly the cursor/cursor state associated with the cursor prompt is in the AI or second cursor mode, then the system will cause a selected function and corresponding model or executable to be applied to the selected content to generate new content that is displayed in the interface with the selected content.

Figure 16:
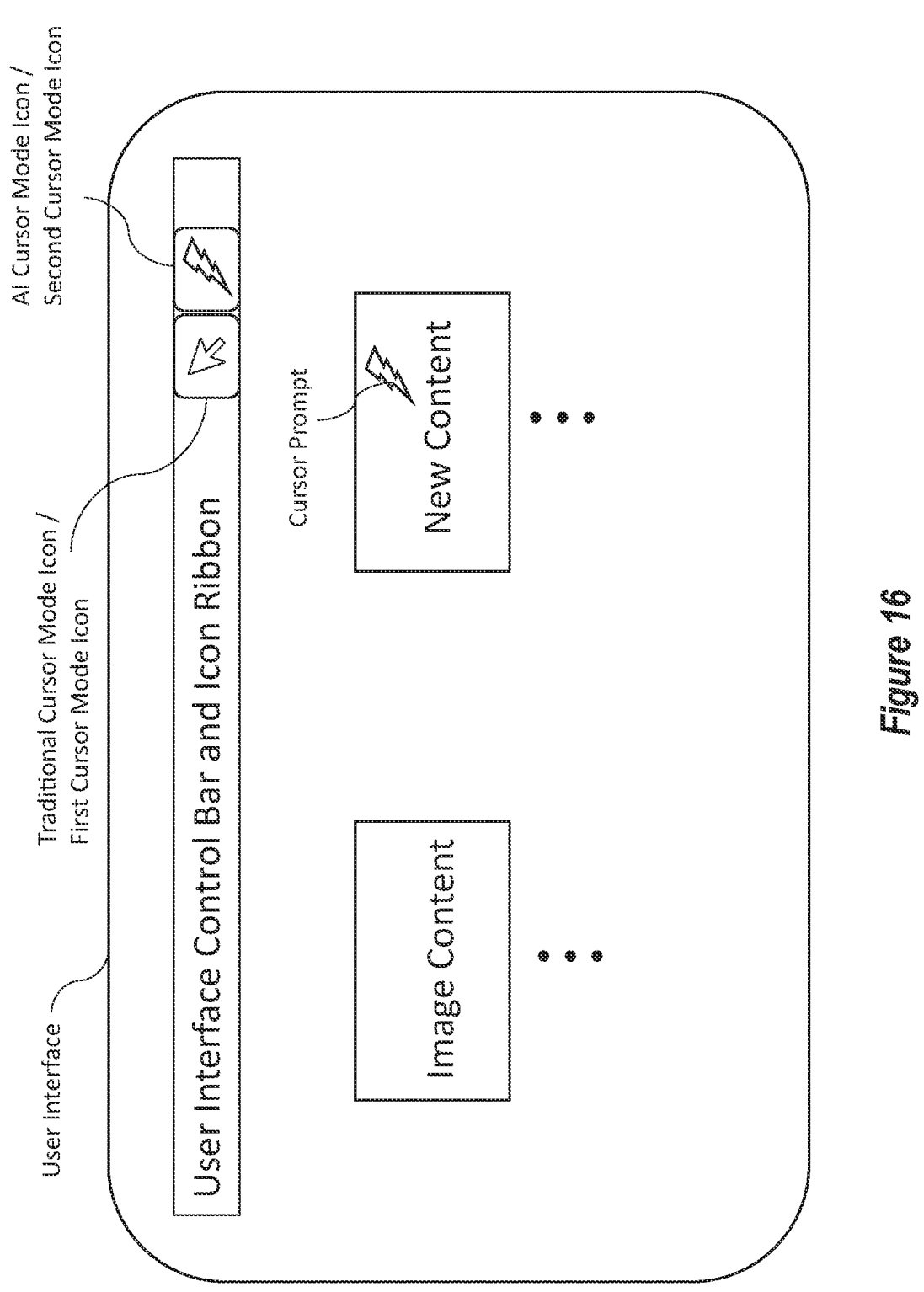

Additionally, or alternatively, this selection may also cause the system to select one or more functions to perform a transformation of the selected content into new content that replaces the selected content (FIG. 16).

In another example, the selection of the content causes the generation of an AI cursor widget (referred to herein as simply an AI cursor, or AI cursor interface, or AI cursor prompt interface) that includes one or more interactive AI tools. These tools may include, for example, an AI prompt field to receive a prompt which, when populated, causes the entered prompt to be submitted to an LLM (large language mode), such as a GPT (generative predictive text) model or another model that processes the prompt to generate output that is rendered at the interface. The AI tools may also include an attachment icon or control which, when selected, provides the user options to attach one or more files to be considered and processed by the model as a stand-alone prompt or with the entered prompt. The AI tools may also include a selectable object (e.g., generate icon) which, when selected, provides options to the user for generating charts, comparisons, derivative content, and/or other processed outputs related to the selected content.

Notably, in each of these examples, the system considers a context of the user and/or application instance (which may comprise the selected content and content type) when selecting a function (e.g., executable) and/or model from a plurality of different functions that the system has access to and that can be applied to the selected content. The system may selectively filter and display only functions/functionalities that are determined to be contextually relevant to the user and/or application instance, and optionally, while omitting other available functionalities that are determined to not be as contextually relevant.

Figure 17:
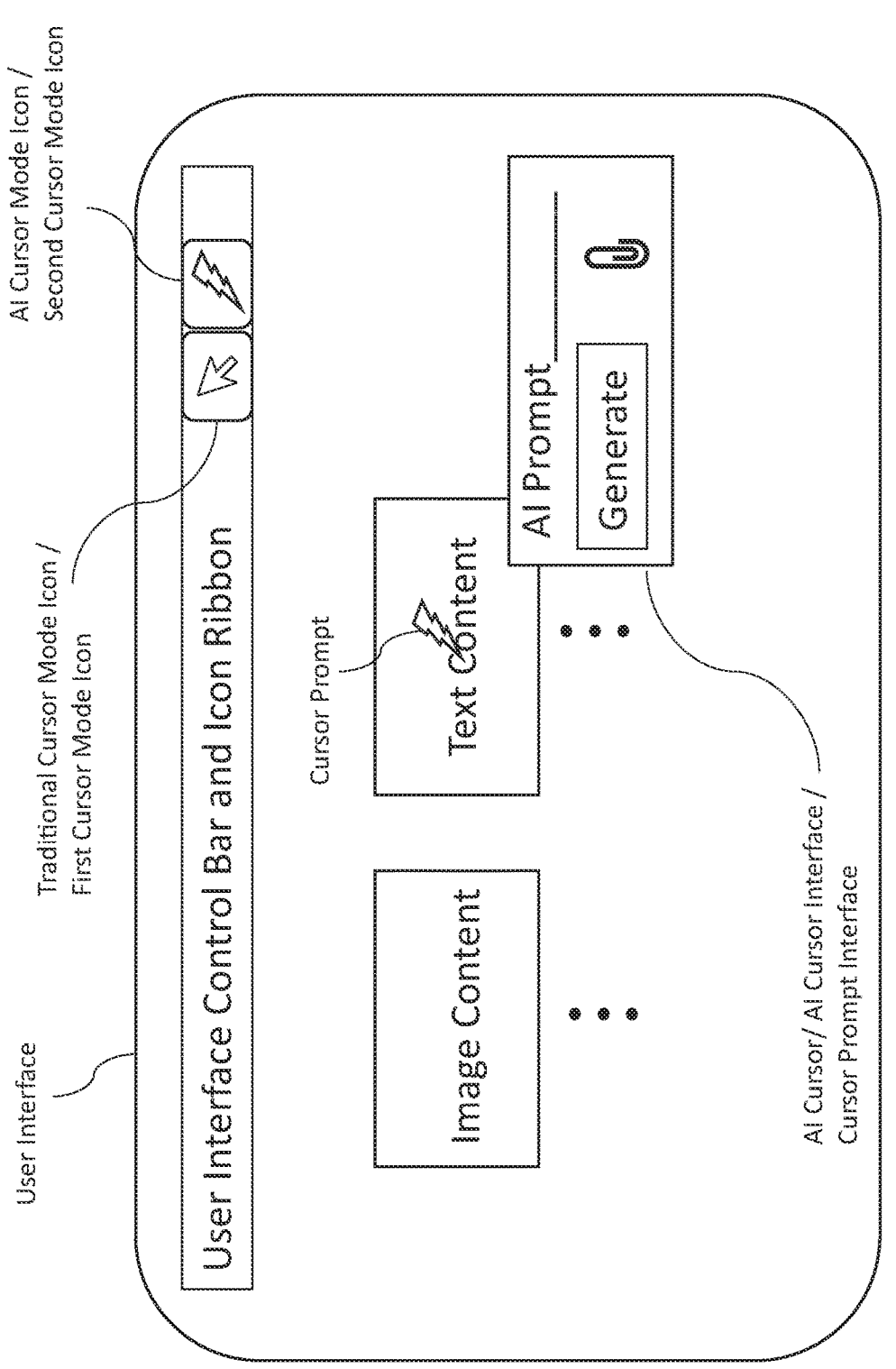
FIGS. 17-22 illustrate examples of user interfaces which include cursor prompt interfaces that are configured to facilitate multiple functionalities and techniques for interacting with content selected by the corresponding cursor prompts.

FIG. 17 illustrates an AI cursor interface (also referred to herein as an AI cursor or cursor prompt interface) that is generated in response to the user selecting content with the cursor prompt when the cursor prompt is in the AI cursor mode, as shown. This AI cursor interface includes functions or functionalities that are identified and selected for the AI cursor interface based on various factors, including at least a context of the user interface and/or selected content and/or the user context, as described herein. In this regard, the presentation of the AI cursor interface may appear different to different users that are using different applications.

In some instances, the system considers the contexts of the user and user interface when selecting the particular back-end models and functions that are applied, even though the functionalities presented in the AI cursor interface may remain the same or static between different uses. In this scenario, the options to add an AI prompt in an AI prompt field will be the same in multiple presentations of the AI cursor interface. However, when the prompt is entered, the system will access different model(s) or functions to apply to the prompt based on the referenced contexts, such that different users may enter the same prompt in different instances of the user interface, but the system will apply different models to the same prompt because of the detected different contexts of the user interface and/or user.

Figure 18:
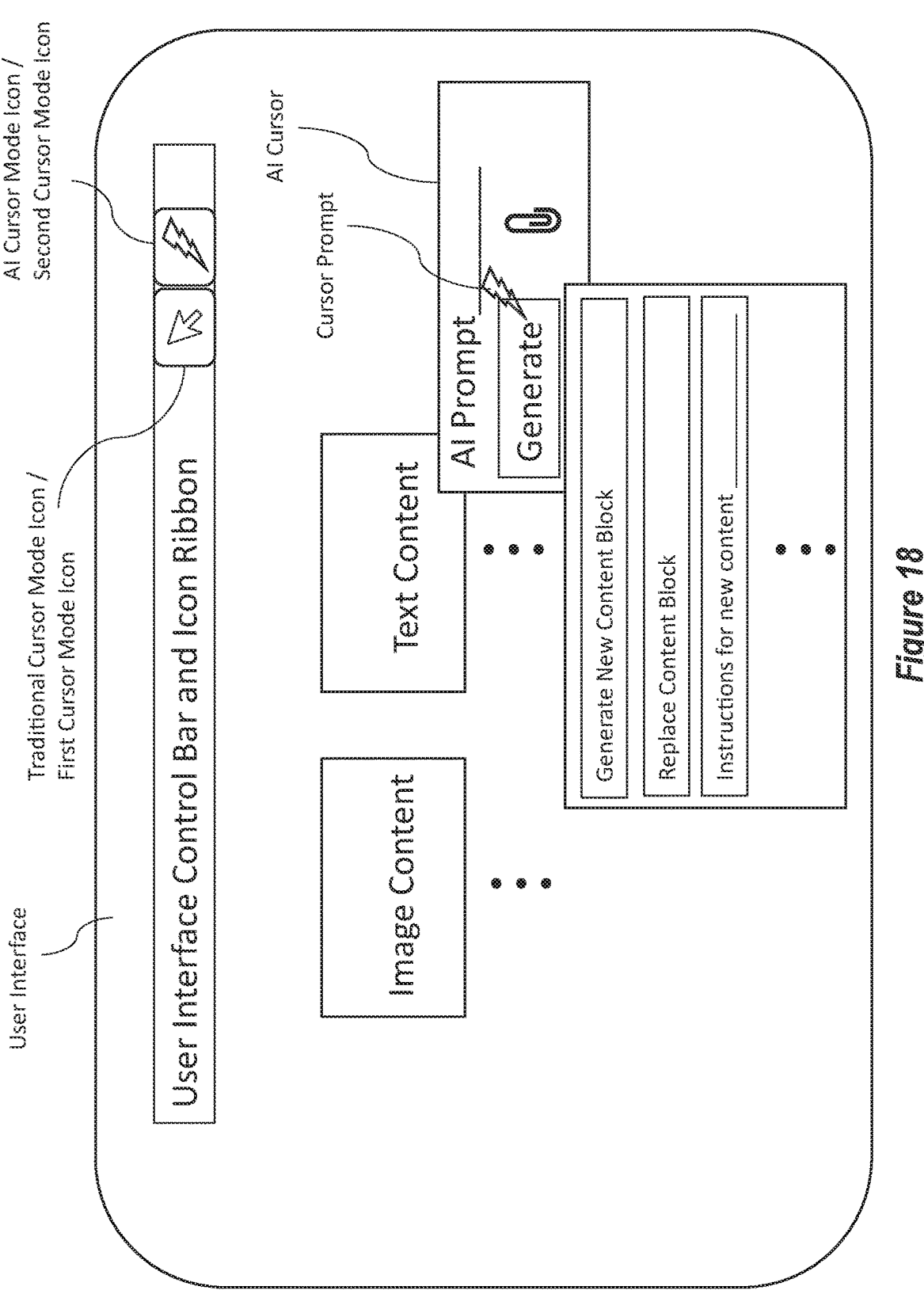

FIG. 18 illustrates the selection of a function called "generate" from the cursor and which causes the system to present a content generation interface with selectable options which, when selected, cause the system to generate new content, such as in a new content block or to generate new content that is used to replace the selected content/content block. The system may also have an input field for receiving a prompt for instructions related to the generating the content and that the model is applied to generate the new content in the manner desired and/or sourced from a desired source, for example.

Figure 19:
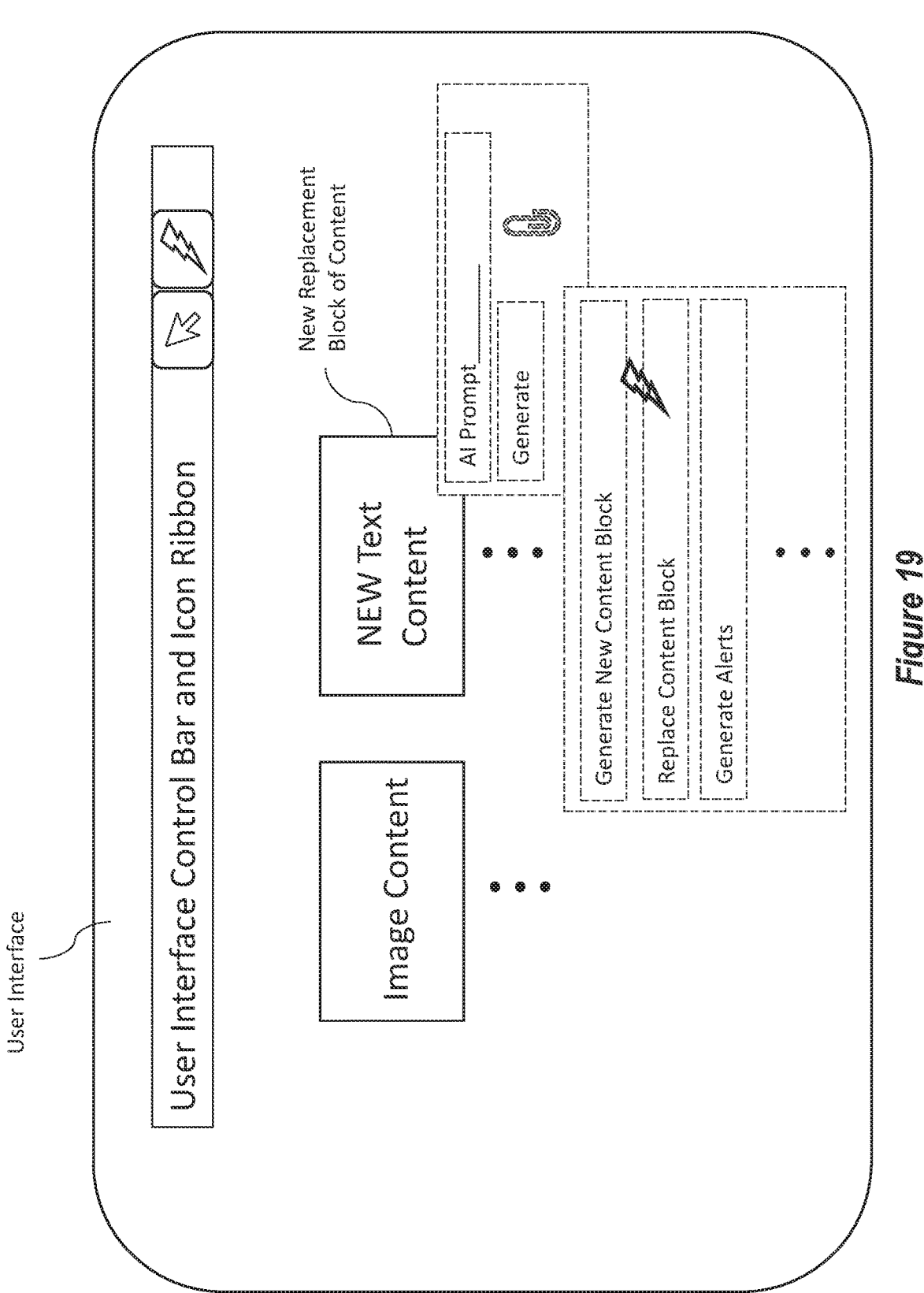

FIG. 19 illustrates a related example in which the user has selected a replace content block option and the interface is displaying the NEW Text Content in the position where the selected content was previously presented. This illustration also shows an option for generating alerts that was provided by the system automatically or that the user entered as a prompt for causing the system to generate notifications to the user when certain conditions exist within the NEW Text Content, such as when a source that the NEW Text Content was derived from is updated.

Figure 20:
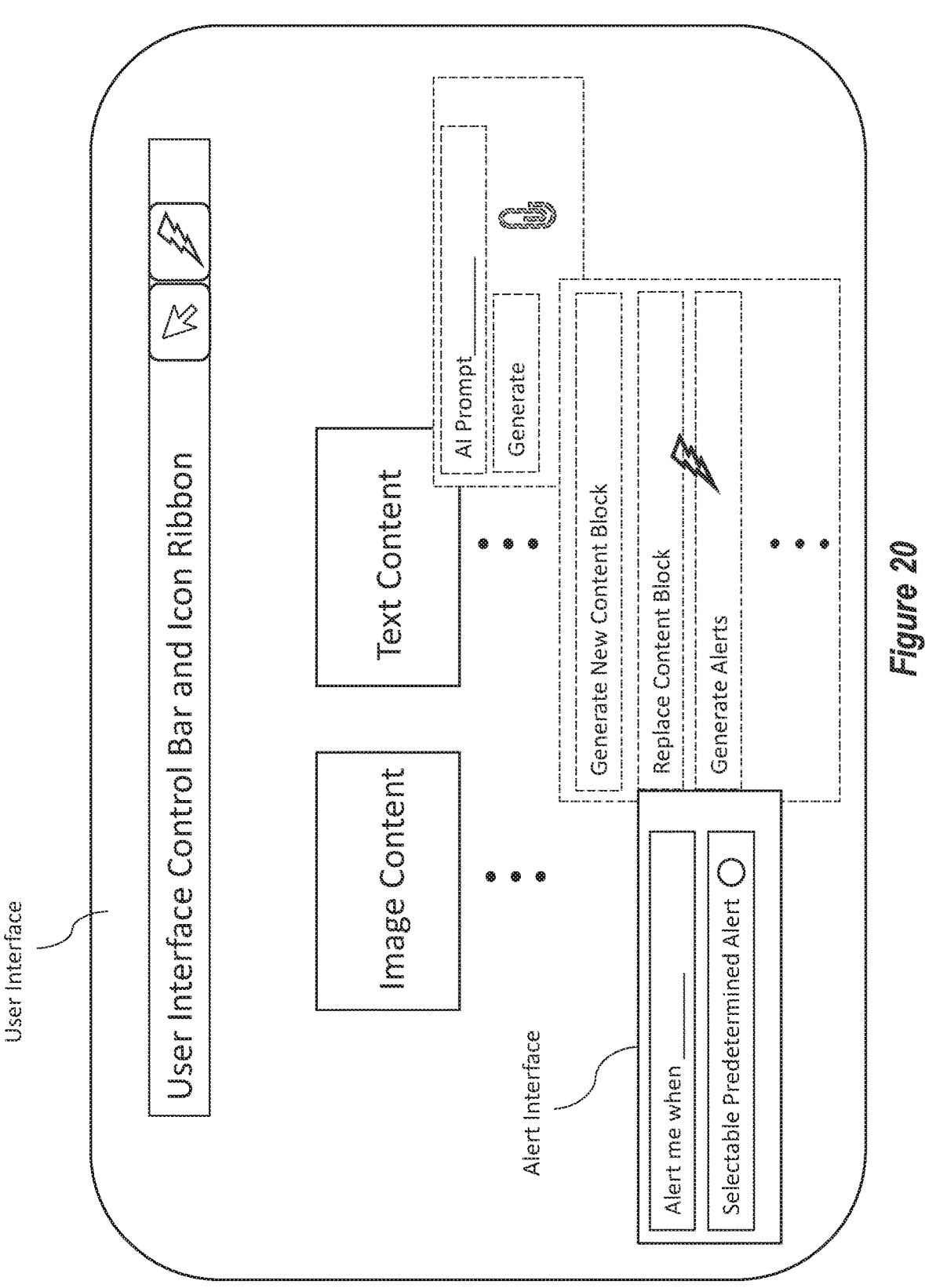

FIG. 20 illustrates an example in which a user has selected the generate alert option to cause the system to generate a new alert interface with separate options that can be entered or selected for generating alerts related to the selected content and/or the newly generated content.

Figure 21:
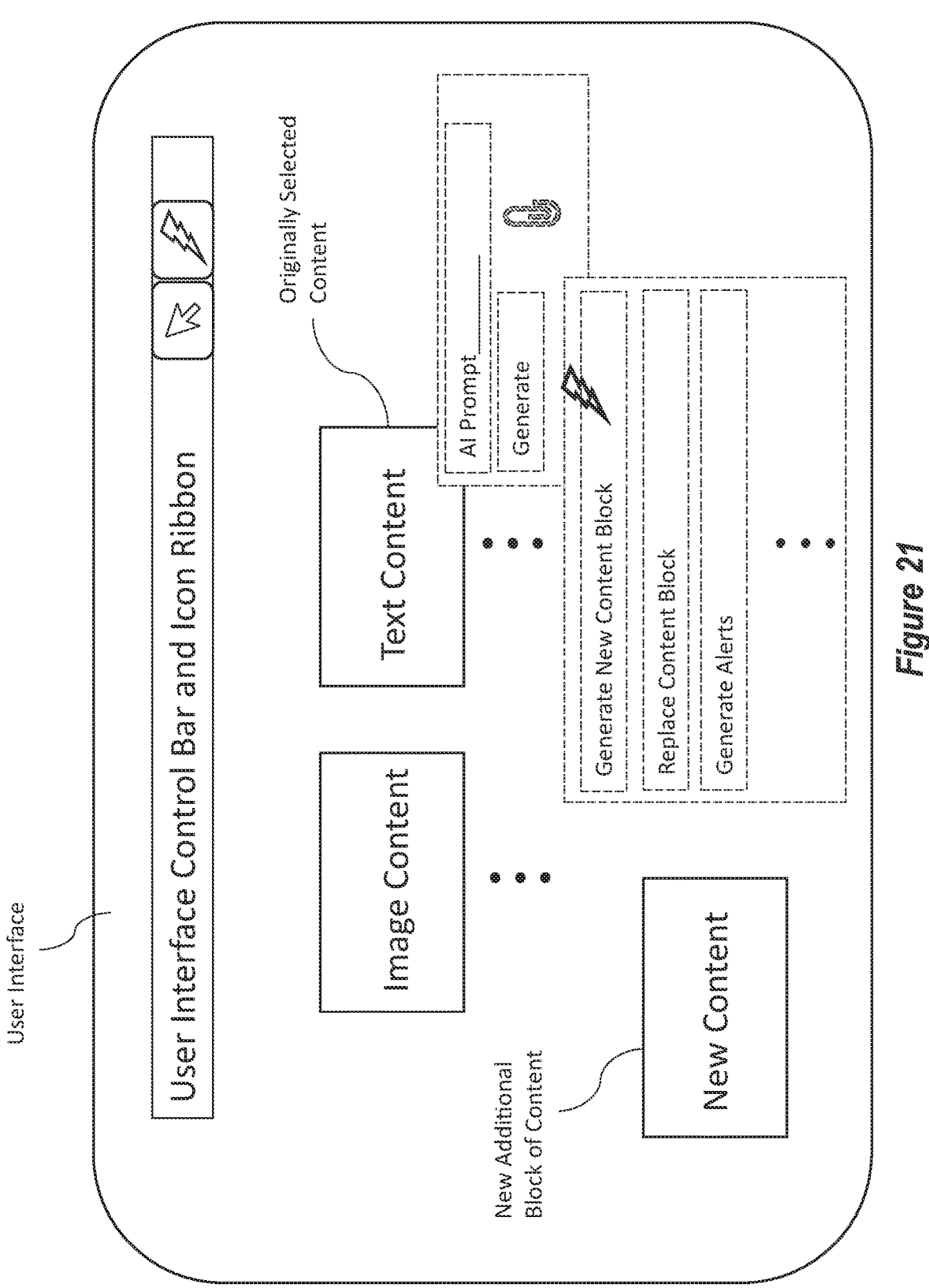

FIG. 21 illustrates an example in which a user has selected an option to generate a new content block for new content related to the originally selected content. In this example, the new content is displayed concurrently or simultaneously with the originally selected content.

Figure 22:
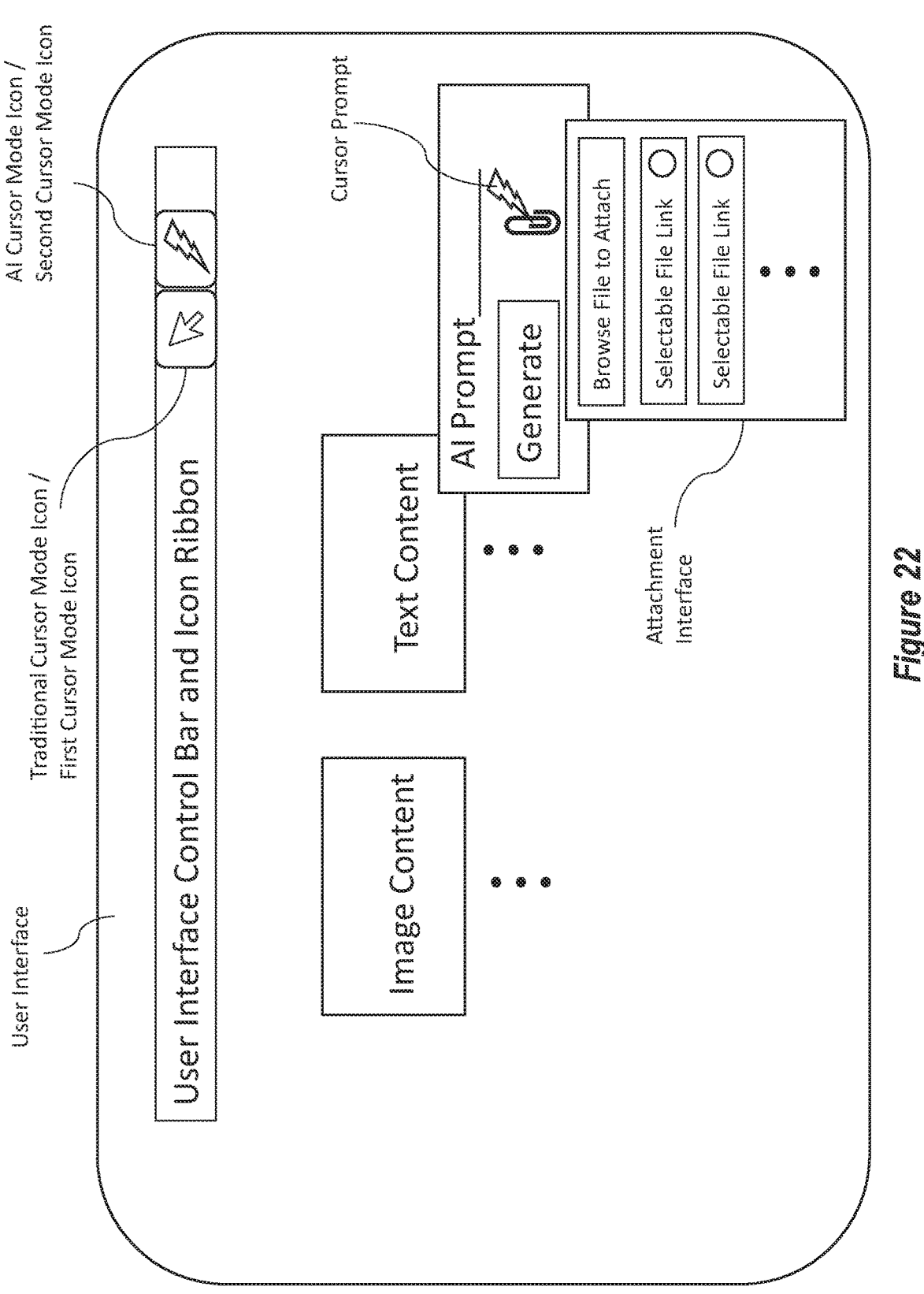

FIG. 22 illustrates an example in which a user selects an attachment icon that, when selected, causes the system to display an attachment interface with options for selecting or entering a file or source of information to be used when performing a function to or with the selected content which was previously selected.

Figure 23:
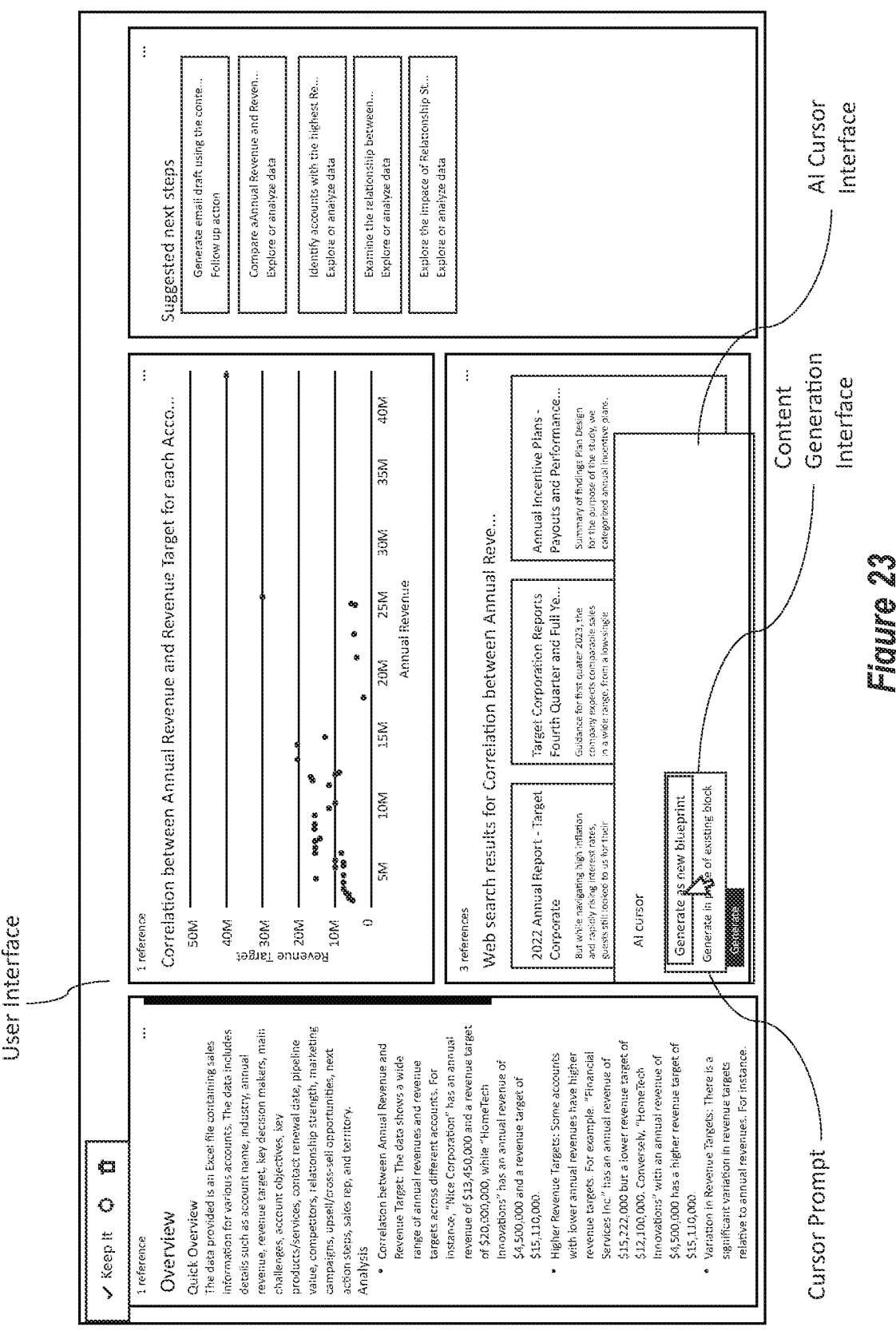
FIGS. 23-26 illustrate additional examples of user interfaces that include the use of cursor prompt interfaces, such as described in FIGS. 17-22.
Figure 24:
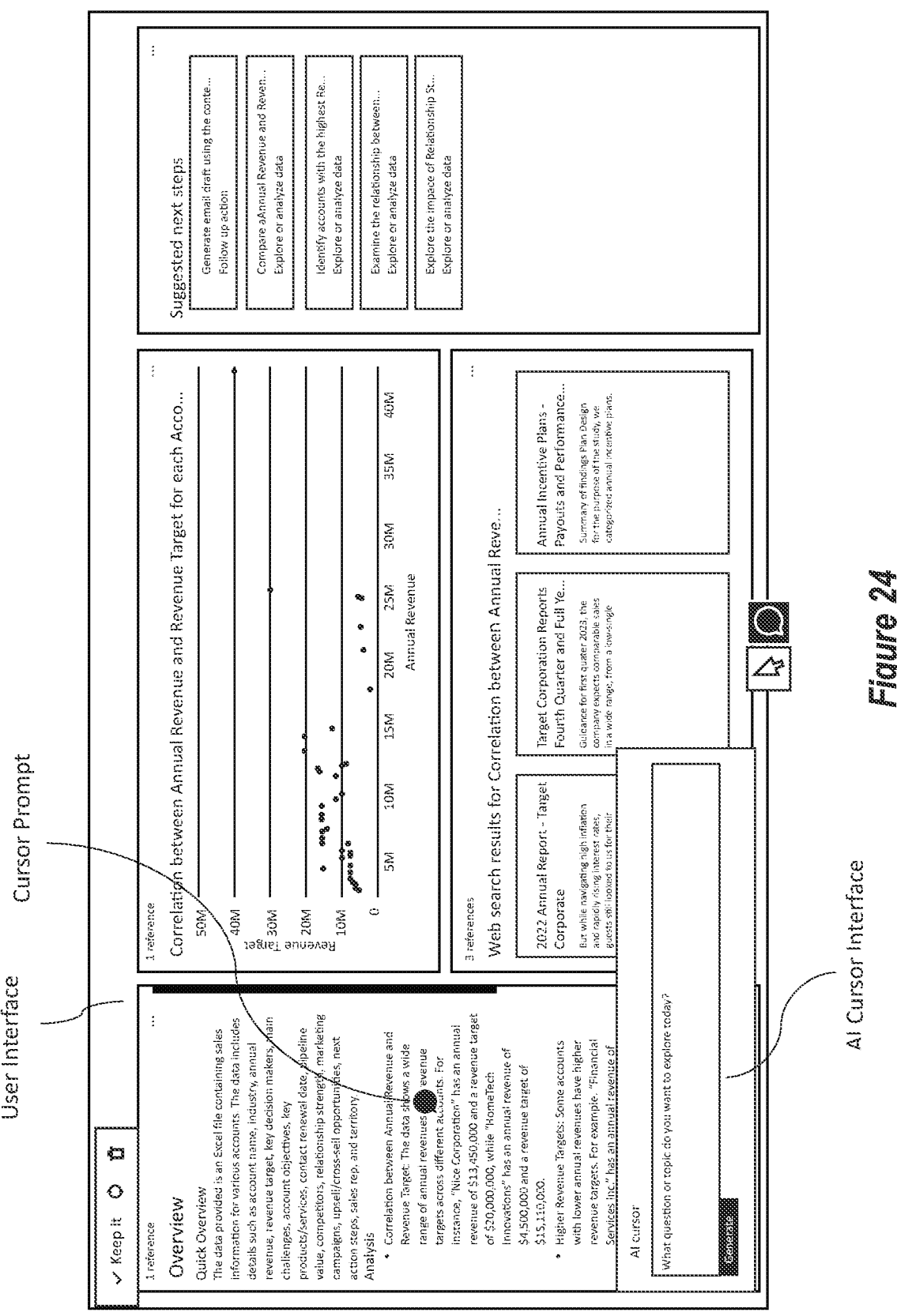
Figure 25:
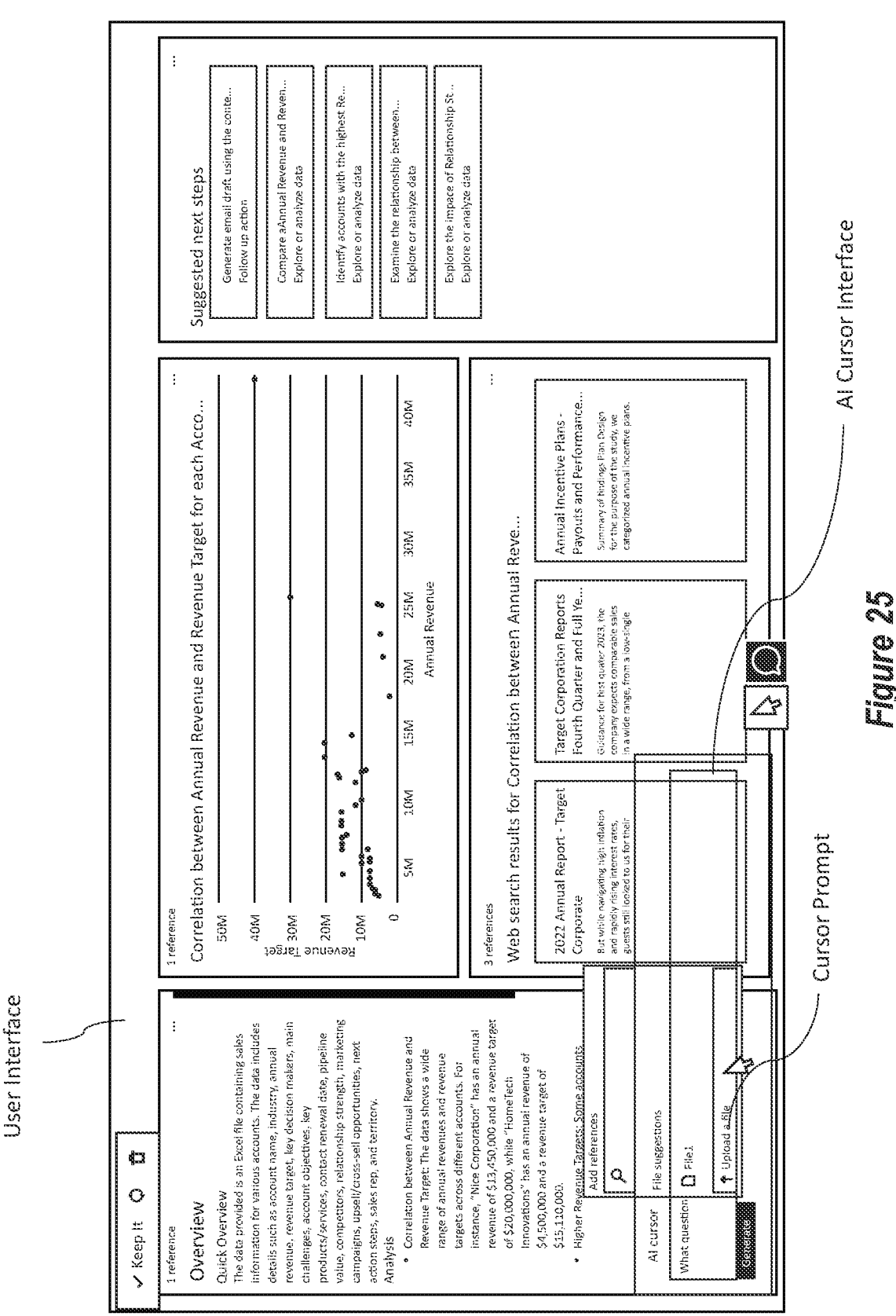
Figure 26:
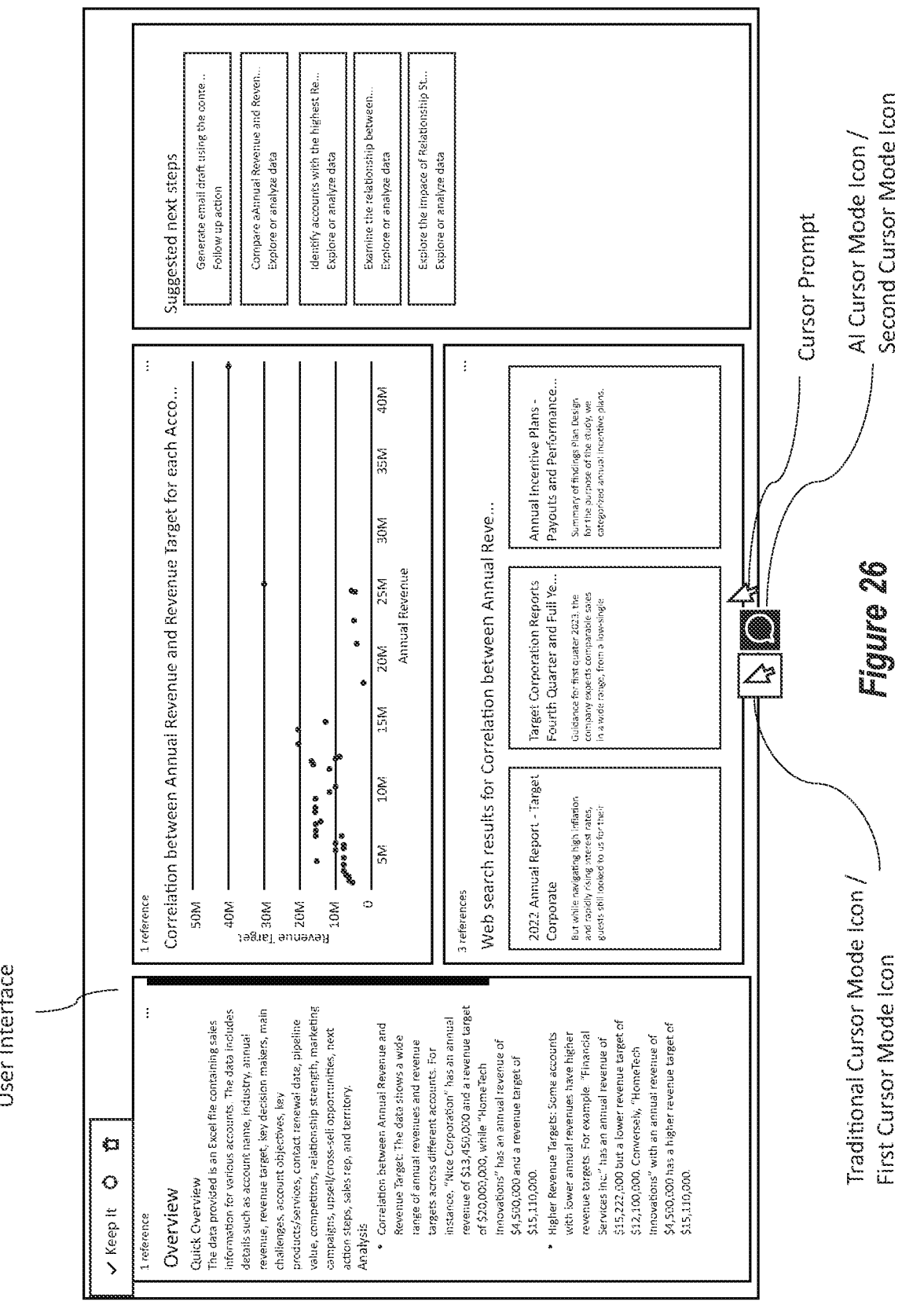

FIGS. 23-25 illustrate related embodiments in which a cursor prompt is used to select a generate new content option from a content generation option/interface from the base AI cursor interface (FIG. 13), wherein the cursor prompt is used to select content to trigger the generation of the AI cursor interface with a prompt field that is configured to receive a user entered prompt that a large language model (LLM) or other model trained to process similar prompts will be applied to (FIG. 24).

FIG. 25 also illustrates similar elements and functionality. However, in FIG. 15, the cursor prompt has changed a shape relative to a previous shape used to invoke the generation of the AI cursor interface. This is beneficial to help the user intuitively know they are interacting within the AI cursor interface. When the cursor prompt exits the boundaries of the AI cursor interface, it reverts to the shape of the cursor prompt in the AI cursor mode or the traditional cursor mode.

FIGS. 26-31 illustrate additional examples of user interfaces with components of a multi-modal cursor. In these examples, the AI or second cursor mode icon is presented as a circle with a small arrow protruding from the circle. The traditional or first cursor mode icon is presented as a traditional arrow icon.

Figure 27:
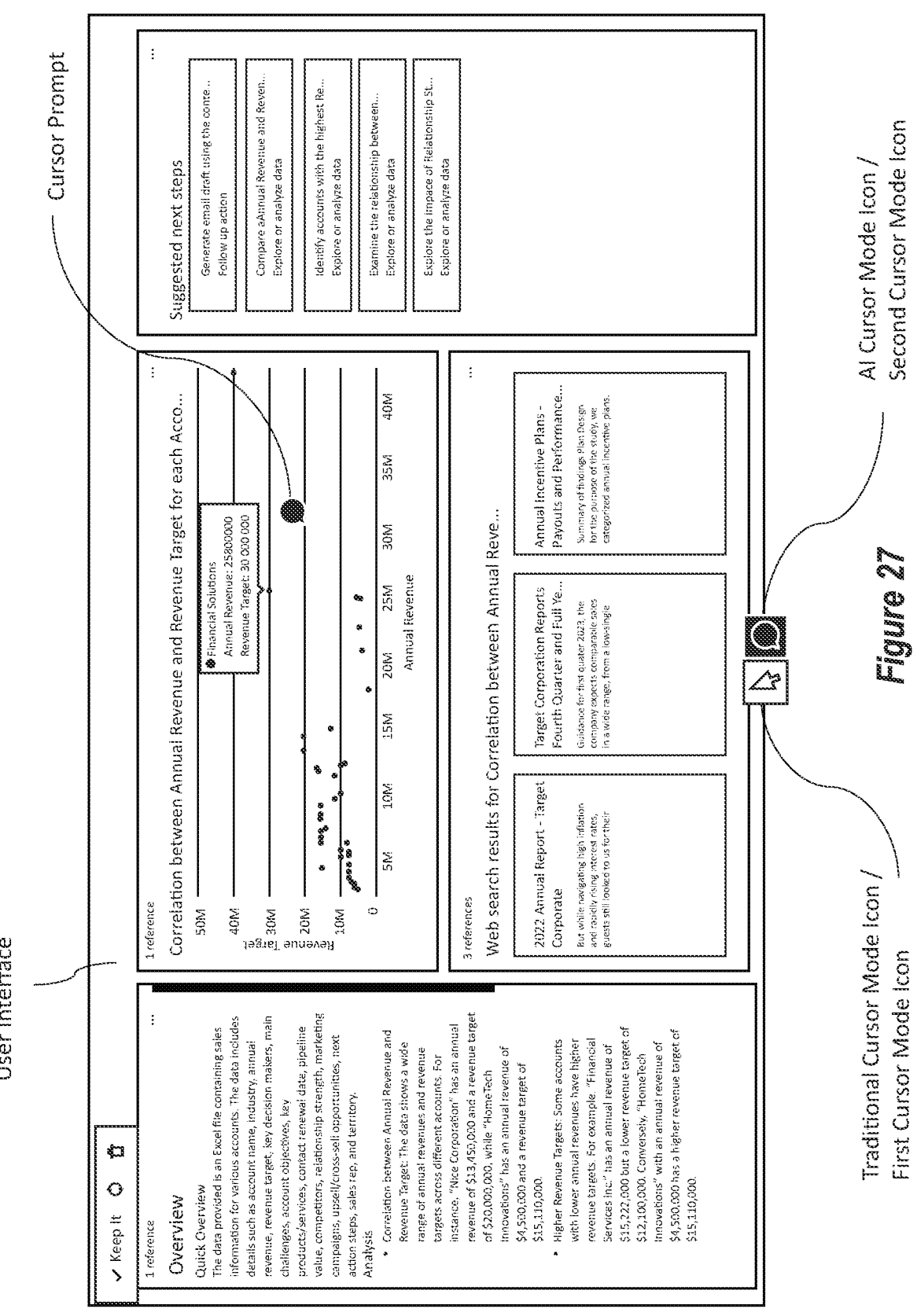
Figure 28:
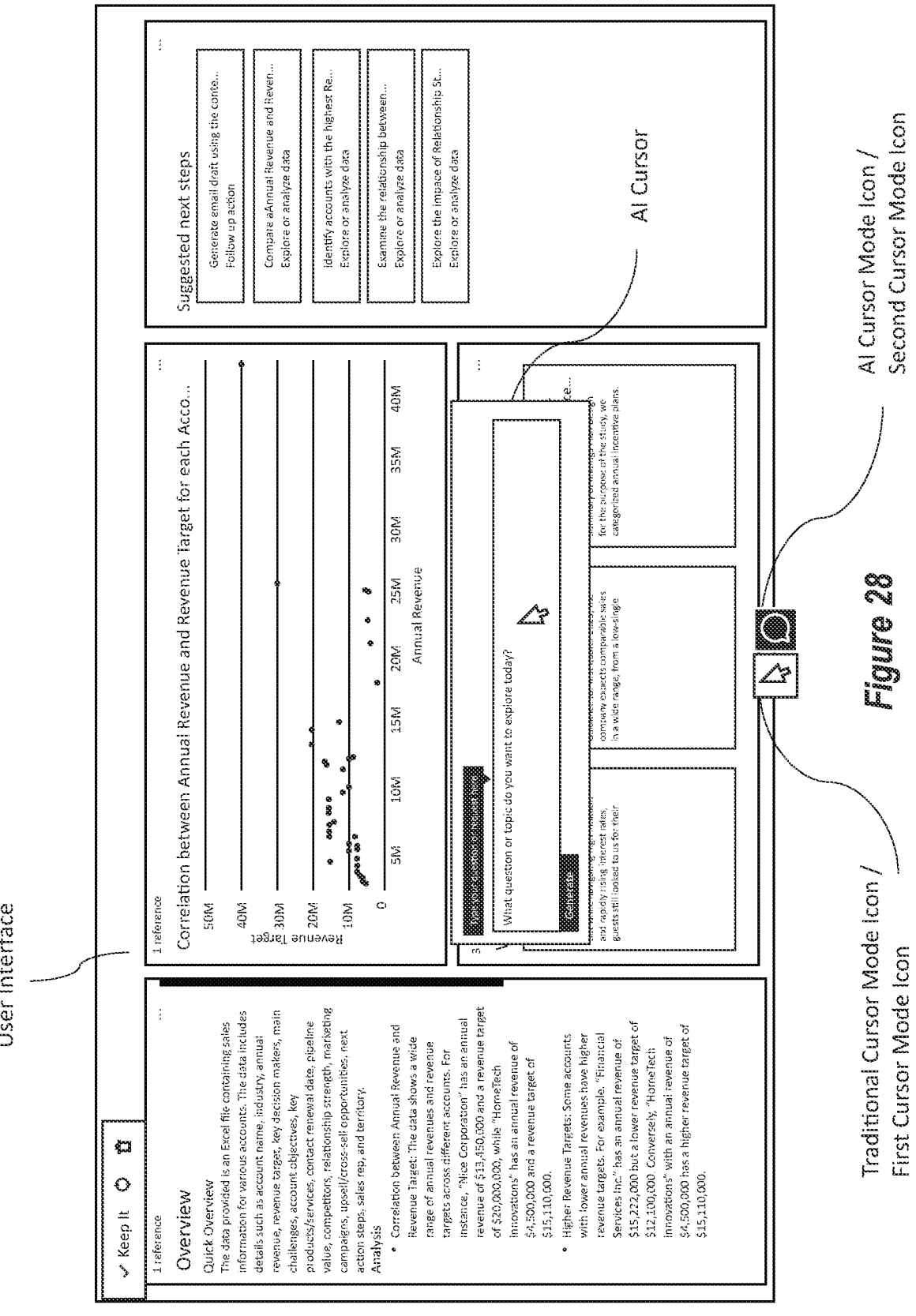
Figure 30:
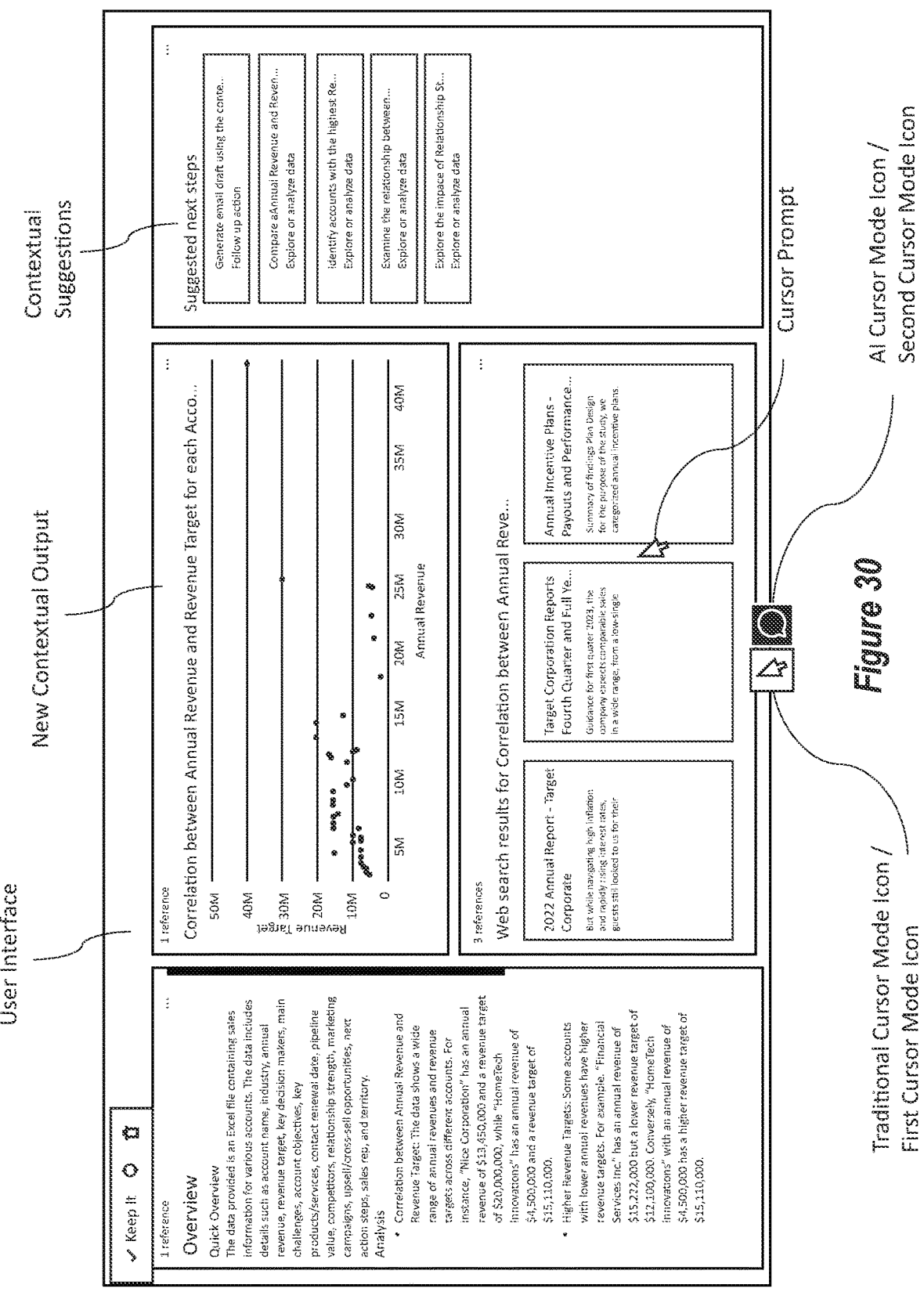

These illustrations also show different types of content presented in different blocks of the user interface, along with a cursor prompt. In FIG. 16, the cursor prompt is the shape of an arrow, corresponding to a selected state of the cursor and the corresponding first cursor mode icon. In FIG. 27, the cursor prompt is the shape of a modified circle with a point/arrow, corresponding to a selected state of the cursor and the corresponding second cursor mode icon. In FIG. 30, the cursor prompt is the shape of a hand with a finger, corresponding to a selected state of the cursor and the corresponding first cursor mode icon (even though the first cursor mode icon has a different shape).

Figure 29:
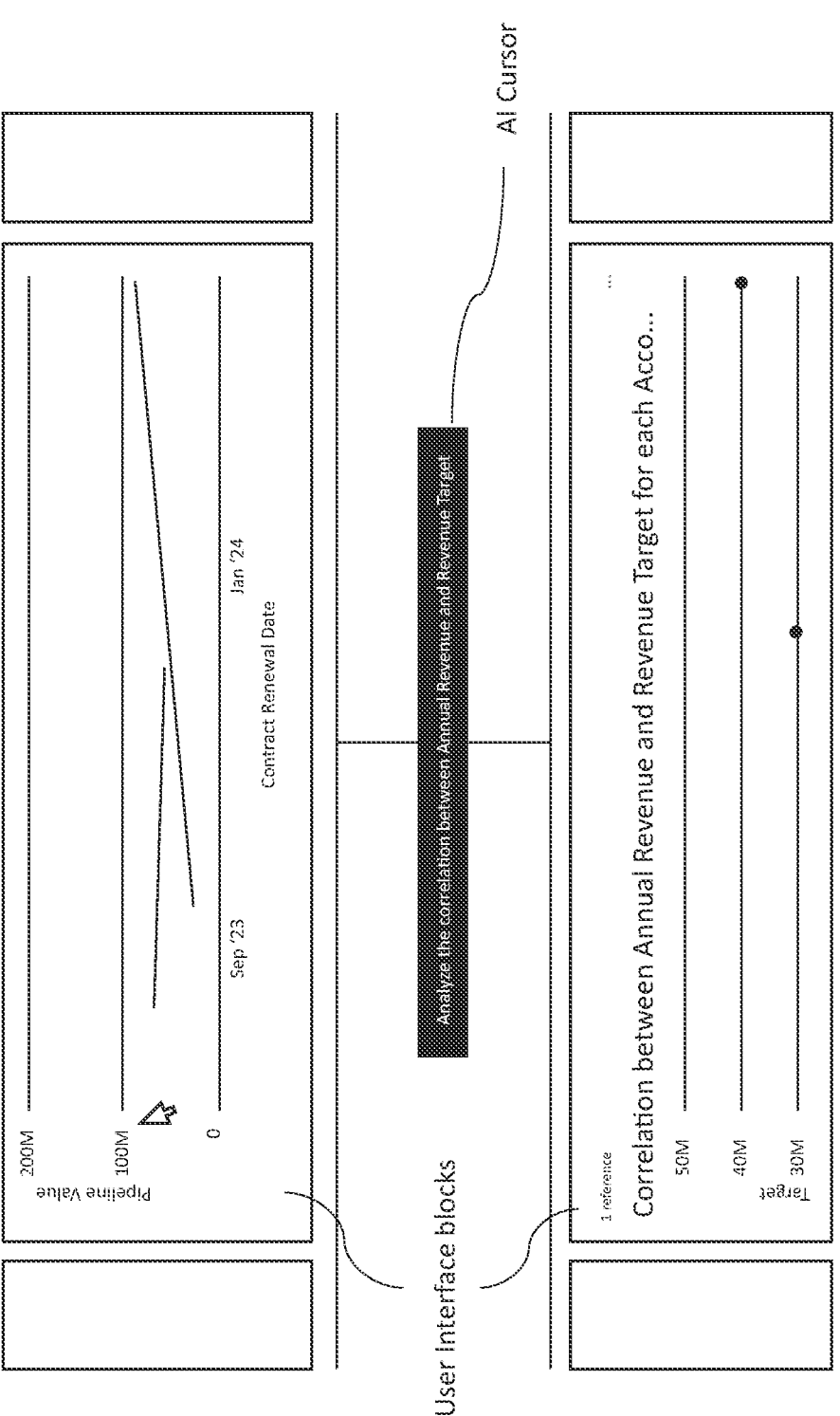

In FIG. 29 the system has received the selection of two different blocks of the interface with the cursor prompt while the second cursor mode state is activated. This caused an AI cursor interface to be displayed with interactive AI tools for processing the content of the selected interface blocks (not shown). As a result of a user selection of an AI tool for causing a comparison of selected content (not shown) or in response to a user typing a prompt, the AI cursor interface is changed to reflect the prompt/functionality to be applied to the content in the selected interface blocks (i.e., an analysis of correlations between annual revenue and revenue targets identified within the selected interface blocks).

The selection of this functionality may be based on considerations of the interface context (e.g., the content being displayed and selected) and/or based on the user context (e.g., the role/title of the user as an accountant for the company and/or a detected event to submit a report on the correlations between annual revenue and revenue targets as identified from the user's stored and referenced calendar event data and/or meeting notes).

Figure 31:
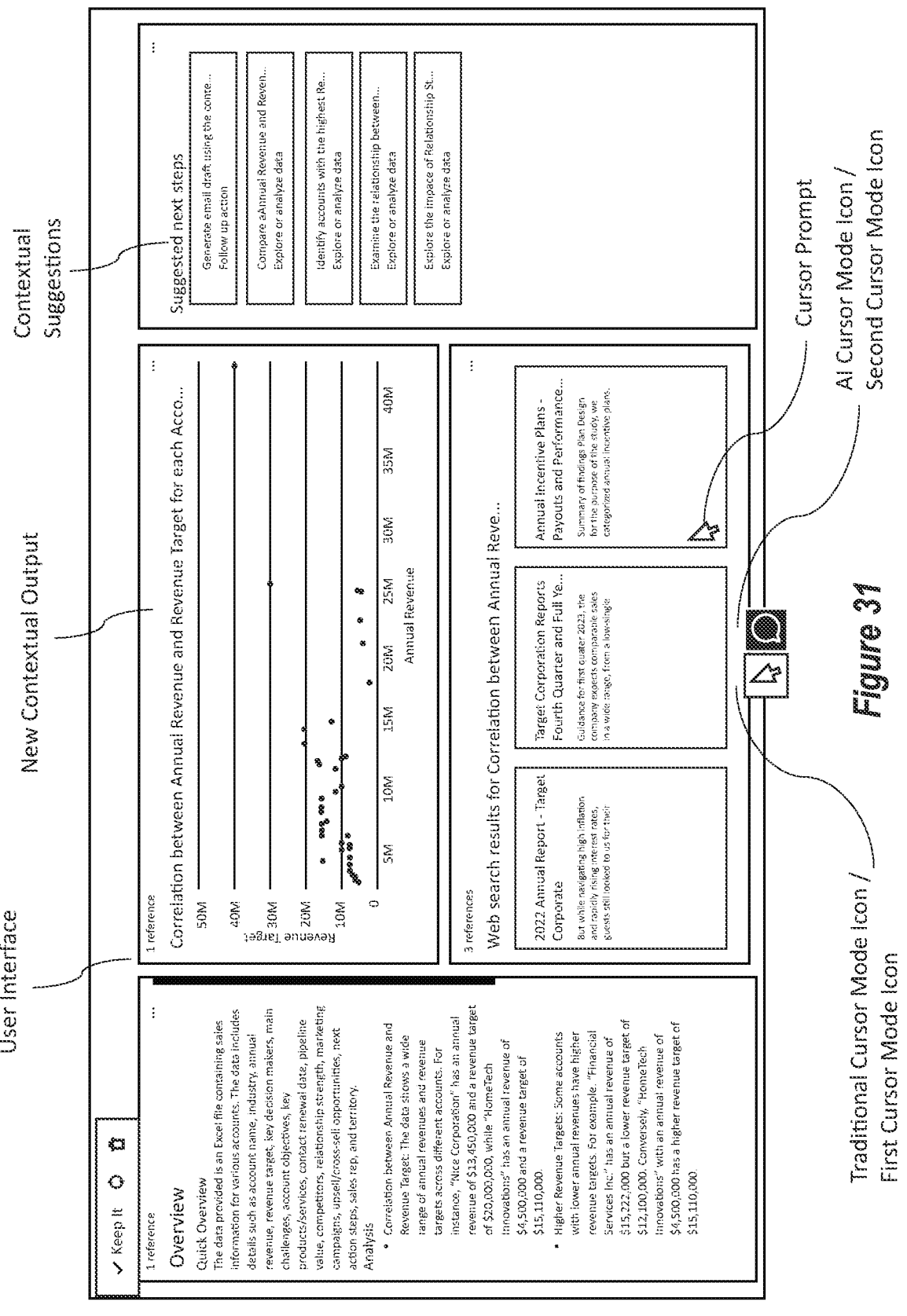

FIGS. 30 and 31 illustrate how the system, after generating the correlation output, may generate it as a new chart, comprising new contextual output, relative to what was shown in FIG. 29. The interface may also, responsively, present additional functions or suggestions that can be applied to the same data or other data corresponding to detected contexts. This set of contextual suggestions may be dynamically updated periodically and/or in response to detected actions by the user and/or in response to new detected contexts.

In FIGS. 30 and 31, the user has subsequently provided new input for selecting the traditional cursor mode icon. This causes the system to activate the first cursor mode and deactivate the second cursor mode. In FIG. 31, this causes the cursor prompt to change into a matching arrow symbol. In FIG. 30, the cursor prompt is changed to a hand. The shape/symbol used for the cursor prompt for each of the first and second cursor modes may be based on preference settings or parameters set by the user through an interface menu (not shown).

The state of the cursor/cursor mode and preferences for the cursor mode prompts may be stored in storage of the system and referenced when user input is received at the interface to ensure the proper cursor mode functionality is applied.

Some of the disclosed methods include acts for utilizing AI cursor interfaces that display and enable the use of functions that are not typical cursor prompt functions. Depending on which mode the cursor is in when the user selects content, the system will instantiate and display a traditional cursor prompt menu, when the selecting cursor prompt is in the traditional cursor mode (not shown) or, alternatively, instantiate and display the disclosed AI cursor prompt interface/menu, when the selecting cursor prompt is in the referenced AI cursor mode.

As described, these acts may include presenting a user interface with displayed content, presenting a cursor prompt associated with a cursor for selecting the content, detecting the cursor prompt being used to make a selection of selected content, and determining whether cursor is in an artificial intelligence (AI) cursor mode during the selection of the selected content and responsively either: (i) in response to determining the cursor is in the AI cursor mode during the selection, identifying a plurality of different functions that can be applied with the selected content including at least one function for generating new content related to the selected content and displaying the at least one function in a new cursor prompt interface at the user interface, or alternatively, (ii) in response to determining the cursor is not in the AI cursor mode during the selection, refraining from displaying the at least one function in the new cursor prompt interface at the user interface.

In these embodiments, the identifying the plurality of different functions that can be applied with the selected content includes identifying a context of a user and identifying the plurality of different functions that are contextually relevant to the context of the user.

In some aspects, the referenced at least one function for generating new content comprises a function for generating new content based on a transformation of the selected content, or a function for obtaining and displaying the new content, the new content being accessed from a remote source in response to a request that is based on the selected content.

The function can also include obtaining and displaying the new content, the new content being a translation of the selected content.

The function can also include generating a new chart or graph based on data obtained from the selected content.

In some aspects, the method further comprises performing the at least one function in response to a user selecting the at least one function from the new cursor prompt interface that is generated automatically in response to a user selecting content from the user interface.

In some aspects, the cursor prompt is a multi-modal cursor comprising both (i) a first cursor mode comprising a non-contextual functionality mode and (ii) a second cursor mode comprising a contextual functionality-enabling mode and the methods further include presenting both a traditional cursor mode icon and an artificial intelligence (AI) cursor mode icon within the user interface.

As described earlier, the new content generated with the cursor prompt interface can be displayed with and/or replace the previously selected content that caused the generation of the cursor prompt interface. The selected content can be text, images, charts, graphs or any other data that is displayable within the user interface.

As also described, the methods of the invention also include presenting a user interface with one or more display blocks, each of the one or more display blocks including selectable content, as well as presenting a cursor prompt for a multi-modal cursor within the user interface, the multi-modal cursor being associated with (i) a first cursor mode comprising a non-contextual functionality mode and (ii) a second cursor mode comprising a contextual functionality-enabling mode.

The methods also include presenting both a traditional cursor mode icon and an artificial intelligence (AI) cursor mode icon within the user interface and determining which mode of the multi-modal cursor to activate and utilize in response to user input selecting either the traditional cursor mode icon or, alternatively, the AI cursor mode icon, wherein user selection of the traditional cursor mode icon causes an activation of the first cursor mode and user selection of the AI cursor mode icon causes activation of the second cursor mode.

In some instances, the traditional cursor mode icon and the artificial intelligence (AI) cursor mode icon are presented simultaneously within the user interface.

The format of the cursor prompt associated with the first and second cursor modes may the same or different shapes and colors.

In some instances, the methods further include detecting a user selection of the traditional cursor mode icon and determining to continue presenting the cursor prompt in a first format associated with the first cursor mode without changing a presentation of the cursor prompt from the first format to a second format associated with the second cursor mode.

The methods may also include detecting a user selection of the AI cursor mode icon and determining to change a presentation of the cursor prompt from a first format associated with the first cursor mode to a presentation of the cursor prompt in a second format associated with the second cursor mode.

In some instances, the methods further include determining a context associated with an instance of the user interface and a context of the user and determining one or more contextual functions to enable and that will be initiated in response to a subsequent user input selection made of the selectable text with the cursor prompt when the cursor prompt is in the second cursor mode, the determination of the one or more contextual functions to enable being based a determined context associated with the instance of the user interface and/or the context of the user.

Notably, the subsequent user input selection may cause different actions to be triggered depending on whether the cursor prompt is in the first cursor mode or the second cursor mode. Accordingly, the method may further include: (i) in response to detecting the subsequent user input selection with the cursor prompt while the cursor prompt is in the first cursor mode, causing the subsequent user input to select and highlight the selectable content for a subsequent copy function or to trigger a display of a menu associated with functions that can be performed by an application associated with the user interface with the selectable content that is selected; or alternatively, (i) in response to detecting the subsequent user input selection with the cursor prompt while the cursor prompt is in the second cursor mode, causing the subsequent user input to trigger an interaction with a machine learning model to perform a function associated with the selectable content wherein a selection of the function from a set of different functions is based at least in part on the determined context associated with the instance of the user interface and/or the context of the user.

The content that is selected by the cursor prompt can be any selectable content, such as selectable text content, selectable images, or image content and/or selectable charts, graphs, tables, or other types of such content.

The system may determine the context associated with the instance of the user interface by determining a content type of the selectable content presented within the one or more display blocks and/or by determining a location of the multi-modal cursor within the user interface.

The context can also be a user context determined by the system analyzing user profile, preference, and historical use data. This may also include determining one or more applications that are accessible to the user (including determining application authorizations associated with the user) through the interface and one or more functions that can be applied from the one or more applications to the selectable content.

Disclosed methods may also include displaying a machine-learning model prompt field configured to receive a prompt that the machine-learning model is applied to in response to the prompt being entered into the machine-learning model prompt.

The system is configured to cause the machine-learning model to be applied to both the prompt and the selectable content to generate a response based on the prompt and the selectable content, as well as to cause the response to be displayed in the user interface.

The processed content or the response to the processed content may be displayed in replacement of the selected prompt and/or in a different location on the interface than the selected content and/or simultaneously with the selected content.

After the cursor prompt is in a particular selected cursor state, the system is configured to (i) detect new input selecting the traditional cursor mode icon after the second cursor mode was activated and, responsively, deactivating the second cursor mode and activating the first cursor mode for the cursor prompt, as well as to (ii) detect new user input selecting the AI cursor mode icon after the first cursor mode was activated and, responsively, deactivating the first cursor mode and activating the second cursor mode for the cursor prompt.

Figure 32:
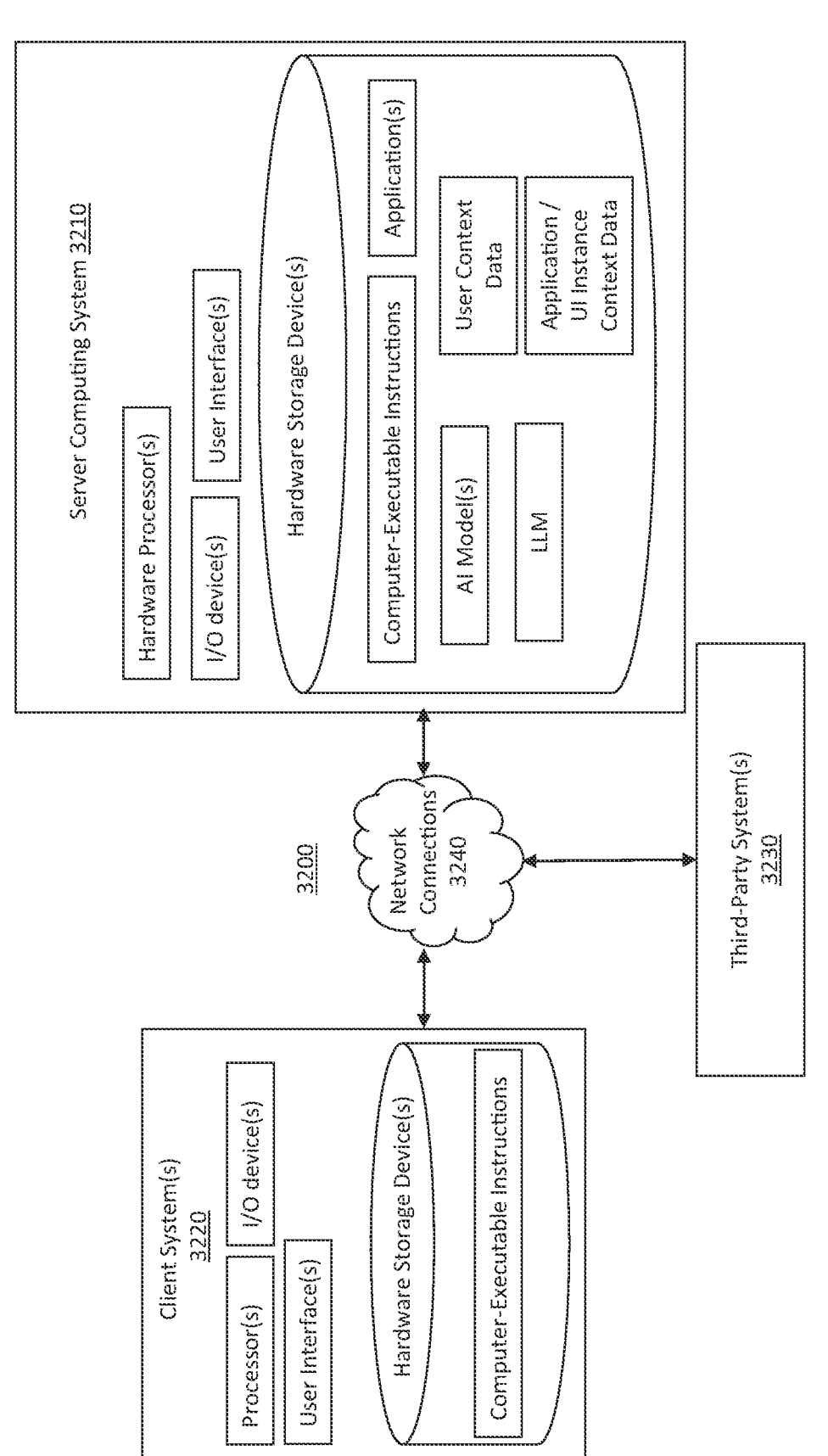
FIG. 32 illustrates an example of a computer system that may be used or incorporated into the disclosed and claimed embodiments.

FIG. 32 illustrates elements of a computer environment 3200 that may be used or incorporated into the disclosed embodiments. This system is an example of two specific-purpose computer systems (e.g., a server computing system 3210 and a client system 3220) in communication with a remote third-party system 3230. Each of these systems may be used to implement the functionality described herein. The client system and third-party system(s) may also include all of the components shown in the server computing system. But they are not duplicated for simplicity and to also show that they may be utilized together as a distributed system.

Embodiments of the disclosure comprise or utilize a general-purpose computer system or a special-purpose computer system (e.g., computer system 3210) that includes computer hardware, such as for example, a processor system (e.g., hardware processor(s)) and system memory, as discussed in greater detail below. Embodiments within the scope of the present disclosure also include physical and other computer-readable media for carrying or storing computer-executable instructions and/or data structures. Such computer-readable media can be any available media accessible by a general-purpose or special-purpose computer system. Computer-readable media that store computer-executable instructions and/or data structures are computer storage media. Computer-readable media that carry computer-executable instructions and/or data structures are transmission media. Thus, embodiments of the disclosure can comprise at least two distinctly different kinds of computer-readable media: computer storage media and transmission media.

Computer storage media are physical storage media that store computer-executable instructions and/or data structures. Physical storage media include computer hardware, such as random access memory (RAM), read-only memory (ROM), electrically erasable programmable ROM (EEPROM), solid state drives (SSDs), flash memory, phase-change memory (PCM), optical disk storage, magnetic disk storage or other magnetic storage devices, or any other hardware storage device(s) which store program code in the form of computer-executable instructions or data structures, which can be accessed and executed by a general-purpose or special-purpose computer system to implement the disclosed functionality.

Transmission media include a network and/or data links that carry program code in the form of computer-executable instructions or data structures that are accessible by a general-purpose or special-purpose computer system. A "network" is defined as a data link that enables the transport of electronic data between computer systems and other electronic devices. When information is transferred or provided over a network or another communications connection (either hardwired, wireless, or a combination thereof) to a computer system, the computer system may view the connection as transmission media. The scope of computer-readable media includes combinations thereof.

Upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module (e.g., network interface connections 3240) and eventually transferred to computer system RAM and/or less volatile computer storage media at a computer system. Thus, computer storage media can be included in computer system components that also utilize transmission media.

Computer-executable instructions comprise, for example, instructions and data which when executed at a processor system, cause a general-purpose computer system, a special-purpose computer system, or a special-purpose processing device to perform a function or group of functions. In some embodiments, computer-executable instructions comprise binaries, intermediate format instructions (e.g., assembly language), or source code. In some embodiments, a processor system comprises one or more central processing units (CPUs), one or more graphics processing units (GPUs), one or more neural processing units (NPUs), and the like.

In some embodiments, the disclosed systems and methods are practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. In some embodiments, the disclosed systems and methods are practiced in distributed system environments where different computer systems, which are linked through a network (e.g., by hardwired data links, wireless data links, or by a combination of hardwired and wireless data links), both perform tasks. As such, in a distributed system environment, a computer system may include a plurality of constituent computer systems. Program modules may be located in local and remote memory storage devices in a distributed system environment.

In some embodiments, the disclosed systems and methods are practiced in a cloud computing environment. In some embodiments, cloud computing environments are distributed, although this is not required. When distributed, cloud computing environments may be distributed internally within an organization and/or have components possessed across multiple organizations. In this description and the following claims, "cloud computing" is a model for enabling on-demand network access to a shared pool of configurable computing resources (e.g., networks, servers, storage, applications, and services). A cloud computing model can be composed of various characteristics, such as on-demand self-service, broad network access, resource pooling, rapid elasticity, measured service, and so forth. A cloud computing model may also come in the form of various service models such as Software as a Service (Saas), Platform as a Service (PaaS), Infrastructure as a Service (IaaS), etc. The cloud computing model may also be deployed using different deployment models such as private cloud, community cloud, public cloud, hybrid cloud, etc.

Although the subject matter has been described in language specific to structural features and/or methodological acts, it is to be understood that the subject matter defined in the appended claims is not necessarily limited to the described features or acts described supra or the order of the acts described supra. Rather, the described features and acts are disclosed as example forms of implementing the claims.

The present disclosure may be embodied in other specific forms without departing from its essential characteristics. The described embodiments are only illustrative and not restrictive. All changes which come within the meaning and range of equivalency of the claims are to be embraced within their scope.

Numbered Clauses

The present invention can also be described in accordance with the following numbered clauses.

Clause 1. A method implemented by a system for managing a discovery of relevant skills and data for a user that are contextually relevant to the user and for facilitating processing of the skills and data for presentation within blocks of a canvas displayed to the user within a user interface, the method comprising: the system identifying a user context, the user context including at least a user profile and location; the system identifying an application context, the application context including at least a type of application used to instantiate a user interface containing the canvas and one or more applications that are instantiated and used to generate data that is presented within the blocks of the canvas within the user interface; the system identifying a set of total available skills accessible to the user through the system which are configured to generate and/or process data; the system selecting relevant skills from the set of total available skills accessible to gather and process data for display within the blocks of the canvas, the system selecting the relevant skills by filtering the set of total available skills based on at least the user context; the system identifying schemas for data output formats of the relevant skills; the system identifying a desired presentation schema for a desired data presentation format for display within the blocks of the canvas, the desired presentation schema being based on at least the user context and the application context; the system identifying modules for normalizing schemas of the relevant skills to the desired presentation schema; and the system using the identified modules to normalize data obtained from the relevant skills into the desired presentation schema for presentation within the blocks of the canvas.

Clause 2. The method of clause 1, wherein the method further comprises the system displaying data obtained from the relevant skills within the desired presentation schema within the blocks of the canvas, the canvas including at least two different blocks, each of the at least two different blocks including different data obtained from at least two different relevant skills, respectively.

Clause 3. The method of clause 1, wherein the method further includes inferring an inferred desired user action based on detecting a user input interacting with data presented within a particular block of the canvas as well as based at least in part on the user context and the application context.

Clause 4. The method of clause 3, wherein the method further includes, based on the inferred desired user action, determining whether to generate a new data block in the canvas with new data related to data contained within the particular block.

Clause 5. The method of clause 4, wherein the inferred desired user action comprises generating the new data block in the canvas with new data that is normalized by the identified modules for normalizing schemas of the relevant skills to the desired presentation schema.

Clause 6. The method of clause 4, wherein the method further includes the system generating the new data block in the canvas and displays the new data block simultaneously with the particular block of the canvas.

Clause 7. The method of clause 5 wherein the method further includes the system generating the new data block in the canvas and displays the new data block by replacing the particular block of the canvas with the new data block in the canvas.

Clause 8. The method of clause 3, wherein the method further comprises the system selecting a particular menu from a plurality of different menus based on the inferred desired user action, wherein different inferred desired user actions correspond to different menus, the particular menu including one or more interactive user interface elements that, when selected, cause the system to perform the inferred desired user action.

Clause 9. The method of clause 1, wherein the modules for normalizing the schemas of the relevant skills to the desired presentation schema comprise modules for translating data obtained from the relevant skills into a language of the desired presentation schema for presenting the data obtained from the relevant skills in the canvas.

Clause 10. The method of clause 1, wherein the modules for normalizing the schemas of the relevant skills to the desired presentation schema comprise modules for modifying a font for data obtained from the relevant skills into a language of the desired presentation schema for presenting the data obtained from the relevant skills in the canvas.

Clause 11. The method of clause 1, wherein the modules for normalizing the schemas of the relevant skills to the desired presentation schema comprise modules for converting data obtained from the relevant skills into a graph or chart format to be used by the desired presentation schema for presenting the data obtained from the relevant skills in the canvas.

Clause 12. The method of clause 1, wherein the user context further includes calendar information and a title or position associated with the user.

Clause 13. The method of clause 1, wherein the user context further includes authorizations and subscriptions associated with user accounts.

Clause 14. The method of clause 1, wherein the application context further includes an application state corresponding to one or more functionalities being invoked by the application.

Clause 15. The method of clause 1, wherein the application context further includes an application state corresponding to whether the application is being used in a group meeting implementation or, alternatively, an individual user implementation.

Clause 16. The method of clause 1, wherein the relevant skills comprise one or more applications and/or models configured to process data.

Clause 17. The method of clause 1, wherein the relevant skills comprise skills accessed from a source remote from the system.

Clause 18. The method of clause 1, wherein the relevant skills comprise skills stored locally within the system.

Clause 19. A system, comprising a processor system and a computer storage medium that stores computer-executable instructions that are executable by the processor system to implement the method of clause 1.

Clause 20. The system of clause 19, wherein the method further comprises the system displaying data obtained from the relevant skills within the desired presentation schema within the blocks of the canvas, the canvas including at least two different blocks, each of the at least two different blocks including different data obtained from at least two different relevant skills, respectively.

Clause 21. The system of clause 19, wherein the method further includes inferring an inferred desired user action based on detecting a user input interacting with data presented within a particular block of the canvas as well as based at least in part on the user context and the application context.

Clause 22. The system of clause 21, wherein the method further includes, based on the inferred desired user action, determining whether to generate a new data block in the canvas with new data related to data contained within the particular block.

Clause 23. The system of clause 22, wherein the inferred desired user action comprises generating the new data block in the canvas with new data that is normalized by the identified modules for normalizing schemas of the relevant skills to the desired presentation schema.

24. The system of claim 23, wherein the method further includes the system generating the new data block in the canvas and displays the new data block simultaneously with the particular block of the canvas.

Clause 25. The system of clause 24, wherein the method further includes the system generating the new data block in the canvas and displays the new data block by replacing the particular block of the canvas with the new data block in the canvas.

Clause 26. The system of clause 21, wherein the method further comprises the system selecting a particular menu from a plurality of different menus based on the inferred desired user action, wherein different inferred desired user actions correspond to different menus, the particular menu including one or more interactive user interface elements that, when selected, cause the system to perform the inferred desired user action.

Clause 27. The system of clause 19, wherein the modules for normalizing the schemas of the relevant skills to the desired presentation schema comprise modules for translating data obtained from the relevant skills into a language of the desired presentation schema for presenting the data obtained from the relevant skills in the canvas.

Clause 28. The system of clause 19, wherein the modules for normalizing the schemas of the relevant skills to the desired presentation schema comprise modules for modifying a font for data obtained from the relevant skills into a language of the desired presentation schema for presenting the data obtained from the relevant skills in the canvas.

Clause 29. The system of clause 19, wherein the modules for normalizing the schemas of the relevant skills to the desired presentation schema comprise modules for converting data obtained from the relevant skills into a graph or chart format to be used by the desired presentation schema for presenting the data obtained from the relevant skills in the canvas.

Clause 30. The system of clause 19, wherein the user context further includes calendar information and a title or position associated with the user.

Clause 31. The system of clause 19, wherein the user context further includes authorizations and subscriptions associated with user accounts.

Clause 32. The system of clause 19, wherein the application context further includes an application state corresponding to one or more functionalities being invoked by the application.

Clause 33. The system of clause 19, wherein the application context further includes an application state corresponding to whether the application is being used in a group meeting implementation or, alternatively, an individual user implementation.

Clause 34. The system of clause 19, wherein the relevant skills comprise one or more applications and/or models configured to process data.

Clause 35. The system of clause 19, wherein the relevant skills comprise skills accessed from a source remote from the system.

Clause 36. The system of clause 19, wherein the relevant skills comprise skills stored locally within the system.

When introducing elements in the appended claims, the articles "a," "an," "the," and "said" are intended to mean there are one or more of the elements. The terms "comprising," "including," and "having" are intended to be inclusive and mean that there may be additional elements other than the listed elements. Unless otherwise specified, the terms "set," "superset," and "subset" are intended to exclude an empty set, and thus "set" is defined as a non-empty set, "superset" is defined as a non-empty superset, and "subset" is defined as a non-empty subset. Unless otherwise specified, the term "subset" excludes the entirety of its superset (i.e., the superset contains at least one item not included in the subset). Unless otherwise specified, a "superset" can include at least one additional element, and a "subset" can exclude at least one element.

What is claimed:

1. A method implemented by a system for managing a discovery of relevant skills and data for a user, where the relevant skills and data are contextually relevant to the user, and for facilitating processing of the relevant skills and data for presentation within blocks of a canvas displayed to the user within a user interface, the method being performed by one or more processors of the system and comprising:

identifying a user context that includes a user profile and location;

identifying an application context that includes (i) a type of application used to instantiate a user interface comprising the canvas and (ii) one or more applications that are instantiated and used to generate data that is presented within the blocks of the canvas within the user interface;

identifying a set of total available skills accessible to the user through the system, wherein the set of total available skills includes at least one of: applications, data sources, or models;

selecting the relevant skills from the set of total available skills, wherein the relevant skills are ones that are configured to generate and/or process data for display within the blocks of the canvas, wherein the relevant skills are selected by filtering the set of total available skills based on the user context;

identifying skill schemas for data output formats of the relevant skills;

identifying a desired presentation schema for a desired data presentation format for display within the blocks of the canvas, the desired presentation schema being based on the user context and the application context;

identifying modules, which are implemented by the one or more processors of the system, for normalizing the skill schemas to the desired presentation schema;

using the identified modules to normalize data, which is obtained from the relevant skills and which is structured in accordance with the skill schemas, into the desired presentation schema for presentation within the blocks of the canvas;

modifying a functionality of a cursor of the system by:

determining that the cursor of the system is operating in a traditional cursor mode; and in response to detection of a predetermined condition, causing the cursor to transition from operating in the traditional cursor mode to operating in an artificial intelligence (AI) mode, wherein:

when the cursor operates in the AI mode, additional functionality that was not previously available to the cursor while the cursor operated in the traditional cursor mode is provided to the cursor, and the additional functionality is based on specific content that is included in the canvas and that the user is interacting with; and detecting a use of the cursor, wherein the use triggers implementation of the additional functionality within the canvas.

2. The method of claim 1, wherein the method further includes inferring an inferred desired user action based on detecting a user input interacting with data presented within a particular block of the canvas as well as based at least in part on the user context and the application context.

3. The method of claim 2, wherein the method further includes, based on the inferred desired user action, determining whether to generate a new data block in the canvas with new data related to data contained within the particular block.

4. The method of claim 3, wherein the inferred desired user action comprises generating the new data block in the canvas with new data that is normalized by the identified modules for normalizing schemas of the relevant skills to the desired presentation schema.

5. The method of claim 4, wherein the method further includes the system generating the new data block in the canvas and displaying the new data block by replacing the particular block of the canvas with the new data block in the canvas.

6. The method of claim 3, wherein the method further includes the system generating the new data block in the canvas and displaying the new data block simultaneously with the particular block of the canvas.

7. The method of claim 2, wherein the method further comprises the system selecting a particular menu from a plurality of different menus based on the inferred desired user action, wherein different inferred desired user actions correspond to different menus, the particular menu including one or more interactive user interface elements that, when selected, cause the system to perform the inferred desired user action.

8. The method of claim 1, wherein the method further comprises the system displaying data obtained from the relevant skills in accordance with the desired presentation schema and within the blocks of the canvas, the canvas including at least two different blocks, each of the at least two different blocks including different data obtained from at least two different relevant skills, respectively.

9. The method of claim 1, wherein the modules for normalizing the skill schemas to the desired presentation schema comprise modules for translating data obtained from the relevant skills into a language of the desired presentation schema for presenting the data obtained from the relevant skills in the canvas.

10. The method of claim 1, wherein the modules for normalizing the skill schemas to the desired presentation schema comprise modules for modifying a font for data obtained from the relevant skills into a language of the desired presentation schema for presenting the data obtained from the relevant skills in the canvas.

11. The method of claim 1, wherein the modules for normalizing the skill schemas to the desired presentation schema comprise modules for converting data obtained from the relevant skills into a graph or chart format to be used by the desired presentation schema for presenting the data obtained from the relevant skills in the canvas.

12. The method of claim 1, wherein the user context further includes calendar information and a title or position associated with the user.

13. The method of claim 1, wherein the user context further includes authorizations and subscriptions associated with user accounts.

14. The method of claim 1, wherein the application context further includes an application state corresponding to one or more functionalities being invoked by the application.

15. The method of claim 1, wherein the application context further includes an application state corresponding to whether the application is being used in a group meeting implementation or, alternatively, an individual user implementation.

16. The method of claim 1, wherein the relevant skills comprise one or more applications and/or models configured to process data.

17. The method of claim 1, wherein the relevant skills comprise skills accessed from a source remote from the system.

18. The method of claim 1, wherein the relevant skills comprise skills stored locally within the system.

19. A system comprising:
a processor system; and
a computer storage medium that stores computer-executable instructions that are executable by the processor system to cause the system to:
identify a user context that includes a user profile and location;
identify an application context that includes (i) a type of application used to instantiate a user interface comprising the canvas and (ii) one or more applications that are instantiated and used to generate data that is presented within the blocks of the canvas within the user interface;
identify a set of total available skills accessible to the user through the system, wherein the set of total available skills includes at least one of: applications, data source, or models;
select the relevant skills from the set of total available skills, wherein the relevant skills are ones that are configured to generate and/or process data for display within the blocks of the canvas, wherein the relevant skills are selected by filtering the set of total available skills based on the user context;
identify skill schemas for data output formats of the relevant skills;
identify a desired presentation schema for a desired data presentation format for display within the blocks of the canvas, the desired presentation schema being based on the user context and the application context;
identify modules, which are implemented by the processor system, for normalizing skill schemas to the desired presentation schema;
use the identified modules to normalize data, which is obtained from the relevant skills and which is structured in accordance with the skill schemas, into the desired presentation schema for presentation within the blocks of the canvas;
modify a functionality of a cursor of the system by:
determining that the cursor of the system is operating in a traditional cursor mode; and
in response to detection of a predetermined condition, causing the cursor to transition from operating in the traditional cursor mode to operating in an artificial intelligence (AI) mode, wherein:
when the cursor operates in the AI mode, additional functionality that was not previously available to the cursor while the cursor operated in the traditional cursor mode is provided to the cursor, and
the additional functionality is based on specific content that is included in the canvas and that the user is interacting with; and
detect a use of the cursor, wherein the use triggers implementation of the additional functionality within the canvas.

20. The system of claim 19, wherein the computer-executable instructions are further executable for causing the system to:

display data obtained from the relevant skills within the desired presentation schema within the blocks of the canvas, the canvas including at least two different blocks, each of the at least two different blocks including different data obtained from at least two different relevant skills, respectively, and infer an inferred desired user action based on detecting a user input interacting with data presented within a particular block of the canvas as well as based at least in part on the user context and the application context.

\* \* \* \* \*